(12) United States Patent
Katayama

(10) Patent No.: US 7,411,882 B2
(45) Date of Patent: Aug. 12, 2008

(54) OPTICAL HEAD DEVICE AND OPTICAL INFORMATION RECORDING/REPRODUCING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/445,187

(22) Filed: Jun. 2, 2006

(65) Prior Publication Data

US 2006/0280101 A1  Dec. 14, 2006

Related U.S. Application Data

(62) Division of application No. 10/117,998, filed on Apr. 9, 2002, now Pat. No. 7,085,218.

(30) Foreign Application Priority Data

Apr. 10, 2001  (JP) .............................. 2001-111321

(51) Int. Cl.
  *G11B 7/00*  (2006.01)
(52) U.S. Cl. ................. 369/112.02; 369/44.32
(58) Field of Classification Search ........................ None
  See application file for complete search history.

(56) References Cited

U.S. PATENT DOCUMENTS

| 6,370,095 | B1 |  | 4/2002 | Ogasawara |  |
|---|---|---|---|---|---|
| 6,532,202 | B1 | * | 3/2003 | Wada et al. | ............. 369/112.02 |
| 6,584,058 | B1 |  | 6/2003 | Yoshikawa et al. |  |
| 6,819,646 | B1 | * | 11/2004 | Kitaoka et al. | ......... 369/112.01 |
| 6,859,429 | B2 | * | 2/2005 | Ogasawara et al. | .... 369/112.02 |

| 2003/0107981 | A1 | * | 6/2003 | Hendriks et al. | ........ 369/112.26 |
|---|---|---|---|---|---|

FOREIGN PATENT DOCUMENTS

| JP | 61-140920 | A | 6/1986 |
|---|---|---|---|
| JP | 02-121129 | A | 5/1990 |
| JP | 07-098431 | A | 4/1995 |
| JP | 9-128785 | A | 5/1997 |
| JP | 09-211460 | A | 8/1997 |
| JP | 10-247330 | A | 9/1998 |
| JP | 10-289465 | A | 10/1998 |

(Continued)

OTHER PUBLICATIONS

S. Ohtaki et al., "The Applications of a Liquid Crystal Panel for the 15 Gbyte Optical Disk Systems", Jpn. J. Appl. Phys., vol. 38, No. 3B, Part 1, (Mar. 1999), pp. 1744-1749.

*Primary Examiner*—Wayne Young
*Assistant Examiner*—Lixi Chow
(74) *Attorney, Agent, or Firm*—Sughrue Mion, PLLC

(57) ABSTRACT

In an optical head device and an optical information recording/reproducing device using the optical head device, by driving a liquid crystal panel 4a, the liquid crystal panel 4a produces wave aberration for light on a going path and light on a returning path likewise. Accordingly, when the substrate-thickness deviation or tilt of the disc 7 is corrected, the wave aberration due to the substrate-thickness deviation or tilt of the disc 7 and the wave aberration produced by the liquid crystal panel 4a are canceled by each other for both of the light on the going path and the light on the returning path, so that no wave aberration remains for the light on the returning path and the phase distribution is not varied.

15 Claims, 18 Drawing Sheets

FOREIGN PATENT DOCUMENTS

| | | |
|---|---|---|
| JP | 2000-057616 A | 2/2000 |
| JP | 2000-67453 A | 3/2000 |
| JP | 2001-034996 A | 2/2001 |
| JP | 2001-331963 A | 11/2001 |
| JP | 2002-251774 A | 9/2002 |
| WO | WO 02/21520 A1 | 3/2002 |

* cited by examiner

OPTICAL HEAD DEVICE AND OPTICAL INFORMATION RECORDING/REPRODUCING DEVICE

BACKGROUND OF THE INVENTION

This is a divisional of U.S. patent application Ser. No. 10/117,998, filed Apr. 9, 2002, now U.S. Pat. No. 7,085,218 the entire disclosure of which is incorporated herein by reference.

1. Field of the Invention

The present invention relates to an optical head device and an optical information recording/reproducing device for recording/reproducing information on an optical recording medium and particularly, to an optical head device and an optical information recording/reproducing device which can correct spherical aberration due to a deviation in the thickness of the substrate of the optical recording medium and coma aberration due to a tilt of the optical recording medium by using a liquid crystal panel.

2. Description of the Related Art

The recording density of an optical information recording/reproducing device is in inverse proportion to the square of the diameter of a focused light spot which is formed on an optical recording medium by an optical head device. That is, as the diameter of the focused light spot is smaller, the recording density is increased. The diameter of the focused light spot is in inverse proportion to the numerical aperture of an objective lens in the optical head device. That is, as the numerical aperture of the objective lens is higher, the diameter of the focused light spot is reduced. On the other hand, when the thickness of the substrate of the optical recording medium is deviated from the design value thereof, the shape of the focused light spot is distorted due to spherical aberration caused by the deviation of the thickness of the substrate, so that the recording/reproducing characteristic is deteriorated. The spherical aberration is proportional to the fourth power of the numerical aperture of the objective lens, and thus the margin of the thickness deviation of the substrate of the optical recording medium to the recording/reproducing characteristic is narrower as the numerical aperture of the objective lens is increased.

Further, when the optical recording medium is tilted relatively to the objective lens, the shape of the focused light spot is distorted due to coma aberration caused by the tilt, so that the recording/reproducing characteristic is deteriorated. The coma aberration is proportional to the third power of the numerical aperture of the objective lens, and thus the margin of the tilt of the optical recording medium to the recording/reproducing characteristic is narrower as the numerical aperture of the objective lens is increased. Accordingly, for an optical head device and an optical information recording/reproducing device in which the numerical aperture of the objective lens is increased to enhance the recording density, it is necessary to correct the substrate-thickness deviation and tilt of the optical recording medium in order to prevent deterioration of the recording/reproducing characteristic.

An optical head device using a liquid crystal panel is known as an optical head device which can correct the substrate-thickness deviation and tilt of the optical recording medium. FIG. 14 shows the construction of a conventional optical head device which can correct the substrate-thickness deviation and tilt of the optical recording medium by using a liquid crystal panel.

The optical head device shown in FIG. 14 is the same type as described in Japanese Journal of Applied Physics, Part 1 of Vol. 38, No. 3B, pp. 1744-1749. A beam emitted from a semiconductor laser 1 is collimated by a collimator lens 2, and incident as P-polarized light to a polarization beam splitter 3. Substantially 100% of the P-polarized light is transmitted through the polarization beam splitter 3, then transmitted through a liquid crystal panel 4v and a quarter wavelength plate 5 to be converted from linearly polarized light to circularly polarized light, and then the circularly-polarized light is focused onto a disc 7 by an objective lens 6. Light reflected from the disc 7 is transmitted through the objective lens 6 in the opposite direction, and then transmitted through the quarter wavelength plate 5 to be converted from the circularly polarized light to linearly polarized light whose polarization direction is perpendicular to that of the linearly polarized light on the going path. The linearly polarized light transmitted through the quarter wavelength plate 5 is transmitted through the liquid crystal panel 4v, and then incident as S-polarized light to the polarization beam splitter 3. Substantially 100% of the S-polarized light is reflected from the polarization beam splitter 3, transmitted through a cylindrical lens 8 and a lens 9 and then detected by a photodetector 10. The photodetector 10 is disposed at the intermediate position between the line foci of the cylindrical lens 8 and the lens 9.

FIG. 15 shows a pattern of the photodetection portion of the photodetector 10.

A light spot 19 corresponding to the light reflected from the disc 7 is detected by photodetection portions 18a to 18d achieved by dividing the photodetection portion of the photodetector 10 into four parts by a dividing line passing through the optical axis and extending in parallel to the radial direction of the disc 7 and a dividing line passing through the optical axis and extending in parallel to the tangent line direction of the disc 7.

Representing the outputs of the photodetection portions 18a to 18d by V18a to V18d respectively, a focus error signal can be achieved from the calculation of (V18a+V18d)−(V18b+V18c) on the basis of the astigmatism method. A track error signal can be also achieved from the calculation of (V18a+V18b)−(V18c+V18d) on the basis of the push-pull method. A reproduction signal recorded on the disc 7 is achieved from the calculation of (V18a+V18b+V18c+V18d).

FIG. 16A shows the construction of the liquid crystal panel 4v.

The liquid crystal panel 4v has glass substrates 11x and 11y, and a liquid crystal portion 12n filled with liquid crystal molecules, which is sandwiched between the glass substrates 11x and 11y. A pattern electrode 13m is formed on one surface of the glass substrate 11x which confronts the liquid crystal portion 12n, and also an overall-surface electrode 14g is formed on one surface of the glass substrate 11y which confronts the liquid crystal portion 12n. The positions of the pattern electrode 13m and the overall-surface electrode 14g may be replaced by each other. The X-direction, the Y-direction and the Z-direction in FIGS. 16A to 16C correspond to the radial direction of the disc 7, the tangent line direction of the disc 7 and the optical axis direction, respectively.

FIG. 16B shows an electrode pattern formed for the pattern electrode 13m when the substrate-thickness deviation of the disc 7 is corrected by using the liquid crystal panel 4v. This electrode pattern 20a is divided into five areas 21a to 21e. The dotted line of FIG. 16B corresponds to the effective diameter of the objective lens 6. FIG. 16C shows an electrode pattern formed for the pattern electrode 13m when the tilt in the radial direction of the disc 7 is corrected by using the liquid crystal panel 4v. This electrode pattern 20b is divided into five areas 21f to 21j. The dotted line of FIG. 16C corresponds to the effective diameter of the objective lens 6.

Next, a method of correcting the substrate-thickness deviation of the disc 7 will be described with reference to FIG. 17.

The correction of the substrate-thickness deviation is performed by using the liquid crystal panel 4v having the pattern electrode 13m on which the electrode pattern 20a shown in FIG. 16B is formed. FIG. 17A shows a calculation example of the spherical aberration caused by the substrate-thickness deviation on the cross section in the radial direction of the disc 7. The abscissa represents the radius of the objective lens, and the ordinate represents wave aberration achieved by applying defocus to the spherical aberration. In FIG. 17A, a solid line represents wave aberration when the substrate-thickness deviation is not corrected, and it is represented by a biquadratic function of the radius of the objective lens 6. A dotted line represents wave aberration when the substrate-thickness deviation is corrected by using the liquid crystal panel 4v, and it is represented by the sum of the wave aberration before the correction and the wave aberration produced by the liquid crystal panel 4v. The wave aberration varies discontinuously at the boundaries of the areas 21a to 21e of FIG. 16B. It is apparent from FIG. 17A that the standard deviation of the wave aberration is reduced by using the liquid crystal panel 4v and the substrate-thickness deviation can be corrected.

FIG. 17B shows a calculation example of the wave aberration produced by the liquid crystal panel 4v on the cross section in the radial direction of the disc 7. The abscissa represents the radius of the objective lens 6, and the ordinate represents the correction amount of the wave aberration. The correction amount in each of the areas 21a and 21e of FIG. 16B is equal to zero, the correction amount in the areas 21b and 21d is represented by $\alpha$, and the correction amount in the area 21c is represented by $2\alpha$ ($\alpha$ represents a constant).

A method of correcting the tilt in the radial direction of the disc 7 will be described with reference to FIG. 18.

The correction of the tilt in the radial direction is performed by using the liquid crystal panel 4v having the pattern electrode 13m on which the electrode pattern 20b shown in FIG. 16C is formed. FIG. 18A shows a calculation example of the coma aberration on the cross section in the radial direction of the disc 7, which is caused by the tilt in the radial direction of the disc 7. The abscissa represents the radius of the objective lens 6, and the ordinate represents the wave aberration achieved by applying a lateral shift to the coma aberration. In FIG. 18A, a solid line represents the wave aberration when the tilt in the radial direction is not corrected, and it is represented by a tertiary function of the radius of the objective lens 6. A dotted line of FIG. 18A shows the wave aberration when the tilt in the radial direction is corrected by using the liquid crystal panel 4v, and it is represented by the sum of the wave aberration before the correction and the wave aberration produced by the liquid crystal panel 4v. The wave aberration varies discontinuously at the boundaries of the areas 21f to 21j of FIG. 16C. It is apparent from FIG. 18A that the standard deviation of the wave aberration is reduced by using the liquid crystal panel 4v, and thus the tilt in the radial direction can be corrected.

FIG. 18B shows a calculation example of the wave aberration on the cross section in the radial direction of the disc 7, which is produced by the liquid crystal panel 4v. The abscissa represents the radius of the objective lens 6, and the ordinate represents the correction amount of the wave aberration. The correction amount in each of the areas 21f and 21i of FIG. 16C is represented by $-\beta$, the correction amount in the area 21h is equal to zero, and the correction amount in each of the areas 21g, 21j is represented by $\beta$ ($\beta$ represents a constant).

Next, a method of driving the liquid crystal panel 4v will be described with reference to FIGS. 19A to 19C.

A constant voltage $V_{COM}$ is applied to the overall-surface electrode 14g of FIG. 16A. The abscissa of FIGS. 19A to 19C represents the time, and the ordinate thereof represents the applied voltage. In FIGS. 19A to 19C, a solid line represents a voltage applied to first to third areas of the electrode pattern formed for the pattern electrode 13m of FIG. 16A, and it is represented by a rectangular wave having a frequency of about 1 kHz, which has $V_{COM}$ at the center thereof and has the amplitude corresponding to V1 (V2, V3). At this time, the difference of the correction amount of the wave aberration between the first and second areas is proportional to ($V_1-V_2$), and the difference of the correction amount of the wave aberration between the second and third areas is proportional to ($V_2-V_3$).

In the case where the substrate-thickness deviation of the disc 7 is corrected, if the area 21c of FIG. 16B is set to the first area, the areas 21b and 21d are set to the second area, the areas 21a and 21e are set to third area, and $V_1-V_2=V_2-V_3=K\alpha$ (K represents a proportionality coefficient), the difference of the correction amount of the wave aberration between the area 21c and the areas 21b, 21d and the difference of the correction amount of the wave aberration between the areas 21b, 21d and the areas 21a, 21e can be set to the same value $\alpha$.

In the case where the tilt in the radial direction of the disc 7 is corrected, if the areas 21g and 21j of FIG. 16C are set to the first area, the area 21h is set to the second area, the areas 21f and 21i are set to the third area and $V_1-V_2=V_2-V_3=K\beta$ (K represents a proportionality coefficient), the difference of the correction amount of the wave aberration between the areas 21g, 21j and the area 21h and the difference of the correction amount of the wave aberration between the area 21h and the areas 21f, 21i can be set to the same value $\beta$.

FIG. 20 shows the construction of an optical information recording/reproducing device having the optical head device using the liquid crystal panel 4v.

The optical information recording/reproducing device is constructed by adding a reproduction signal detecting circuit 16 and a liquid crystal panel driving circuit 17d to the optical head device shown in FIG. 14. The reproduction signal detecting circuit 16 detects a reproduction signal recorded on the disc 7 on the basis of the output of each photodetecting portion of the photodetector 10. The liquid crystal panel driving circuit 17d drives the liquid crystal panel 4v according to the driving method shown in FIG. 19 so that the amplitude of the reproduction signal is maximum, whereby the substrate-thickness deviation of the disc 7 and the tilt in the radial direction of the disc 7 can be corrected, thereby avoiding the harmful influence on the recording/reproducing characteristic.

The liquid crystal molecules of the liquid crystal portion 12n in FIG. 16A are nematic liquid crystal molecules. These liquid crystal molecules are oriented in the X direction of FIGS. 16A to 16C when $V_1$ to $V_3$ of FIGS. 19A to 19C are equal to zero, oriented in the Z direction when $V_1$ to $V_3$ of FIGS. 19A to 19C are sufficiently large, and oriented in the intermediate direction between the X and Z directions when $V_1$ to $V_3$ of FIGS. 19A to 19C are equal to the intermediate values. The liquid crystal molecules of the liquid crystal portion 12n have birefringence characteristic and thus the refractive indexes thereof to ordinary light and extraordinary light are represented by $n_o$, $n_e$. Further, the refractive indexes thereof to the emission light from the semiconductor laser 1 and the reflection light from the disc 7 are represented by $n_f$, $n_r$.

The emission light from the semiconductor laser 1 is linearly polarized light parallel to the X direction of FIGS. 16A to 16C. Therefore, when $V_1$ to $V_3$ of FIGS. 19A to 19C are equal to zero, the light emitted from the liquid crystal panel 4v has only an extraordinary light component. On the other hand, when $V_1$ to $V_3$ are sufficiently large, the light emitted from the liquid crystal panel 4v has only an ordinary light component. When $V_1$ to $V_3$ are equal to the intermediate values, the light emitted from the liquid crystal panel 4v has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode pattern formed for the pattern electrode 13m of FIG. 16A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of the liquid crystal portion 12n, and $\lambda$ represents the wavelength of the incident light.

That is, by driving the liquid crystal panel 4v according to the driving method of FIGS. 19A to 19C, the liquid crystal panel 4v produces wave aberration to light on the going path which corresponds to the emission light from the semiconductor laser 1. The reflection light from the disc 7 is linearly polarized light parallel to the Y direction of FIGS. 16A to 16C, so that the light from the liquid crystal panel 4v is ordinary light irrespective of the values of $V_1$ to $V_3$. Accordingly, $n_r$ is equal to $n_o$ irrespective of the values of $V_1$ to $V_3$. At this time, the difference of the correction amount of the wave aberration in the first and second areas of the electrode pattern formed for the pattern electrode 13m of FIG. 16A and the difference of the correction amount of the wave aberration in the second and third areas are equal to zero. That is, even by driving the liquid crystal panel 4v according to the driving method shown in FIGS. 19A to 19C, the liquid crystal panel 4v does not produce the wave aberration to light on the return path which corresponds to the reflection light from the disc 7.

When the substrate-thickness deviation of the disc 7 is corrected in the conventional optical head device, if $(n_{f1}-n_{f2})h/\lambda=(n_{f2}-n_{f3})h/\lambda=\alpha$, the wave aberration due to the substrate-thickness deviation and the wave aberration produced by the liquid crystal panel 4v are canceled by each other for the light traveling on the going path. However, the wave aberration due to the substrate-thickness deviation remains for the light travelling on the returning path. Further, when the tilt in the radial direction of the disc 7 is corrected in the conventional optical head device, if $(n_{f1}-n_{f2})h/\lambda=(n_{f2}-n_{f3})h/\lambda=\beta$, the wave aberration due to the tilt in the radial direction and the wave aberration produced by the liquid crystal panel 4v are canceled by each other for the light traveling on the going path, however, the wave aberration due to the tilt in the radial direction remains for the light traveling on the returning path. The reproduction signal recorded on the disc 7 and the track error signal are dependent on the intensity distribution of the light travelling on the returning path, however, they are not dependent on the phase distribution of the light. Therefore, the reproduction signal and the track error signal are not affected even when the phase distribution is varied due to the remaining wave aberration. On the other hand, a focus error signal is affected when the phase distribution is varied due to the remaining wave aberration because it is dependent on the intensity distribution and phase distribution of the light travelling on the returning path.

FIGS. 21A to 21C are calculation examples of the focus error signal and the peak intensity of a focused spot on the disc 7. The abscissa of FIGS. 21A to 21C represents defocus. In FIGS. 21A to 21C, a solid line represents a focus error signal standardized with a sum signal, and a dotted line represents the peak intensity of the focused spot standardized by the maximum value.

FIG. 21A shows a calculation example when the disc 7 has no substrate-thickness deviation and no tilt in the radial direction. In the case of FIG. 21A, the defocus at which the focus error signal is equal to zero is coincident with the defocus at which the peak intensity is maximum, the focus error signal has no offset and the sensitivity (an inclination at the zero cross point) of the focus error signal is high.

On the other hand, FIG. 21B shows a calculation example when the substrate-thickness deviation of the disc 7 is corrected by using the liquid crystal panel 4v. In the case of FIG. 21B, the sensitivity of the focus error signal is high, however, the defocus at which the focus error signal is equal to zero is not coincident with the defocus at which the peak intensity is maximum, and the focus error signal has an offset. Therefore, if the focus servo is carried out so that the focus error signal is equal to zero, the peak intensity is reduced, and the recording/reproducing characteristic is deteriorated.

FIG. 21C shows a calculation example when the tilt in the radial direction of the disc 7 is corrected by using the liquid crystal panel 4v. In the case of FIG. 21C, the defocus at which the focus error signal is equal to zero is coincident with the defocus at which the peak intensity is maximum, and the focus error signal has no offset. However, the sensitivity of the focus error signal is lower than that of FIG. 21A. Therefore, if the focus servo is carried out so that the residual error of the focus error signal is equal to a predetermined value, the residual error of the defocus is larger than that of FIG. 21A, so that the recording/reproducing characteristic is deteriorated.

SUMMARY OF THE INVENTION

Therefore, an object of the present invention is to solve the above disadvantages of the conventional optical head device which can correct the substrate-thickness deviation or tilt of an optical recording medium by using a liquid crystal panel, and provide an optical head device and an optical information recording/reproducing device in which a focus error signal has no offset and the sensitivity of the focus error signal is high even when the substrate-thickness deviation or tilt of the optical recording medium is corrected by using the liquid crystal panel.

In order to attain the above object, according to the present invention, an optical head device comprising a light source, an objective lens for focusing onto an optical recording medium the light which is emitted from the light source and travels on a going path, a photodetector for detecting the light which is reflected from the optical recording medium and travels on a returning path, and a liquid crystal panel for producing wave aberration by which the wave aberration of the light traveling on the going path is canceled, wherein the liquid crystal panel further produces wave aberration by which the wave aberration of the light traveling on the returning path is canceled.

In the optical head device of the present invention, by driving the liquid crystal panel, the liquid crystal panel produces wave aberration for both of the light emitted from the light source and travelling on the going path and the light reflected from the optical recording medium and travelling on the returning path likewise.

In an optical information recording/reproducing device of the present invention, the substrate-thickness deviation or tilt of an optical recording medium is corrected so as to exclude an adverse effect on a recording/reproducing characteristic by using an optical head device of the present invention which can correct the substrate-thickness deviation or tilt of the optical recording medium by using a liquid crystal panel.

When the substrate-thickness deviation or tilt of the optical recording medium is corrected in the optical head device and the optical information recording/reproducing device of the present invention, the wave aberration due to the substrate-thickness deviation or the tilt and the wave aberration produced by the liquid crystal panel are likewise canceled by each other for both of the light traveling on the going path and the light traveling on the returning path, so that no wave aberration remains and the phase distribution is not varied for the light traveling on the returning path. Accordingly, even when the substrate-thickness deviation or tilt of the optical recording medium is corrected by using the liquid crystal panel, a focus error signal having no offset and high sensitivity can be achieved.

BRIEF DESCRIPTION OF THE DRAWINGS

FIGS. 21A to 21C are diagrams showing a calculation example of a focus error signal and the peak intensity of a focused light spot on the optical recording medium, in which FIG. 21A shows a calculation example when the optical recording medium has no substrate-thickness deviation and no tilt in the radial direction, FIG. 21B shows a calculation example when the substrate-thickness deviation of the optical recording medium is corrected by using the liquid crystal panel, and FIG. 21C shows a calculation example when the tilt in the radial direction of the optical recording medium is corrected by using the liquid crystal panel.

DETAILED DESCRIPTION OF THE DRAWINGS

Preferred embodiments according to the present invention will be described hereunder with reference to the accompanying drawings.

Figure 1:
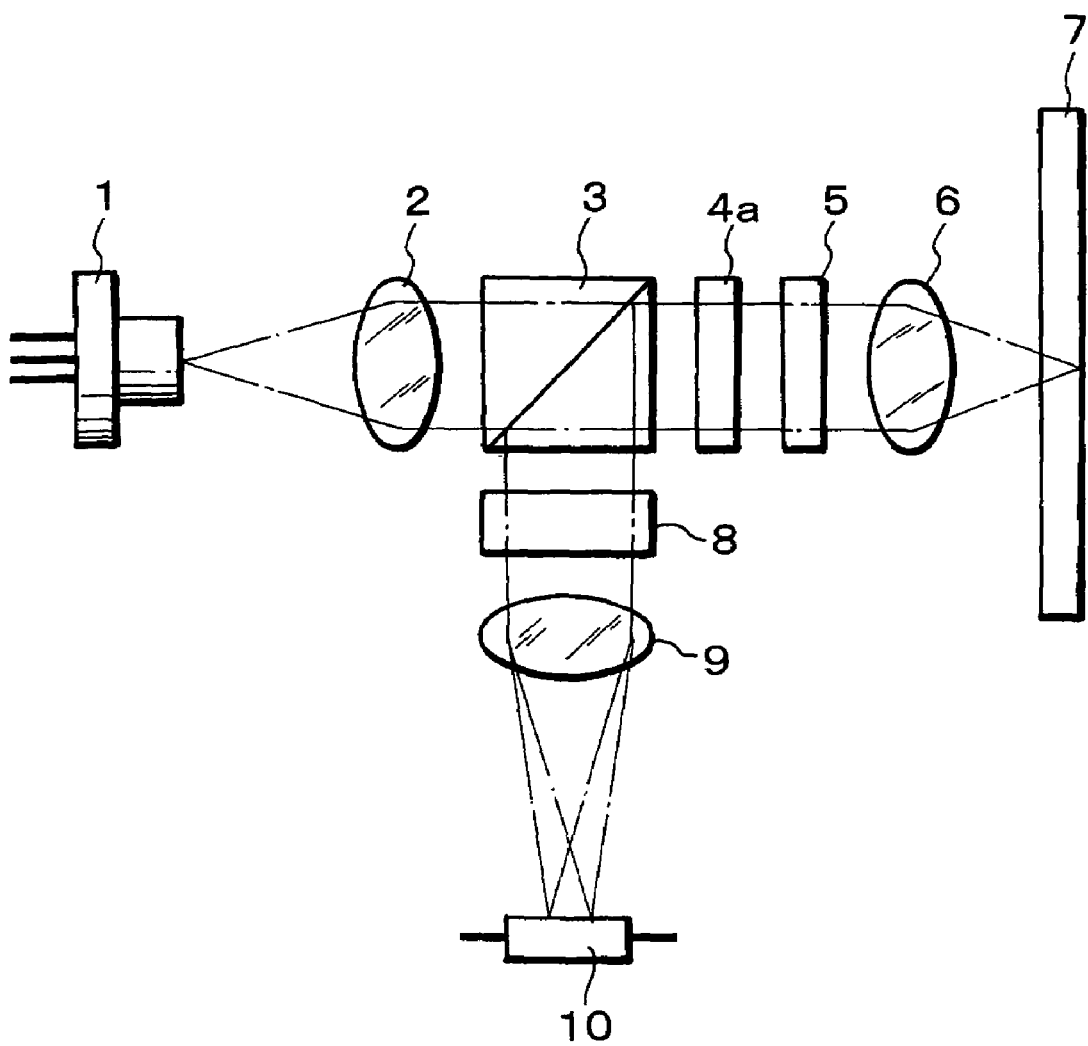
FIG. 1 is a diagram showing a first embodiment of an optical head device according to the present invention.

FIG. 1 shows a first embodiment of an optical head device according to the present invention.

Figure 14:
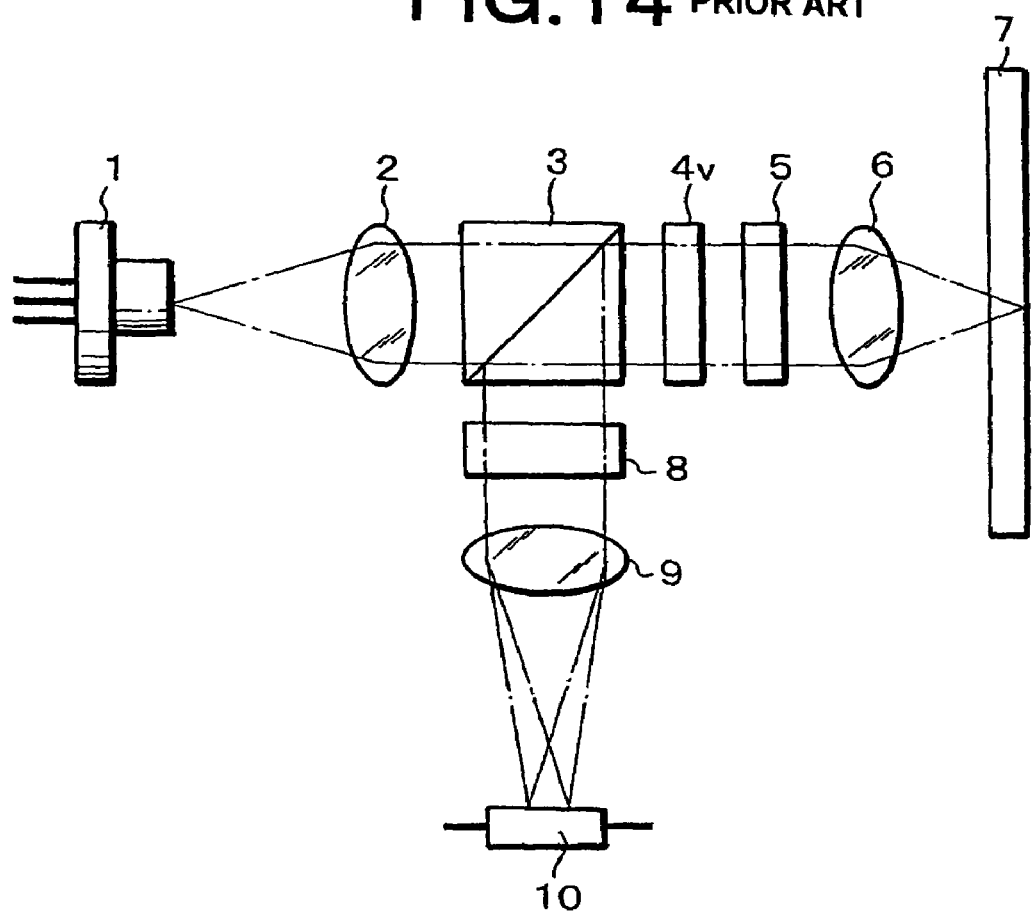
FIG. 14 is a diagram showing the construction of a conventional optical head device.
Figure 15:
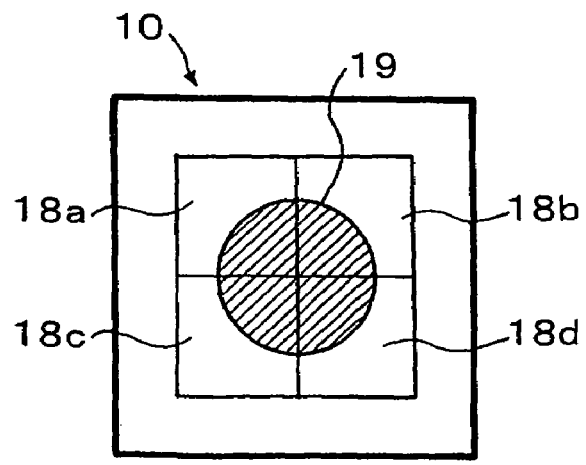
FIG. 15 is a diagram showing a pattern of a photodetecting portion of a photodetector in the conventional optical head device.
Figure 16A:
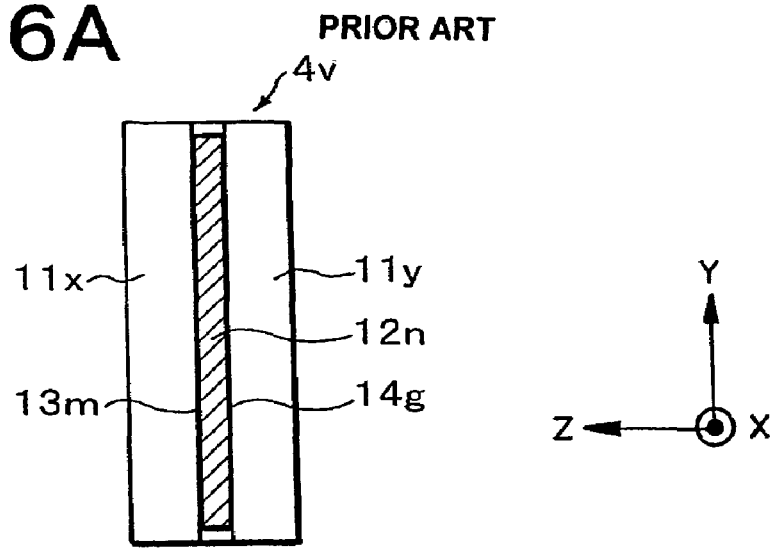
FIG. 16A is a diagram showing the construction of a liquid crystal panel in the conventional optical head device.

In this embodiment, the liquid crystal panel 4v shown in FIG. 16A in the conventional optical head device shown in FIG. 14 is replaced by a liquid crystal panel 4a. The pattern of the photodetecting portion of the photodetector 10 of this embodiment is shown in FIG. 15. According to this embodiment, a focus error signal, a track error signal and a reproduction signal recorded on the disc 7 are achieved in the same manner as described on the conventional optical head device.

Figure 2A:
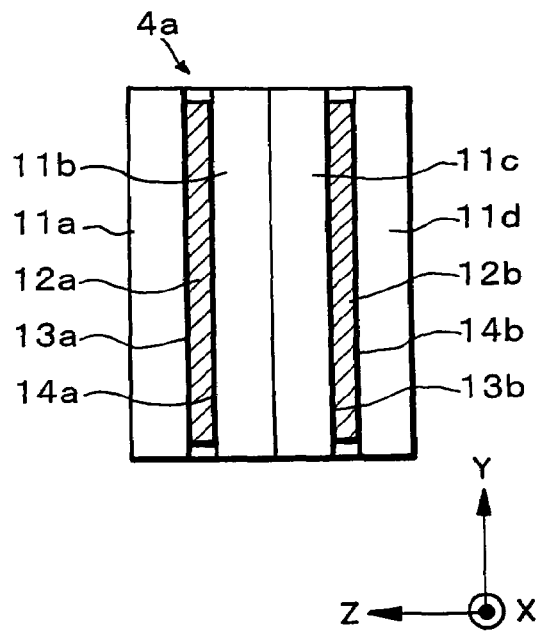
FIG. 2A is a diagram showing the construction of a liquid crystal panel of the first embodiment of the optical head device according to the present invention.

FIG. 2A shows the construction of the liquid crystal panel 4a.

The liquid crystal panel 4a is constructed such that a liquid crystal portion 12a is sandwiched between glass substrates 11a and 11b, a liquid crystal portion 12b is sandwiched between glass substrates 11c and 11d, and the glass substrates 11b and 11c are attached to each other so that the surfaces thereof at the opposite sides to the liquid crystal portion side are confronted to each other. A pattern electrode 13a is formed on a surface of the glass substrate 11a which confronts the liquid crystal portion (12a) side, an overall-surface electrode 14a is formed on a surface of the glass substrate 11b which confronts the liquid crystal portion (12a) side, a pattern electrode 13b is formed on a surface of the glass substrate 11c which confronts the liquid crystal portion (12b) side and an overall-surface electrode 14b is formed on a surface of the glass substrate 11d which confronts the liquid crystal portion (12b) side. The pattern electrode 13a and the overall-surface electrode 14a may be positionally replaced by each other, and the pattern electrode 13b and the overall-surface electrode 14b may be positionally replaced by each other.

Figure 16B:
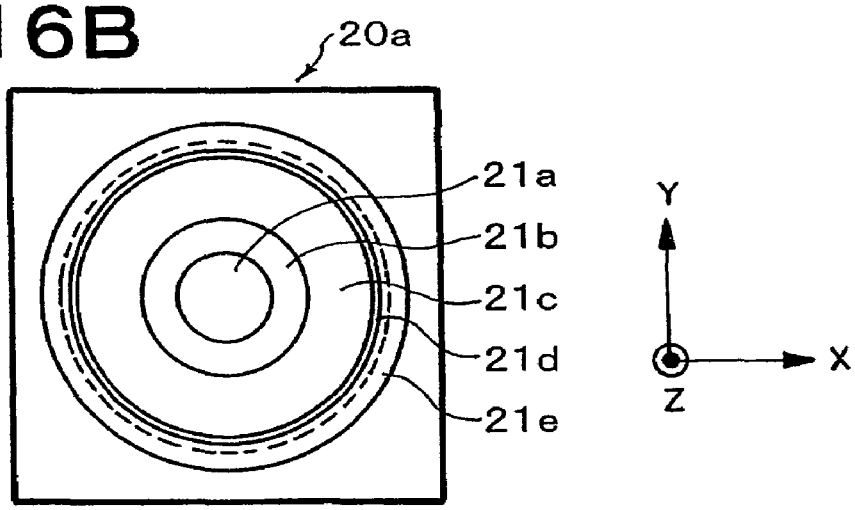
FIG. 16B is a diagram showing an electrode pattern formed for a pattern electrode when the substrate-thickness deviation of an optical recording medium is corrected by using the liquid crystal panel.

In FIG. 2A, the X direction, the Y direction and the Z direction correspond to the radial direction of the disc 7, the tangent line direction of the disc 7 and the optical axis direction, respectively. The same electrode pattern as shown in FIG. 16B is formed for the pattern electrodes 13a and 13b when the substrate-thickness deviation is corrected by using the liquid crystal panel 4a. The correction amount of the wave aberration is represented by "0" in each of the areas 21a, 21e of FIG. 16B, by α in each of the areas 21b, 21d and by 2α in the area 21c (α represents a constant).

Figure 16C:
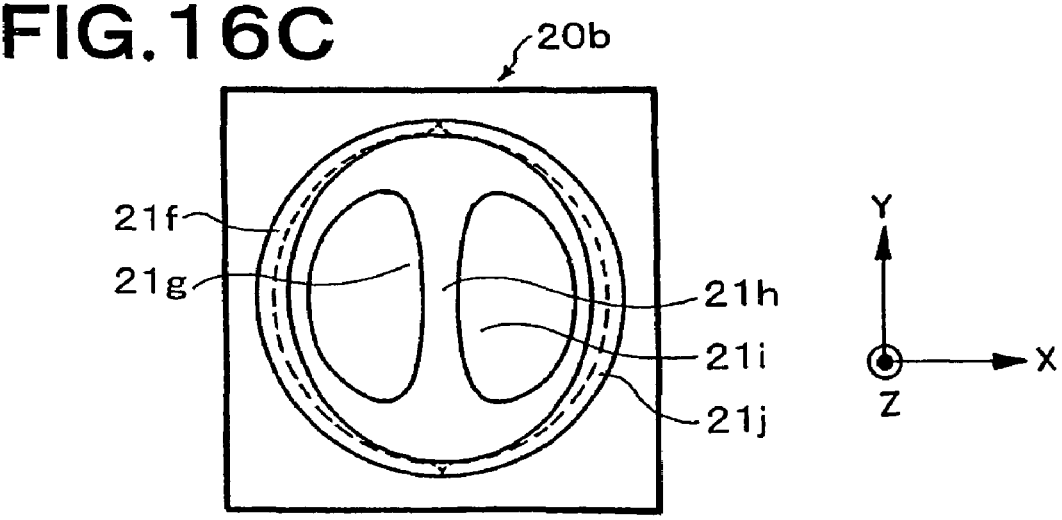
FIG. 16C is a diagram showing an electrode pattern formed for a pattern electrode when the tilt in the radial direction of the optical recording medium is corrected by using the liquid crystal panel.
Figure 17A:
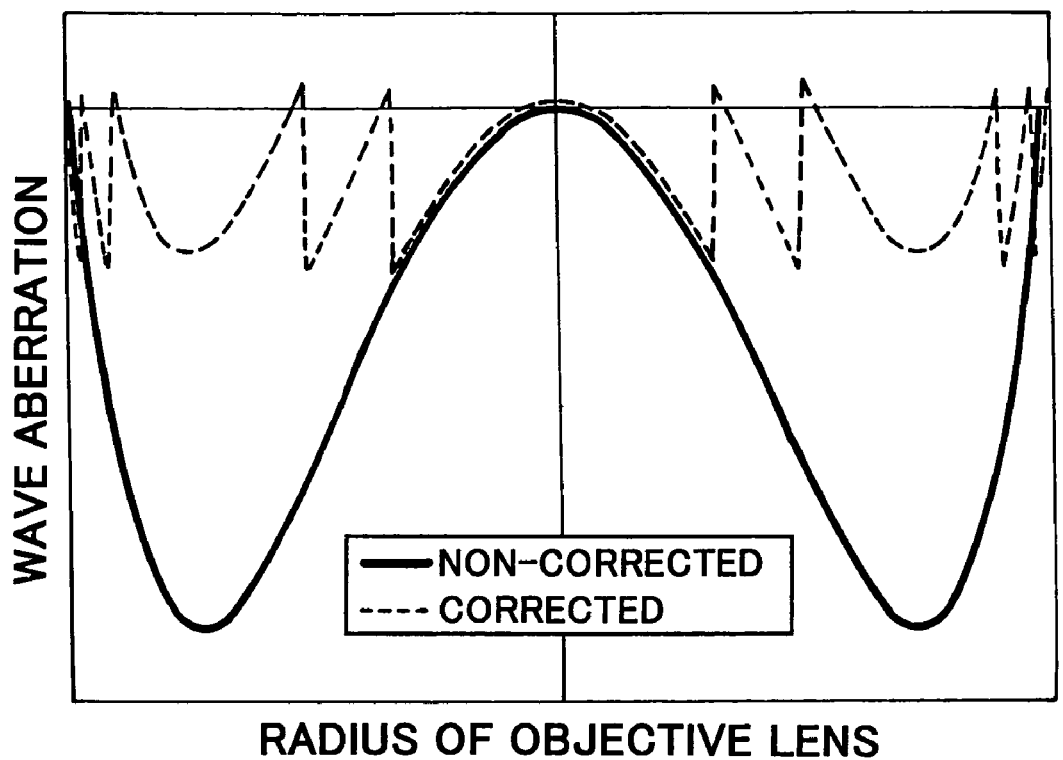
FIG. 17A is a diagram showing a calculation example of spherical aberration caused by the substrate-thickness deviation on the cross section in the radial direction of the optical recording medium.
Figure 17B:
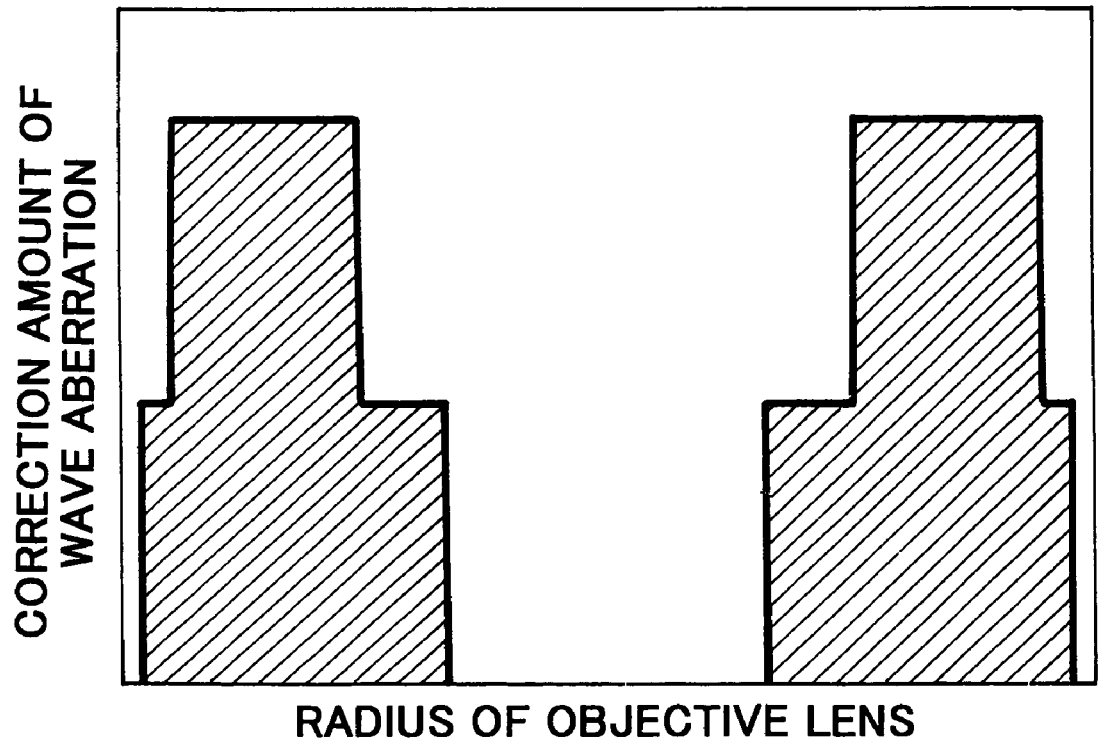
FIG. 17B is a diagram showing a calculation example of wave aberration on the cross section in the radial direction of the optical recording medium, which is produced by the liquid crystal panel.
Figure 18A:
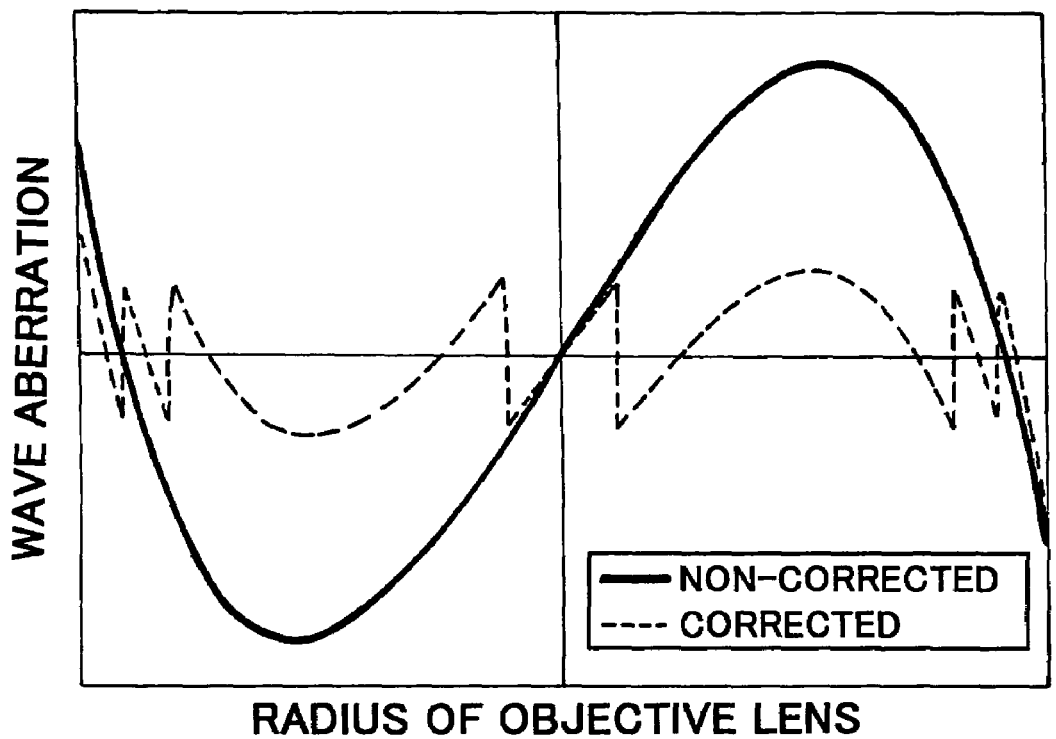
FIG. 18A is a diagram showing a calculation example of coma aberration on the cross section in the radial direction of the optical recording medium, which is caused by the tilt in the radial direction.
Figure 18B:
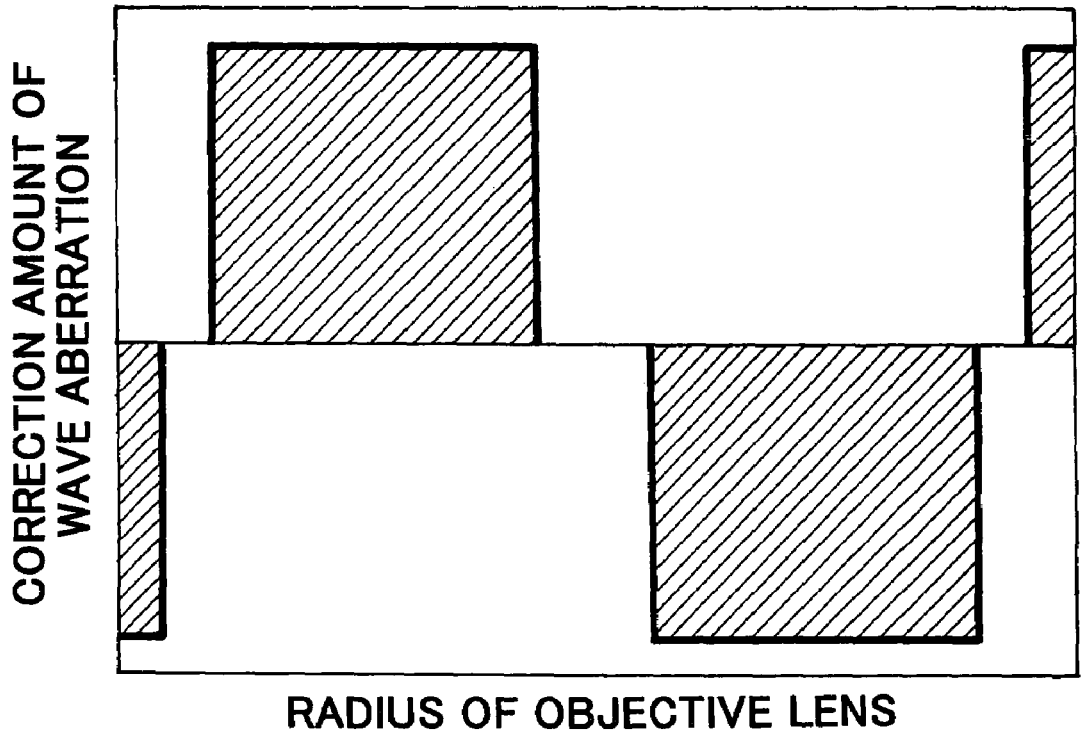
FIG. 18B is a diagram showing a calculation example of wave aberration on the cross section in the radial direction of the optical recording medium, which is produced by the liquid crystal panel.
Figure 19A:
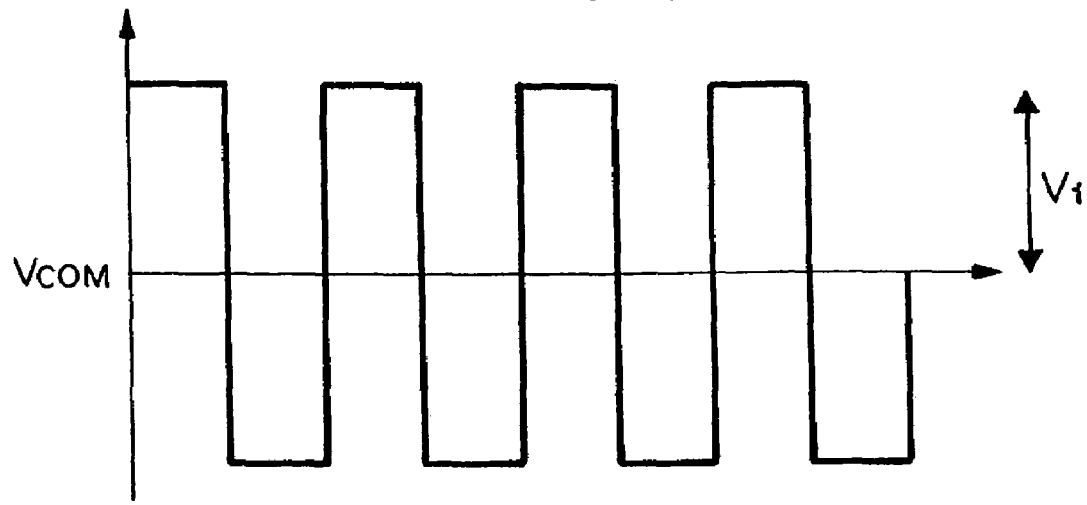
FIGS. 19A to 19C are diagrams showing a method of driving the liquid crystal panel in the conventional optical head device.
Figure 19B:
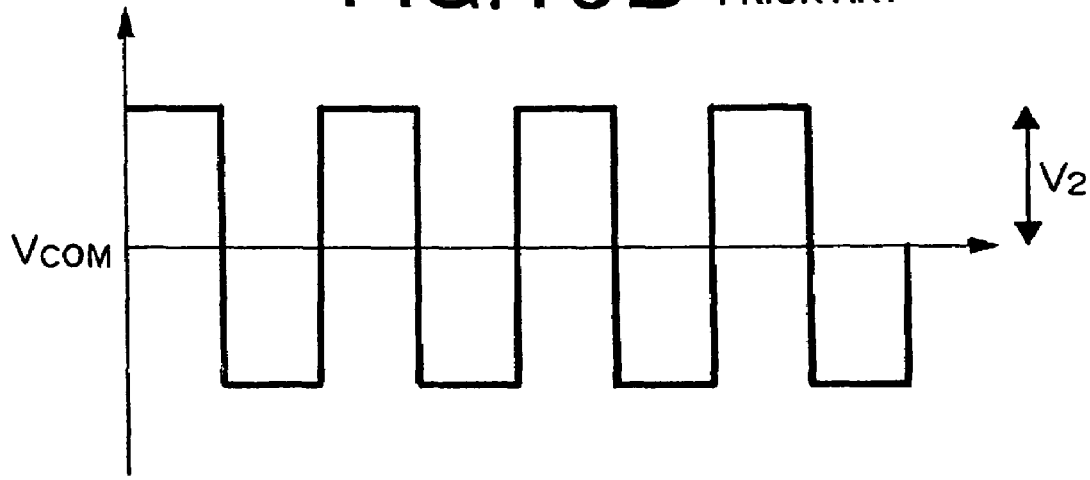
Figure 19C:
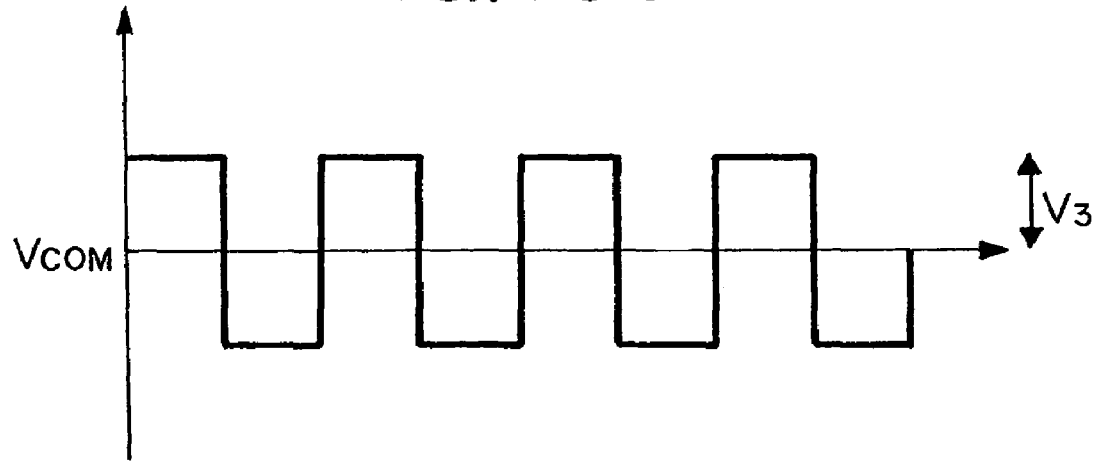
Figure 20:
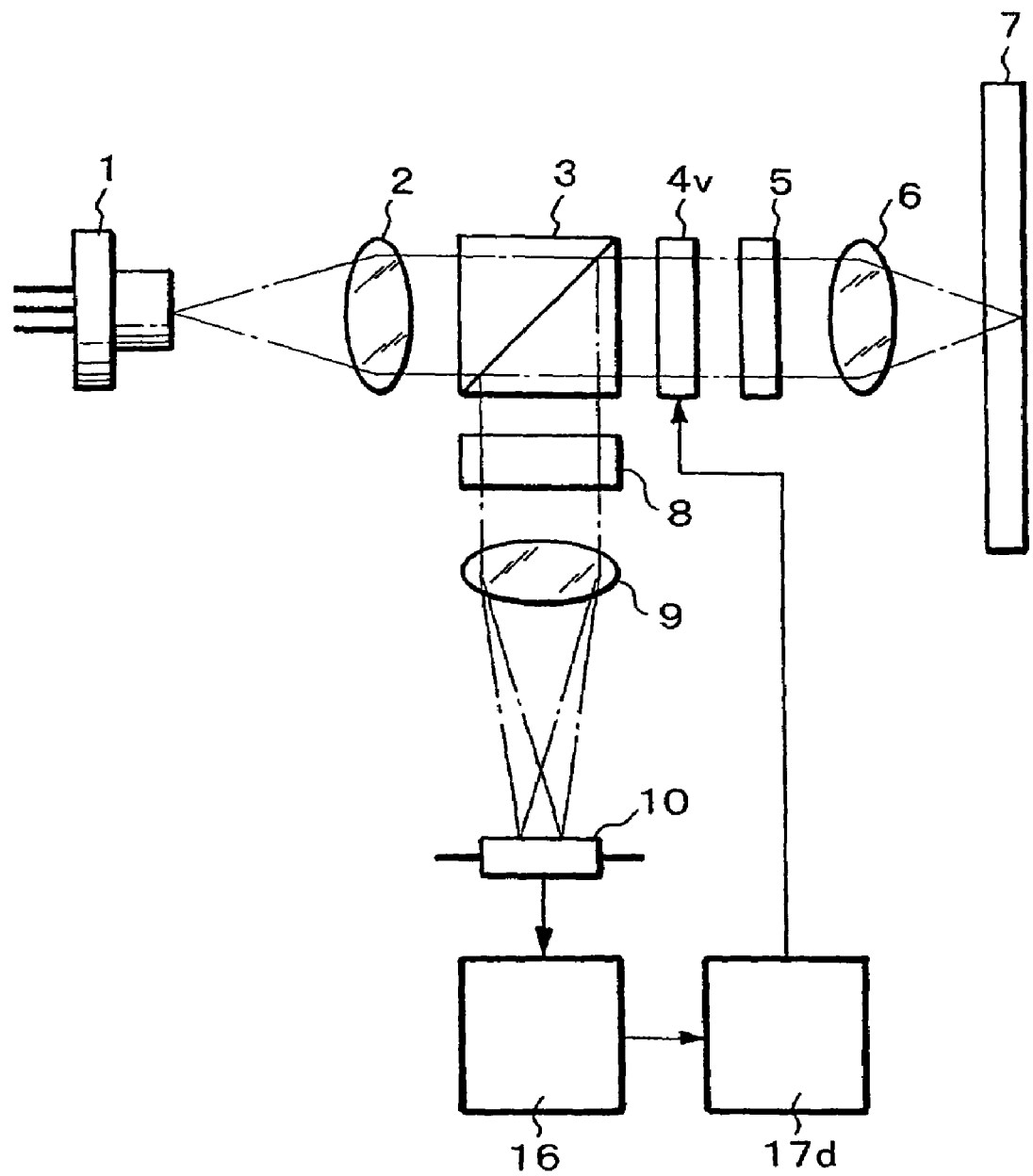
FIG. 20 is a diagram showing the construction of a conventional optical information recording/reproducing device.
Figure 21A:
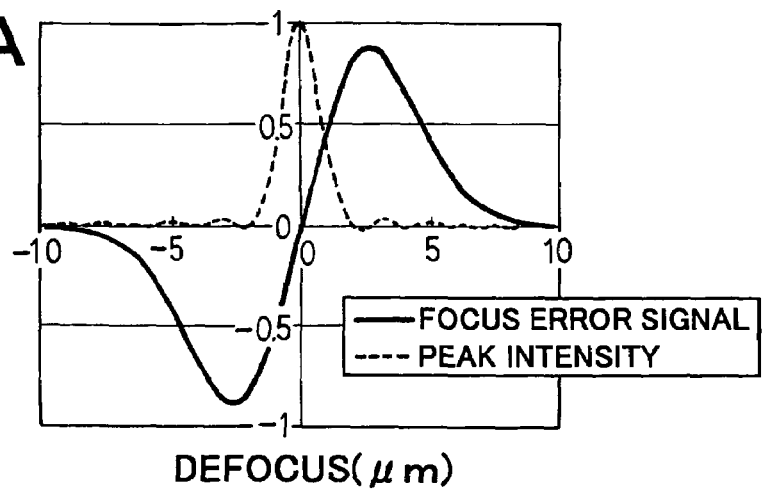
Figure 21B:
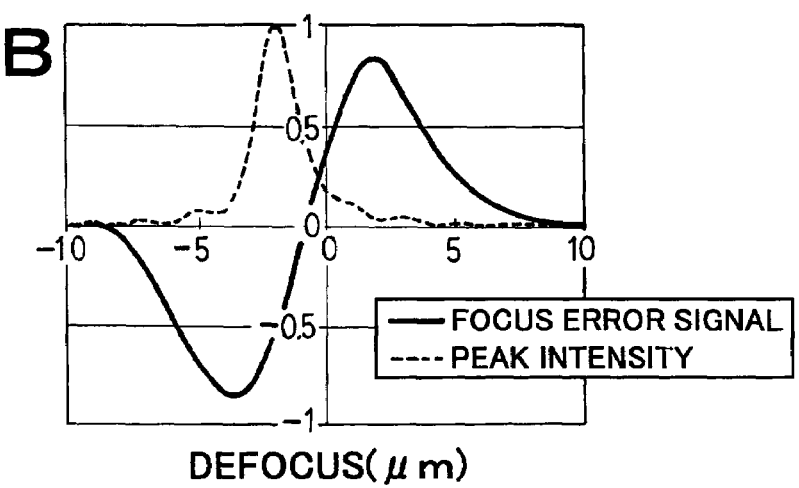
Figure 21C:
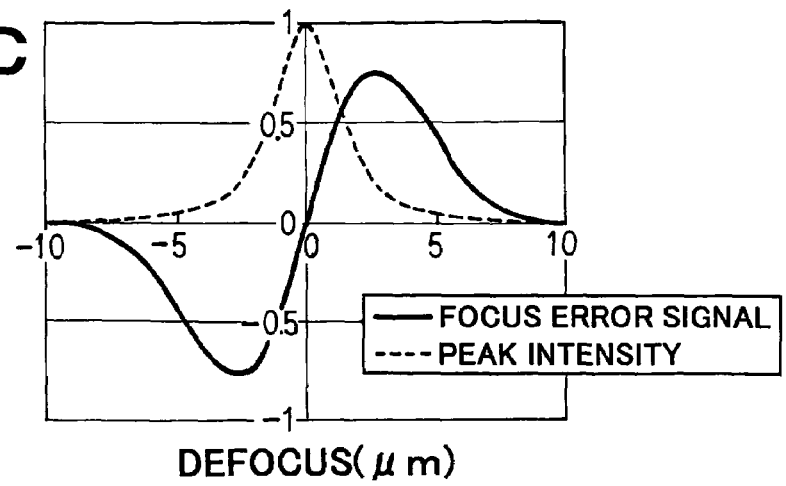

The same electrode pattern as shown in FIG. 16C is formed for the pattern electrodes 13a and 13b when the tilt in the radial direction of the disc 7 is corrected by using the liquid crystal panel 4a. The correction amount of the wave aberration is represented by −β in each of the areas 21f, 21i of FIG. 16C, by "0" in the area 21h and by β in each of the areas 21g, 21j (β represents a constant).

The liquid crystal panel 4a may be manufactured by forming an assembly of the glass substrates 11a, 11b and the liquid crystal portion 12a and an assembly of the glass substrates 11c, 11d and the liquid crystal portion 12b separately from each other and then attaching the assemblies to each other, and thus the manufacturing process is easy.

Next, a method of driving the liquid crystal panel 4a will be described.

A constant voltage $V_{COM}$ is applied to the overall-surface electrodes 14a, 14b of FIG. 2A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode pattern formed for the pattern electrodes 13a, 13b of FIG. 2A. At this time, the difference of the correction amount of the wave aberration between the first and second areas is proportional to ($V_1-V_2$), and the difference of the correction amount of the wave aberration between the second and third areas is proportional to ($V_2-V_3$).

In the case where the substrate-thickness deviation of the disc 7 is corrected, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value α. Further, in the case where the tilt in the radial direction of the disc 7 is corrected, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value β.

The liquid crystal molecules of the liquid crystal portion 12a of FIG. 2A are nematic liquid crystal molecules. These liquid crystal molecules are oriented in the X direction of FIG. 2A when $V_1$ to $V_3$ are equal to zero, oriented in the Z direction of FIG. 2A when $V_1$ to $V_3$ are sufficiently large, and oriented in the intermediate direction between the X and Z directions of FIG. 2A when $V_1$ to $V_3$ are equal to the intermediate values. The liquid crystal molecules of the liquid crystal portion 12a have birefringence characteristic and thus the refractive indexes thereof to ordinary light and extraordinary light are represented by $n_o$, $n_e$. Further, the refractive indexes thereof to the emission light from the semiconductor laser 1 and the reflection light from the disc 7 are represented by $n_f$, $n_r$.

The emission light from the semiconductor laser 1 is linearly polarized light parallel to the X direction of FIG. 2A. Therefore, when $V_1$ to $V_3$ are equal to zero, the light emitted from the liquid crystal portion 12a has only an extraordinary light component. On the other hand, when $V_1$ to $V_3$ are sufficiently large, the light emitted from the liquid crystal portion 12a has only an ordinary light component. When $V_1$ to $V_3$ are equal to the intermediate values, the light emitted from the liquid crystal portion 12a has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode pattern formed for the pattern electrode 13a of FIG. 2A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of the liquid crystal portion 12a, and λ represents the wavelength of the incident light.

On the other hand, the reflection light from the disc 7 is linearly polarized light parallel to the Y direction of FIG. 2A, so that the reflection light becomes ordinary light irrespective of the values of $V_1$ to $V_3$. Accordingly, $n_r$ is equal to $n_o$ irrespective of the values of $V_1$ to $V_3$. At this time, the difference of the correction amount of the wave aberration in the first and second areas of the electrode pattern formed for the pattern electrode 13a of FIG. 2A and the difference of the correction amount of the wave aberration in the second and third areas are equal to zero.

The liquid crystal molecules of the liquid crystal portion 12b of FIG. 2A are nematic liquid crystal molecules. These molecules are oriented in the Y direction of FIG. 2A when $V_1$ to $V_3$ are equal to zero, oriented in the Z direction when $V_1$ to $V_3$ are sufficiently large, and oriented in the intermediate direction between the Y and Z directions when $V_1$ to $V_3$ are equal to the intermediate values. Since the liquid crystal molecules of the liquid crystal portion 12b have birefringence characteristic, the refractive indexes thereof for ordinary light and extraordinary light are represented by $n_o$, $n_e$, respectively.

Further, the refractive indexes thereof for the emission light from the semiconductor laser 1 and the reflection light from the disc 7 are represented by $n_f$, $n_r$, respectively. The emission light from the semiconductor laser 1 is linearly polarized light parallel to the X direction of FIG. 2A, and thus it becomes ordinary light irrespective of the values of $V_1$ to $V_3$. Accordingly, $n_f$ is equal to $n_o$ irrespective of the values of $V_1$ to $V_3$. At this time, both of the difference of the correction amount of the wave aberration between the first and second areas of the electrode pattern formed for the pattern electrode 13b of FIG. 2A and the difference of the correction amount of the wave aberration between the second and third areas are equal to zero. On the other hand, the reflection light from the disc 7 is linearly polarized light parallel to the Y direction of FIGS. 2A and 2B, so that it becomes extraordinary light when $V_1$ to $V_3$ are equal to zero, ordinary light when $V_1$ to $V_3$ are sufficiently large, and also have both the extraordinary light component and the ordinary light component when $V_1$ to $V_3$ are equal to the intermediate values. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode pattern formed for the pattern electrode 13b of FIG. 2A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12b and $\lambda$ represents the wavelength of the incident light.

That is, by driving the liquid crystal panel 4a, the liquid crystal panel 4a produces the wave aberration for both of the light traveling on the going path (the emission light from the semiconductor laser 1) and the light traveling on the returning path (the reflection light from the disc 7) likewise.

In the case where the substrate-thickness deviation of the disc 7 is corrected in this embodiment, if the following equation: $(n_{f1}-n_{f2})h/\lambda=(n_{f2}-n_{f3})h/\lambda=\alpha$ is satisfied for the liquid crystal portion 12a of FIG. 2A and the following equation: $(n_{r1}-n_{r2})h/\lambda=(n_{r2}-n_{r3})h/\lambda=\alpha$ is satisfied for the liquid crystal portion 12b of FIG. 2A, the wave aberration due to the substrate-thickness deviation and the wave aberration produced by the liquid crystal panel 4a are likewise canceled by each other for the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4a, a focus error signal having no offset can be achieved.

Further, in the case where the tilt in the radial direction of the disc 7 is corrected in this embodiment, if the following equation: $(n_{f1}-n_{f2})h/\lambda=(n_{f2}-n_{f3})h/\lambda=\beta$ is satisfied for the liquid crystal portion 12a of FIG. 2A and the following equation: $(n_{r1}-n_{r2})h/\lambda=(n_{r2}-n_{r3})h/\lambda=\beta$ is satisfied for the liquid crystal portion 12b of FIG. 2A, the wave aberration due to the tilt in the radial direction and the wave aberration produced by the liquid crystal panel 4a are likewise canceled by each other for the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4a, a focus error signal having high sensitivity can be achieved.

A second embodiment of the optical head device of the present invention is achieved by using a liquid crystal panel 4b in place of the liquid crystal penal 4a shown in FIG. 2A in the first embodiment of the optical head device of the present invention shown in FIG. 1.

Figure 2B:
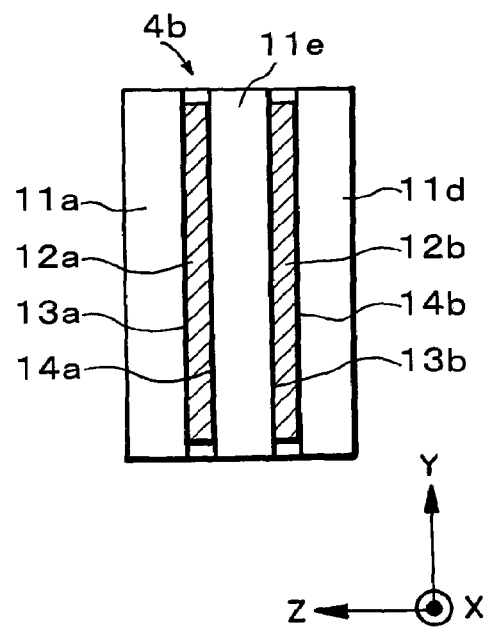
FIG. 2B is a diagram showing the construction of a liquid crystal panel of a second embodiment of the optical head device according to the present invention.

FIG. 2B shows the construction of the liquid crystal panel 4b.

The liquid crystal panel 4b is achieved by using a single glass substrate 11e in place of the glass substrates 11b, 11c of the liquid crystal panel 4a shown in FIG. 2A. The liquid crystal panel 4b is designed to be thinner in thickness than the liquid crystal panel 4a shown in FIG. 2A, and thus it is suitably used to miniaturize the optical head device.

A method of driving the liquid crystal panel 4b of this embodiment is the same as the liquid crystal panel 4a of the first embodiment of the optical head device according to the present invention. In this embodiment, even when the substrate-thickness deviation of the disc 7 or the tilt in the radial direction of the disc 7 is corrected by using the liquid crystal panel 4b, a focus error signal having no offset and high sensitivity can be achieved by the same reason as described in the first embodiment of the optical head device according to the present invention.

A third embodiment of the optical head device according to the present invention is achieved by using a liquid crystal panel 4c in place of the liquid crystal panel 4a shown in FIG. 2A in the first embodiment of the optical head device of the present invention shown in FIG. 1.

Figure 3A:
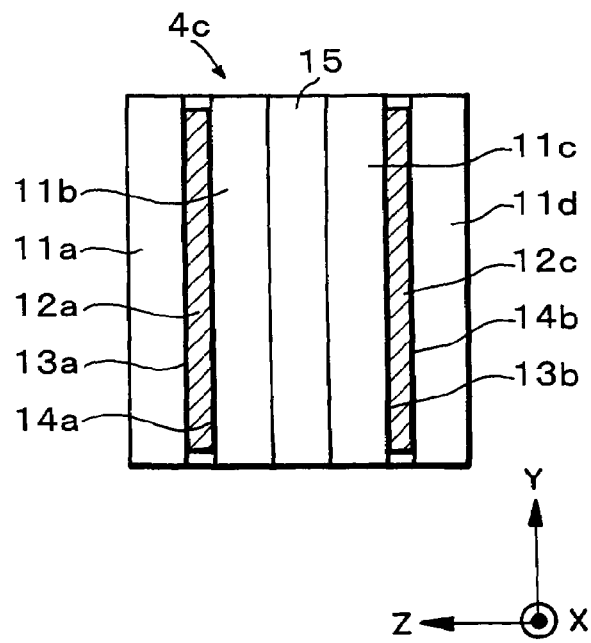
FIG. 3A is a diagram showing the construction of a liquid crystal panel of a third embodiment of the optical head device according to the present invention.

FIG. 3A shows the construction of the liquid crystal panel 4c.

The liquid crystal panel 4c is constructed such that a liquid crystal portion 12a is sandwiched between glass substrates 11a and 11b, a liquid crystal portion 12c is sandwiched between glass substrates 11c and 11d, and the surfaces of the glass substrates 11b, 11c which are respectively located at the opposite side to the liquid crystal portion (12a, 12c) side are attached to both the surfaces of a half wavelength plate 15 respectively. A pattern electrode 13a is formed on the surface of the glass substrate 11a which confronts the liquid crystal portion 12a, an overall-surface electrode 14a is formed on the surface of the glass substrate 11b which confronts the liquid crystal portion 12a, a pattern electrode 13b is formed on the surface of the glass substrate 11c which confronts the liquid crystal portion 12c, and an overall-surface electrode 14b is formed on the surface of the glass substrate 11d which confronts the liquid crystal portion 12c. The pattern electrode 13a and the overall-surface electrode 14a may be positionally replaced by each other, and the pattern electrode 13b and the overall-surface electrode 14b may be positionally replaced by each other.

The X direction, the Y direction and the Z direction in FIG. 3A corresponds to the radial direction of the disc 7, the tangent line direction of the disc 7 and the optical axis direction, respectively. The direction of the optical axis of the half wavelength plate 15 intersects to the X and Y directions at an angle of ±45 degrees. The electrode pattern formed for the pattern electrode 13a, 13b when the substrate-thickness deviation of the disc 7 is corrected by using the liquid crystal panel 4c is shown in FIG. 16B. The correction amount of the wave aberration is represented by "0" in each of the areas 21a, 21e of FIG. 16B, by $\alpha$ in each of the areas 21b, 21d and by $2\alpha$ in the area 21c ($\alpha$ represents a constant). Further, the electrode pattern formed for the pattern electrode 13a, 13b when the tilt in the radial direction of the disc 7 is corrected by using the liquid crystal panel 4c is shown in FIG. 16C. The correction amount of the wave aberration is represented by $-\beta$ in each of the areas 21f, 21i of FIG. 16C, by "0" in the area 21h and by $\beta$ in each of the areas 21g, 21j ($\beta$ represents a constant).

Next, a method of driving the liquid crystal panel 4c will be described.

A constant voltage $V_{COM}$ is applied to the overall-surface electrodes 14a, 14b of FIG. 3A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode pattern formed for the pattern electrodes 13a, 13b of FIG. 3A. At this time, the difference of the correction amount of the wave aberration between the first and second areas is proportional to ($V_1-V_2$), and the difference of the correction amount of the wave aberration between the second and third areas is proportional to ($V_2-V_3$).

In the case where the substrate-thickness deviation of the disc 7 is corrected, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and areas 21b, 21d and the difference of the correction amount of the wave aberration between the areas 21b, 21d and areas 21a, 21e can be set to the same value $\alpha$. Further, in the case where the tilt in the radial direction of the disc 7 is corrected, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value $\beta$.

The liquid crystal molecules of the liquid crystal portion 12a of FIG. 3A are nematic liquid crystal molecules. These liquid crystal molecules are oriented in the X direction of FIG. 3A when $V_1$ to $V_3$ are equal to zero, oriented in the Z direction of FIG. 3A when $V_1$ to $V_3$ are sufficiently large, and oriented in the intermediate direction between the X and Z directions of FIG. 3A when $V_1$ to $V_3$ are equal to the intermediate values. The liquid crystal molecules of the liquid crystal portion 12a have birefringence characteristic and thus the refractive indexes thereof to ordinary light and extraordinary light are represented by $n_o$, $n_e$. Further, the refractive indexes thereof to the emission light from the semiconductor laser 1 and the reflection light from the disc 7 are represented by $n_f$, $n_r$.

The emission light from the semiconductor laser 1 is linearly polarized light parallel to the X direction of FIG. 3A. Therefore, when $V_1$ to $V_3$ are equal to zero, the light emitted from the liquid crystal portion 12a has only an extraordinary light component. On the other hand, when $V_1$ to $V_3$ are sufficiently large, the light emitted from the liquid crystal portion 12a has only an ordinary light component. When $V_1$ to $V_3$ are equal to the intermediate values, the light emitted from the liquid crystal portion 12a has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode pattern formed for the pattern electrode 13a of FIG. 3A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of the liquid crystal portion 12a, and $\lambda$ represents the wavelength of the incident light.

On the other hand, the reflection light from the disc 7 is linearly polarized light parallel to the Y direction of FIG. 3A, so that the reflection light becomes ordinary light irrespective of the values of $V_1$ to $V_3$. Accordingly, $n_r$ is equal to $n_o$ irrespective of the values of $V_1$ to $V_3$. At this time, the difference of the correction amount of the wave aberration in the first and second areas of the electrode pattern formed for the pattern electrode 13a of FIG. 3A and the difference of the correction amount of the wave aberration in the second and third areas are equal to zero.

The liquid crystal molecules of the liquid crystal portion 12c of FIG. 3A are nematic liquid crystal molecules. These molecules are oriented in the X direction of FIG. 3A when $V_1$ to $V_3$ are equal to zero, oriented in the Z direction when $V_1$ to $V_3$ are sufficiently large, and oriented in the intermediate direction between the X and Z directions when $V_1$ to $V_3$ are equal to the intermediate values. Since the liquid crystal molecules of the liquid crystal portion 12c have birefringence characteristic, the refractive indexes thereof for ordinary light and extraordinary light are represented by $n_o$, $n_e$, respectively. Further, the refractive indexes thereof for the emission light from the semiconductor laser 1 and the reflection light from the disc 7 are represented by $n_f$, $n_r$, respectively. The emission light from the semiconductor laser 1 is linearly polarized light parallel to the Y direction of FIG. 3A by the action of the half wavelength plate 15, and thus it becomes ordinary light irrespective of the values of $V_1$ to $V_3$. Accordingly, $n_f$ is equal to $n_o$ irrespective of the values of $V_1$ to $V_3$. At this time, both of the difference of the correction amount of the wave aberration between the first and second areas of the electrode pattern formed for the pattern electrode 13b of FIG. 3A and the difference of the correction amount of the wave aberration between the second and third areas are equal to zero. On the other hand, the reflection light from the disc 7 is linearly polarized light parallel to the X direction of FIG. 3A by the action of the half wavelength plate 15, so that it becomes extraordinary light when $V_1$ to $V_3$ are equal to zero, ordinary light when $V_1$ to $V_3$ are sufficiently large, and also have both the extraordinary light component and the ordinary light component when $V_1$ to $V_3$ are equal to the intermediate values. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode pattern formed for the pattern electrode 13b of FIG. 3A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12c and $\lambda$ represents the wavelength of the incident light.

That is, by driving the liquid crystal panel 4c, the liquid crystal panel 4c produces the wave aberration for both of the light traveling on the going path (the emission light from the semiconductor laser 1) and the light traveling on the returning path (the reflection light from the disc 7) likewise. The liquid crystal panel 4c can be mass-produced at low price because the assembly comprising the glass substrates 11a, 11b and the liquid crystal portion 12a and the assembly comprising the glass substrates 11c, 11d and the liquid crystal portion 12c have the same construction.

In the case where the substrate-thickness deviation of the disc 7 is corrected in this embodiment, if the following equation: $(n_{f1}-n_{f2})h/\lambda=(n_{f2}-n_{f3})h/\lambda=\alpha$ is satisfied for the liquid crystal portion 12a of FIG. 3A and the following equation: $(n_{r1}-n_{r2})h/\lambda=(n_{r2}-n_{r3})h/\lambda=\alpha$ is satisfied for the liquid crystal portion 12c of FIG. 3A, the wave aberration due to the substrate-thickness deviation and the wave aberration produced by the liquid crystal panel 4c are likewise canceled by each other for the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4c, a focus error signal having no offset can be achieved.

Further, in the case where the tilt in the radial direction of the disc 7 is corrected in this embodiment, if the following equation: $(n_{f1}-n_{f2})h/\lambda=(n_{f2}-n_{f3})h/\lambda=\beta$ is satisfied for the liquid crystal portion 12a of FIG. 3A and the following equation: $(n_{r1}-n_{r2})h/\lambda=(n_{r2}-n_{r3})h/\lambda=\beta$ is satisfied for the liquid crystal portion 12c of FIG. 3A, the wave aberration due to the tilt in the radial direction and the wave aberration produced by the liquid crystal panel 4c are likewise canceled by each other for the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4c, a focus error signal having high sensitivity can be achieved.

A fourth embodiment of the optical head device of the present invention is achieved by using a liquid crystal panel 4d in place of the liquid crystal penal 4a shown in FIG. 2A in the first embodiment of the optical head device of the present invention shown in FIG. 1.

Figure 3B:
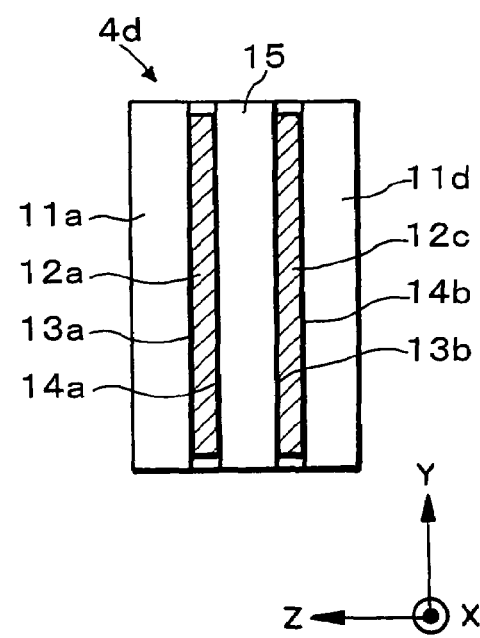
FIG. 3B is a diagram showing the construction of a liquid crystal panel of a fourth embodiment of the optical head device according to the present invention.

FIG. 3B shows the construction of the liquid crystal panel 4d.

The liquid crystal panel 4d is achieved by using a single half wavelength plate 15 in place of the glass substrates 11b, 11c and the half wavelength plate 15 of the liquid crystal panel 4c shown in FIG. 3A. The liquid crystal panel 4d can be designed to be thinner in thickness than the liquid crystal panel 4c shown in FIG. 3A, and thus it is suitable to miniaturize the optical head device.

The driving method of the liquid crystal panel 4d of this embodiment is the same as the liquid crystal panel 4c of the third embodiment of the optical head device of the present invention. According to this embodiment, even when the substrate-thickness deviation of the disc 7 or the tilt in the radial direction of the disc 7 is corrected by using the liquid crystal panel 4d, a focus error signal having no offset and high sensitivity can be achieved by the same reason as described in the third embodiment of the optical head device of the present invention.

Figure 4:
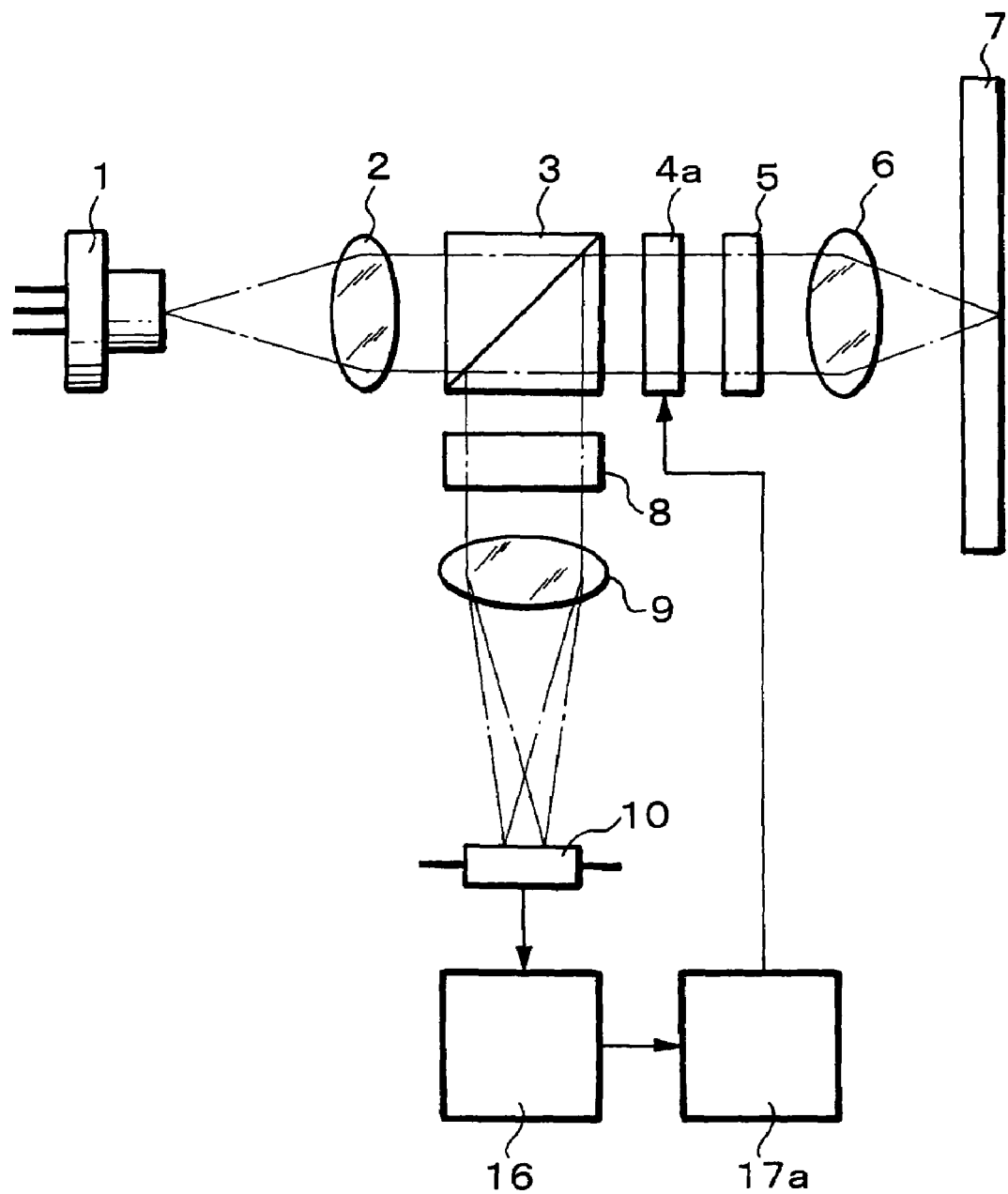
FIG. 4 is a diagram showing a first embodiment of an optical information recording/reproducing device according to the present invention.

FIG. 4 shows a first embodiment of an optical information recording/reproducing device according to the present invention.

The optical information recording/reproducing device of this embodiment is achieved by adding the first embodiment of the optical head device shown in FIG. 1 with a reproduction signal detecting circuit 16 and a liquid crystal panel driving circuit 17a. The reproduction signal detecting circuit 16 detects a reproduction signal recorded on the disc 7 on the basis of the output of each photodetecting portion of the photodetector 10. The liquid crystal panel driving circuit 17a drives the liquid crystal panel 4a so that the amplitude of the reproduction signal is maximum, whereby the substrate-thickness deviation of the disc 7 or the tilt in the radial direction of the disc 7 is corrected and the harmful influence on the recording/reproducing characteristic is excluded.

Other embodiments of the optical information recording/reproducing device of the present invention may be achieved by adding the reproduction signal detecting circuit and the liquid crystal panel driving circuit to each of the second to fourth embodiments of the optical head device according to the present invention.

Figure 5:
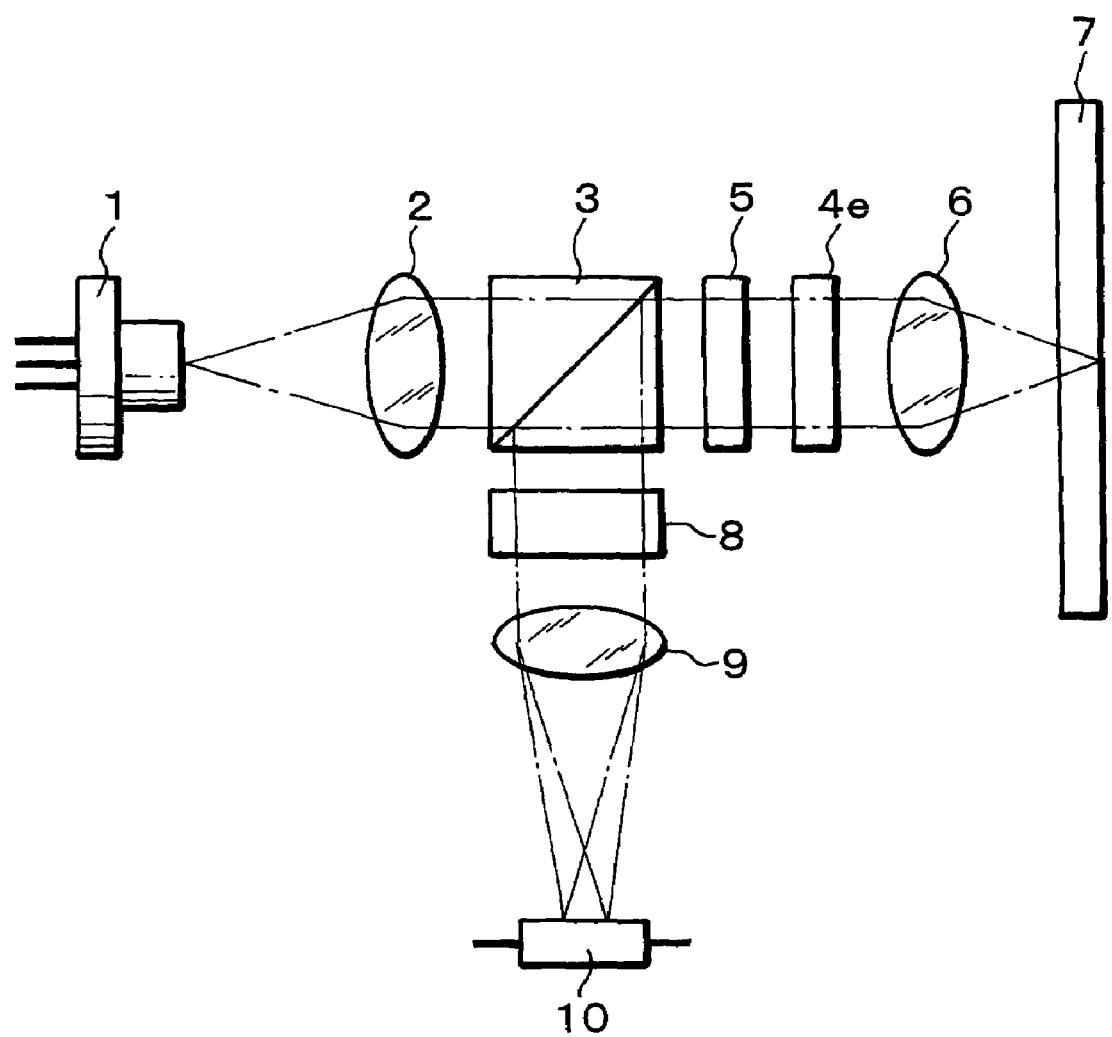
FIG. 5 is a diagram showing a fifth embodiment of the optical head device according to the present invention.

FIG. 5 shows a fifth embodiment of the optical head device according to the present invention.

The optical head device of this embodiment is achieved by using a liquid crystal panel 4e in place of the liquid crystal panel 4v shown in FIG. 16A in the conventional optical head device shown in FIG. 14 and also positionally replacing the liquid crystal panel 4e and the quarter wavelength plate 5. The pattern of the photodetecting portion of the photodetector 10 in this embodiment is shown in FIG. 15. According to this embodiment, a focus error signal, a track error signal and a reproduction signal recorded on the disc 7 are achieved in the same manner as described for the conventional optical head device.

The construction of the liquid crystal panel 4e of this embodiment has the same construction as the liquid crystal panel 4v shown in FIG. 16A in the conventional optical head device. The electrode pattern formed for the pattern electrode 13m when the substrate-thickness deviation of the disc 7 is corrected by using the liquid crystal panel 4e is shown in FIG. 16B. The correction amount of the wave aberration is represented by "0" in each of the areas 21a, 21e of FIG. 16B, by $\alpha$ in each of the areas 21b, 21d and by $2\alpha$ in the area 21c ($\alpha$ represents a constant).

Further, the electrode pattern formed for the pattern electrode 13m when the tilt in the radial direction of the disc 7 is corrected by using the liquid crystal panel 4e is shown in FIG. 16C. The correction amount of the wave aberration is represented by $-\beta$ in each of the areas 21f, 21i of FIG. 16C, by "0" in the area 21h and by $\beta$ in each of the areas 21g, 21j ($\beta$ represents a constant).

Next, a method of driving the liquid crystal panel 4e will be described.

A constant voltage $V_{COM}$ is applied to the overall-surface electrodes 14g of FIG. 16A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode pattern formed for the pattern electrode 13m of FIG. 16A. At this time, the difference of the correction amount of the wave aberration between the first and second areas is proportional to $(V_1-V_2)$, and the difference of the correction amount of the wave aberration between the second and third areas is proportional to $(V_2-V_3)$.

In the case where the substrate-thickness deviation of the disc 7 is corrected, if the area 21c of FIG. 16B is set to the first area, the areas 21b, 21d are set to the second area, the areas 21a, 21c are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value $\alpha$. Further, in the case where the tilt in the radial direction of the disc 7 is corrected, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value $\beta$.

The liquid crystal molecules of the liquid crystal portion 12n of FIG. 16A are twisted nematic liquid crystal. When $V_1$ to $V_3$ are equal to zero, the orientation direction of the liquid crystal molecules is rotated at a predetermined period around the Z axis along the Z direction on the XY plane of FIGS. 16A to 16C. When $V_1$ to $V_3$ are sufficiently large, the liquid crystal molecules are oriented in the Z direction of FIGS. 16A to 16C. When $V_1$ to $V_3$ are equal to the intermediate values, the orientation direction is rotated at a predetermined period around the Z axis along the Z direction in the intermediate direction between the XY plane and the Z direction of FIGS. 16A to 16C.

The liquid crystal molecules of the liquid crystal portion 12n have birefringence characteristic, and thus the refractive indexes thereof for ordinary light and extraordinary light are represented by $n_o$ and $n_e$. Further, the refractive indexes of the liquid crystal molecules for the emission light from the semiconductor laser 1 and the reflection light from the disc 7 are represented by $n_f$, $n_r$, respectively. The emission light from the semiconductor laser 1 is counterclockwisely circularly polarized or clockwisely circularly polarized by the action of the quarter wavelength plate 5. Therefore, when $V_1$ to $V_3$ are equal to zero, the emission light has both of the ordinary light component and the extraordinary light component, and the ratio thereof is 1:1. When $V_1$ to $V_3$ are sufficiently large, the emission light becomes ordinary light. When $V_1$ to $V_3$ are equal to the intermediate values, the emission light has both of the extraordinary light component and the ordinary light component, however, the ordinary light component has a higher rate than the extraordinary light component. Accordingly, $n_f$ varies between $(n_e+n_o)/2$ and $n_o$ in correspondence with the values of $V_1$ to $V_3$. At this time, representing the values of $n_f$ corresponding to $V_1$ to $V_3$ by $n_{f1}$ to $n_{f3}$, the difference of the correction amount of the wave aberration between the first and second areas of the electrode pattern formed for the pattern electrode 13m of FIG. 16A and the difference of the correction amount of the wave aberration between the second and third areas are equal to $(n_{f1}-n_{f2})h/\lambda$, $(n_{f2}-n_{f3})h/\lambda$, respectively when they are standardized by the wavelength of the incident light. Here, h represents the thickness of the liquid crystal portion 12n, and $\lambda$ represents the wavelength of the incident light.

The reflection light from the disc 7 is clockwisely circularly polarized or counterclockwisely circularly polarized by the action of the quarter wavelength plate 5. Therefore, when $V_1$ to $V_3$ are equal to zero, the reflection light has both of the extraordinary light component and the ordinary light component, and the ratio of the components is 1:1. When $V_1$ to $V_3$ are sufficiently large, the reflection light becomes ordinary light, and when $V_1$ to $V_3$ are equal to the intermediate values, the reflection light has both of the extraordinary light component and the ordinary light component, however, the ordinary light component has a higher rate than the extraordinary light component. Accordingly, $n_r$ varies between $(n_e+n_o)/2$ and $n_o$ in correspondence with the values of $V_1$ to $V_3$. At this time, representing the values of $n_r$ corresponding to $V_1$ to $V_3$ by $n_{r1}$ to $n_{r3}$, the difference of the correction amount of the wave aberration between the first and second areas of the electrode pattern formed for the pattern electrode 13m of FIG. 16A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12n, and $\lambda$ represents the wavelength of the incident light.

That is, by driving the liquid crystal panel 4e, the liquid crystal panel 4e produces the wave aberration for both of the light traveling on the going path (the emission light from the semiconductor laser 1) and the light traveling on the returning path (the reflection light from the disc 7) likewise. The liquid crystal panel 4e is simpler in structure than the liquid crystal panels 4a, 4b shown in FIGS. 2A and 2B and the liquid crystal panels 4c, 4d shown in FIGS. 3A and 3B, and thus it can be more easily manufactured. Further, it is more suitable for miniaturize the optical head device because it can be reduced in thickness. However, since the liquid crystal molecules of the liquid crystal portion 12n constituting the liquid crystal panel 4e are twisted nematic liquid crystal molecules, they have a disadvantage that the response speed is lower than the nematic liquid crystal molecules.

In the case where the substrate-thickness deviation of the disc 7 is corrected in this embodiment, if the following equations: $(n_{f1}-n_{f2})h/\lambda=(n_{f2}-n_{f3})h/\lambda=\alpha$ and $(n_{r1}-n_{r2})h/\lambda=(n_{r2}-n_{r3})h/\lambda=\alpha$ are satisfied for the liquid crystal portion 12n of FIG. 16A, the wave aberration due to the substrate-thickness deviation and the wave aberration produced by the liquid crystal panel 4e are likewise canceled by each other for the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4e, a focus error signal having no offset can be achieved.

Further, in the case where the tilt in the radial direction of the disc 7 is corrected in this embodiment, if the following equations: $(n_{f1}-n_{f2})h/\lambda=(n_{f2}-n_{f3})h/\lambda=\beta$ and $(n_{r1}-n_{r2})h/\lambda=(n_{r2}-n_{r3})h/\lambda=\beta$ are satisfied for the liquid crystal portion 12n of FIG. 16A, the wave aberration due to the tilt in the radial direction and the wave aberration produced by the liquid crystal panel 4e are likewise canceled by each other for the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4e, a focus error signal having high sensitivity can be achieved.

Figure 6:
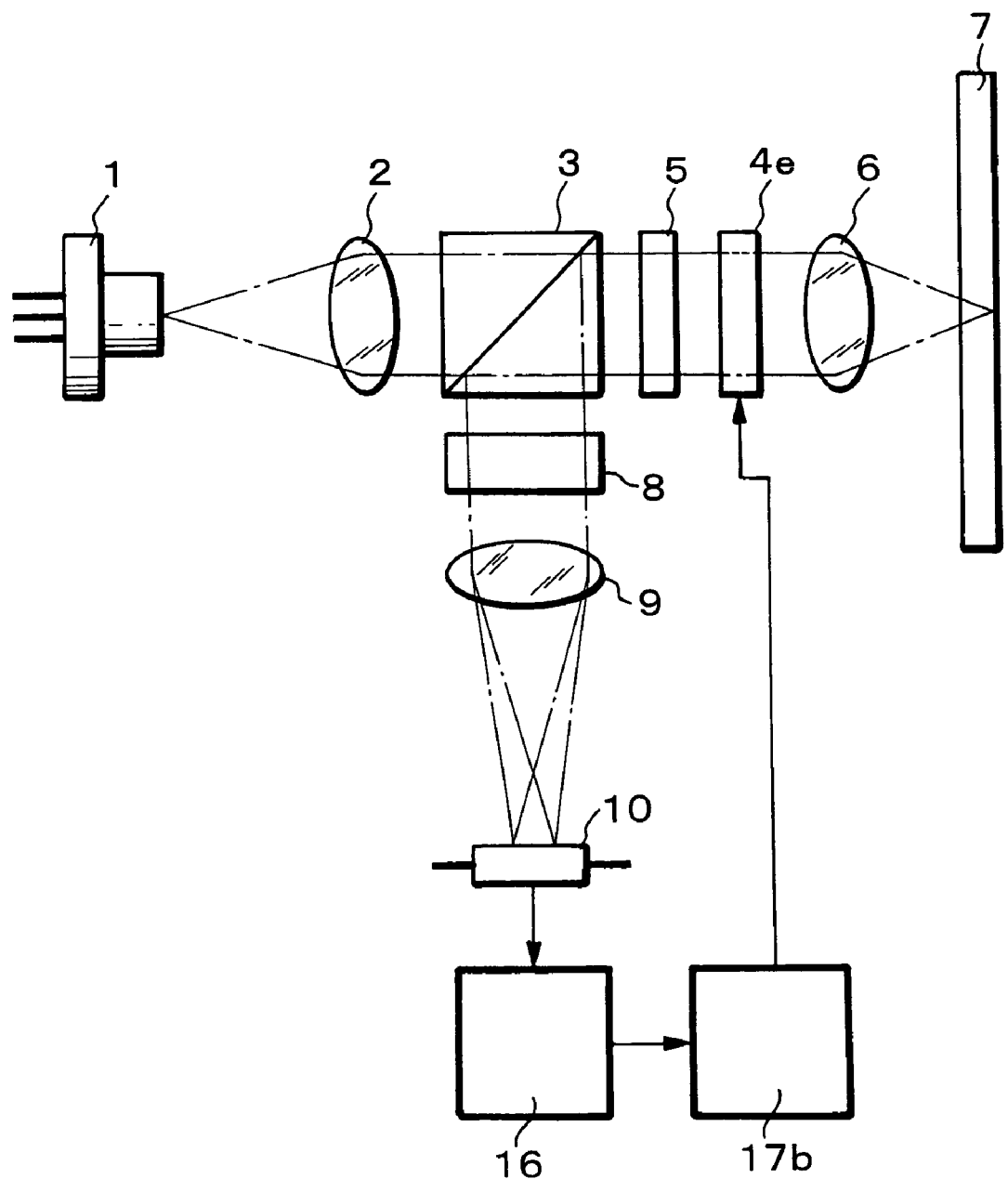
FIG. 6 is a diagram showing a second embodiment of the optical information recording/reproducing device according to the present invention.

FIG. 6 shows a second embodiment of the optical information recording/reproducing device according to the present invention.

The optical information recording/reproducing device of this embodiment is achieved by adding the fifth embodiment of the optical head device shown in FIG. 5 with a reproduction signal detecting circuit 16 and a liquid crystal panel driving circuit 17b. The reproduction signal detecting circuit 16 detects the reproduction signal recorded on the disc 7 on the basis of the output of each photodetecting portion of the photodetector 10. The liquid crystal panel driving circuit 17b drives the liquid crystal panel 4e so that the amplitude of the reproduction signal is maximum, whereby the substrate-thickness deviation of the disc 7 or the tilt in the radial direction of the disc 7 can be corrected and the harmful influence on the recording/reproducing characteristic can be excluded.

Figure 7:
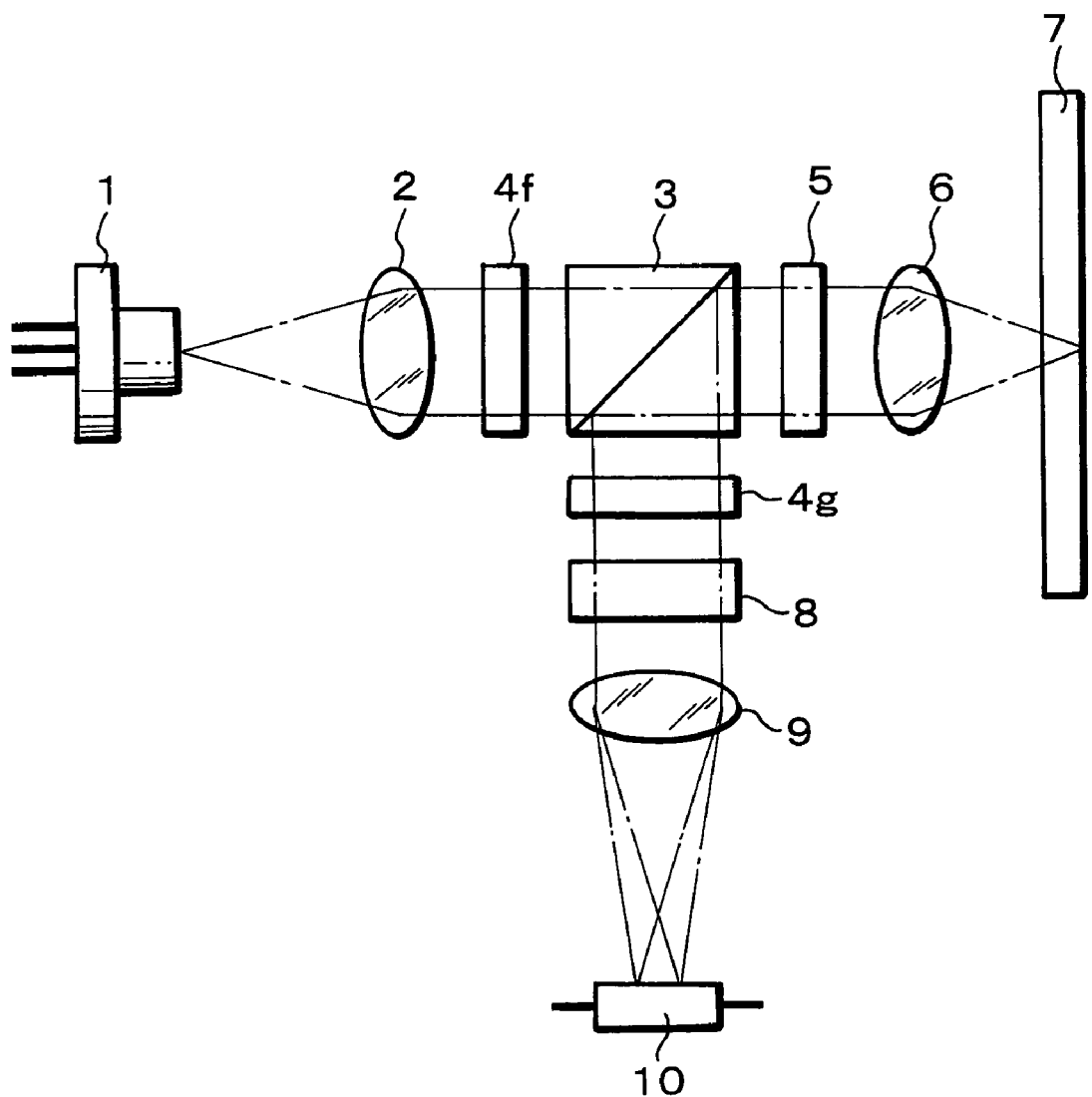
FIG. 7 is a diagram showing a sixth embodiment of the optical head device according to the present invention.

FIG. 7 shows a sixth embodiment of the optical head device according to the present invention.

The optical head device of this embodiment is achieved by providing a liquid crystal panel 4f between the collimator lens 2 and the polarization beam splitter 3 in place of the liquid crystal panel 4v shown in FIG. 16A of the conventional optical head device shown in FIG. 14, and further providing a liquid crystal panel 4g between the polarization beam splitter 3 and the cylindrical lens 8.

The liquid crystal panels 4f, 4g may be provided between the polarization beam splitter 3 and the quarter wavelength plate 5. The pattern of the photodetecting portion of the photodetector 10 of this embodiment is shown in FIG. 15. In this embodiment, the focus error signal, the track error signal and the reproduction signal recorded on the disc 7 can be achieved by the same method as described for the conventional optical head device.

The construction of the liquid crystal panels 4f, 4g in this embodiment is the same as the liquid crystal panel 4v shown in FIG. 16A of the conventional optical head. The electrode pattern formed for the pattern electrode 13m when the substrate-thickness deviation of the disc 7 is corrected by using the liquid crystal panel 4f, 4g is shown in FIG. 16B. The correction amount of the wave aberration is represented by "0" in each of the areas 21a, 21e of FIG. 16B, by α in each of the areas 21b, 21d and by 2α in the area 21c (α represents a constant). The electrode pattern formed for the pattern electrode 13m when the tilt in the radial direction of the disc 7 is corrected by using the liquid crystal panels 4f, 4g is shown in FIG. 16C. The correction amount of the wave aberration is represented by $-\beta$ in each of the areas 21f, 21i of FIG. 16C, by "0" in the area 21h and by β in each of the areas 21g, 21j (β represents a constant).

Next, a method of driving the liquid crystal panels 4f, 4g will be described.

A constant voltage $V_{COM}$ is applied to the overall-surface electrode 14g of FIG. 16A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode pattern formed for the pattern electrode 13m of FIG. 16A. At this time, the difference of the correction amount of the wave aberration between the first and second areas is proportional to ($V_1-V_2$), and the difference of the correction amount of the wave aberration between the second and third areas is proportional to ($V_2-V_3$).

In the case where the substrate-thickness deviation of the disc 7 is corrected, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value α. Further, in the case where the tilt in the radial direction of the disc 7 is corrected, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value β.

The liquid crystal molecules of the liquid crystal portion 12n of FIG. 16A which constitutes the liquid crystal panel 4f are nematic liquid crystal molecules. These molecules are oriented in the X direction of FIGS. 16A to 16C when $V_1$ to $V_3$ are equal to zero, oriented in the Z direction of FIGS. 16 to 16C when $V_1$ to $V_3$ are sufficiently large, and oriented in the intermediate direction between the X and Z directions of FIGS. 16A to 16C when $V_1$ to $V_3$ are equal to the intermediate values. The liquid crystal molecules of the liquid crystal portion 12n have birefringence characteristic and thus the refractive indexes thereof for ordinary light and extraordinary light are represented by $n_o$, $n_e$. Further, the refractive index thereof for the emission light from the semiconductor laser 1 is represented by $n_f$.

The emission light from the semiconductor laser 1 is linearly polarized light parallel to the X direction of FIGS. 16A to 16C. Therefore, when $V_1$ to $V_3$ are equal to zero, the light emitted from the liquid crystal panel 4f has only an extraordinary light component. On the other hand, when $V_1$ to $V_3$ are sufficiently large, the light emitted from the liquid crystal panel 4f has only an ordinary light component. When $V_1$ to $V_3$ are equal to the intermediate values, the light emitted from the liquid crystal panel 4f has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode pattern formed for the pattern electrode 13a of FIG. 3A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of the liquid crystal portion 12n, and λ represents the wavelength of the incident light. The reflection light from the disc 7 does not pass through the liquid crystal panel 4f.

The liquid crystal molecules of the liquid crystal portion 12n of FIG. 16A which constitutes the liquid crystal panel 4g are nematic liquid crystal molecules. These molecules are oriented in the Y direction of FIGS. 16A to 16C when $V_1$ to $V_3$ are equal to zero, oriented in the Z direction of FIGS. 16A to 16C when $V_1$ to $V_3$ are sufficiently large, and oriented in the intermediate direction between the Y and Z directions of FIGS. 16A to 16C when $V_1$ to $V_3$ are equal to the intermediate values. Since the liquid crystal molecules of the liquid crystal portion 12n have birefringence characteristic, the refractive indexes thereof for ordinary light and extraordinary light are represented by $n_o$, $n_e$, respectively. Further, the refractive index thereof for the reflection light from the disc 7 is represented by $n_r$. The emission light from the semiconductor laser 1 does not pass through the liquid crystal panel 4g. The reflection light from the disc 7 is linearly polarized light parallel to the Y direction of FIGS. 16A to 16C, and thus it becomes extraordinary light when $V_1$ to $V_3$ are equal to zero. When $V_1$ to $V_3$ are sufficiently large, the reflection light becomes ordinary light, and when $V_1$ to $V_3$ are equal to the intermediate values, the reflection light has both of the extraordinary light component and the ordinary light component. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode pattern formed for the pattern electrode 13m of FIG. 16A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12n and λ represents the wavelength of the incident light.

That is, by driving the liquid crystal panel 4f, the liquid crystal panel 4f produces the wave aberration for the light traveling on the going path (the emission light from the semiconductor laser 1), and by driving the liquid crystal panel 4g, the liquid crystal panel 4g likewise produces the wave aberration for the light traveling on the returning path (the reflection light from the disc 7). The liquid crystal panels 4f, 4g are simpler in structure than the liquid crystal panels 4a, 4b shown in FIGS. 2A and 2B and the liquid crystal panels 4c, 4d shown in FIG. 3, and thus it can be more easily manufactured.

In the case where the substrate-thickness deviation of the disc 7 is corrected in this embodiment, if the following equation: $(n_{f1}-n_{f2})h/\lambda=(n_{f2}-n_{f3})h/\lambda=\alpha$ is satisfied for the liquid crystal portion 12n (shown in FIG. 16A) constituting the liquid crystal panel 4f and the following equation: $(n_{r1}-n_{r2})h/\lambda=(n_{r2}-n_{r3})h/\lambda=\alpha$ is satisfied for the liquid crystal portion 12n (shown in FIG. 16A) constituting the liquid crystal panel 4g, the wave aberration due to the substrate-thickness deviation and the wave aberration produced by the liquid crystal panel 4f are canceled by each other for the light traveling on the going path, and also the wave aberration due to the substrate-thickness deviation and the wave aberration produced by the liquid crystal panel 4g are canceled by each other for the light traveling on the returning path. Therefore, no wave aberration remains for the light traveling on the returning path and thus the phase distribution does not vary. Accordingly, even when the substrate-thickness deviation of the disc 7 is corrected by using the liquid crystal panels 4f, 4g, a focus error signal having no offset can be achieved.

Further, in the case where the tilt in the radial direction of the disc 7 is corrected in this embodiment, if the following equation: $(n_{f1}-n_{f2})h/\lambda=(n_{f2}-n_{f3})h/\lambda=\beta$ is satisfied for the liquid crystal portion 12n of FIG. 16A constituting the liquid crystal panel 4f and the following equation: $(n_{r1}-n_{r2})h/\lambda=(n_{r2}-n_{r3})h/\lambda=\beta$ is satisfied for the liquid crystal portion 12n of FIG. 16A constituting the liquid crystal panel 4g, the wave aberration due to the tilt in the radial direction and the wave aberration produced by the liquid crystal panel 4f are canceled by each other for the light traveling on the going path, and also the wave aberration due to the tilt in the radial direction and the wave aberration produced by the liquid crystal panel 4g are canceled by each other for the light traveling on the returning path. Therefore, no wave aberration remains for the light traveling on the returning path and thus the phase distribution does not vary. Accordingly, even when the tilt in the radial direction of the disc 7 is corrected by using the liquid crystal panels 4f, 4g, a focus error signal having high sensitivity can be achieved.

Figure 8:
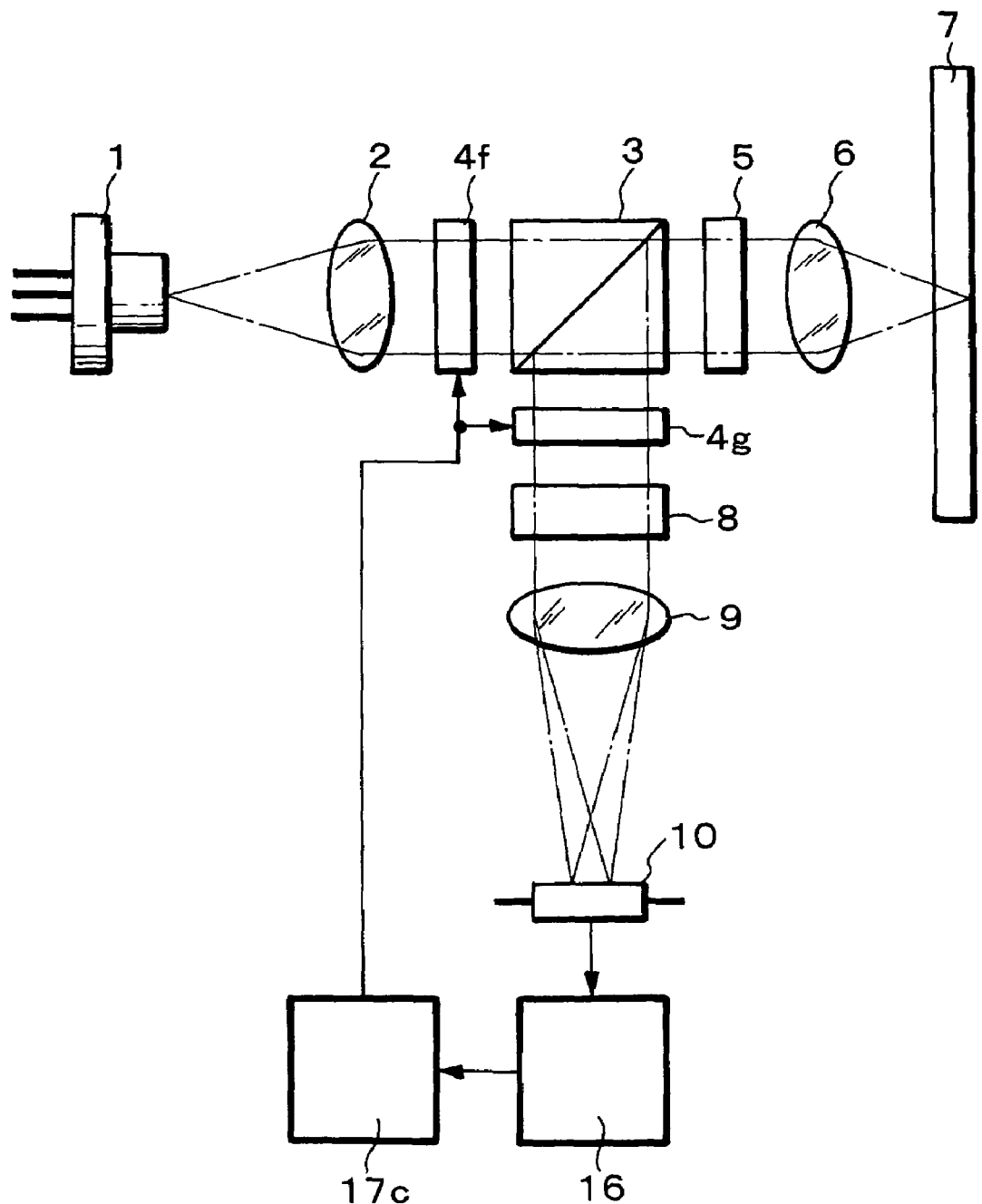
FIG. 8 is a diagram showing a third embodiment of the optical information recording/reproducing device according to the present invention.

FIG. 8 shows a third embodiment of the optical information recording/reproducing device according to the present invention.

The optical information recording/reproducing device of this embodiment is achieved by adding a reproduction signal detecting circuit 16 and a liquid crystal panel driving circuit 17c to the sixth embodiment of the optical head device shown in FIG. 7.

The reproduction signal detecting circuit 16 detects the reproduction signal recorded on the disc 7 on the basis of the output of each photodetecting portion of the photodetector 10. The liquid crystal panel driving circuit 17c drives the liquid crystal panels 4f, 4g so that the amplitude of the reproduction signal is maximum, whereby the substrate-thickness deviation of the disc 7 or the tilt in the radial direction of the disc 7 can be corrected, and the harmful influence on the recording/reproducing characteristic can be excluded.

A seventh embodiment of the optical head device of the present invention is achieved by using a liquid crystal panel 4h in place of the liquid crystal panel 4a shown in FIG. 2A in the first embodiment of the optical head device shown in FIG. 1.

Figure 9A:
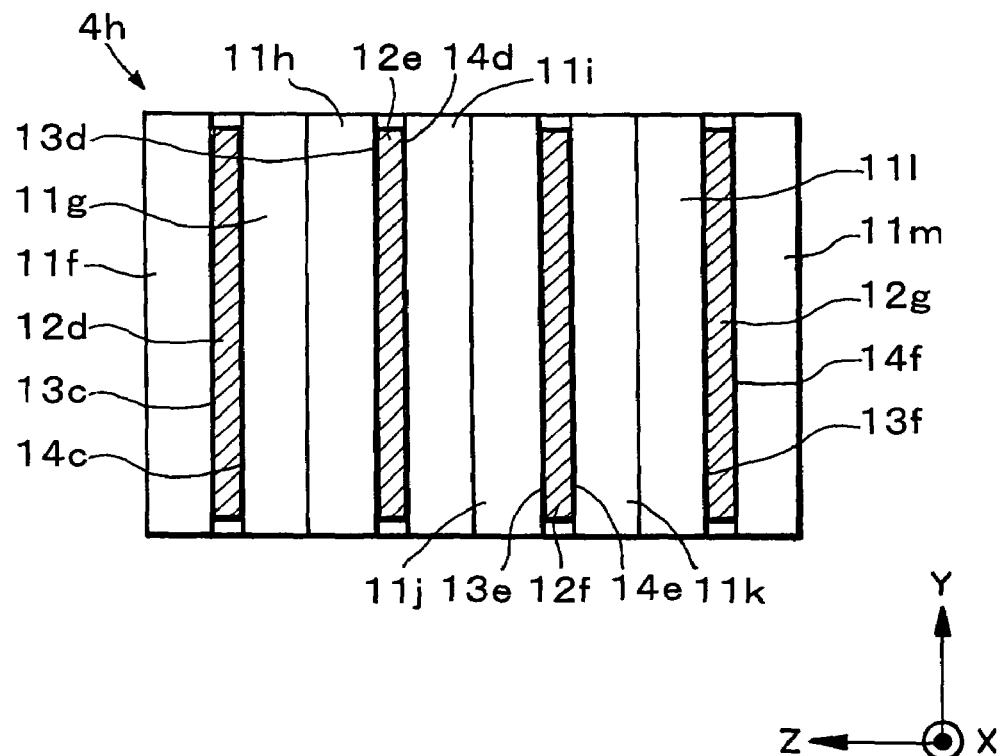
FIG. 9A is a diagram showing the construction of a liquid crystal panel of a seventh embodiment of the optical head device according to the present invention.

FIG. 9A shows the construction of the liquid crystal panel 4h.

The liquid crystal panel 4h is constructed such that a liquid crystal portion 12d is sandwiched between glass substrates 11f, 11g, a liquid crystal portion 12e is sandwiched between glass substrates 11h, 11i, and a liquid crystal portion 12f is sandwiched between glass substrates 11j, 11k, a liquid crystal portion 12g is sandwiched between glass substrates 11l, 11m, the surfaces of the glass substrates 11g, 11h which are respectively located at the opposite side to the liquid crystal portion (12d, 12e) side are attached to each other, the surfaces of the glass substrates 11i, 11j which are respectively located at the opposite side to the liquid crystal portion (12e, 12f) are attached to each other, and the surfaces of the glass substrates 11k, 11l which are respectively located at the opposite side to the liquid crystal portion (12f, 12g) are attached to each other. A pattern electrode 13c is formed on the surface of the glass substrate 11f which confronts the liquid crystal portion 12d, an overall-surface electrode 14c is formed on the surface of the glass substrate 11g which confronts the liquid crystal portion 12d, a pattern electrode 13d is formed on the surface of the glass substrate 11h which confronts the liquid crystal portion 12e, an overall-surface electrode 14d is formed on the surface of the glass substrate 11i which confronts the liquid crystal portion 12e, a pattern electrode 13e is formed on the surface of the glass substrate 11j which confronts the liquid crystal portion 12f, an overall-surface electrode 14e is formed on the surface of the glass substrate 11k which confronts the liquid crystal portion 12f, a pattern electrode 13f is formed on the surface of the glass substrate 11l which confronts the liquid crystal portion 12g, and an overall-surface electrode 14f is formed on the surface of the glass substrate 11m which confronts the liquid crystal portion 12g.

The pattern electrode 13c and the overall electrode 14c may be positionally replaced by each other, the pattern electrode 13d and the overall-surface electrode 14d may be positionally replaced by each other, the pattern electrode 13e and the overall-surface electrode 14e may be positionally replaced by each other, and the pattern electrode 13f and the overall-surface electrode 14f may be positionally replaced by each other.

In FIG. 9A, the X direction, the Y direction and the Z direction correspond to the radial direction of the disc 7, the tangent line direction of the disc 7 and the optical axis direction, respectively. By using the liquid crystal panel 4h, the substrate-thickness deviation of the disc 7 and the tilt in the radial direction of the disc 7 can be corrected at the same time. The electrode pattern formed for pattern electrodes 13c, 13e for the correction of the substrate-thickness deviation of the disc 7 is shown in FIG. 16B. The correction amount of the wave aberration is represented by "0" in each of the areas 21a, 21e of FIG. 16B, by $\alpha$ in each of the areas 21b, 21d and by $2\alpha$ in the area 21c ($\alpha$ represents a constant).

Further, the electrode pattern formed for pattern electrodes 13d, 13f for the correction of the tilt in the radial direction of the disc 7 is shown in FIG. 16C. The correction amount of the wave aberration is represented by $-\beta$ in each of the areas 21f, 21i of FIG. 16C, by "0" in the area 21h and by $\beta$ in each of the areas 21g, 21j ($\beta$ represents a constant). The liquid crystal panel 4h may be manufactured by forming an assembly of the glass substrates 11f, 11g and the liquid crystal portion 12d, an assembly of the glass substrates 11h, 11i and the liquid crystal portion 12e, an assembly of the glass substrates 11j, 11k and the liquid crystal portion 12f and an assembly of the glass substrates 11l, 11m and the liquid crystal portion 12g separately from one another and then attaching these assemblies to one another. Therefore, the liquid crystal panel 4h can be more easily manufactured.

Next, a method of driving the liquid crystal panel 4h will be described above.

A constant voltage $V_{COM}$ is applied to the overall-surface electrodes 14c to 14f shown in FIG. 9A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of each electrode pattern formed for the pattern electrodes 13c to 13f of FIG. 9A. At this time, the difference of the correction amount of the wave aberration between the first and second areas is proportional to ($V_1-V_2$), and the difference of the correction amount of the wave aberration between the second and third areas is proportional to ($V_2-V_3$).

In the case where the substrate-thickness deviation of the disc 7 is corrected, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and areas 21a, 21e can be set to the same value $\alpha$. Further, in the case where the tilt in the radial direction of the disc 7 is corrected, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value $\beta$.

The liquid crystal molecules of the liquid crystal portions 12d, 12e of FIG. 9A are nematic liquid crystal molecules. These liquid crystal molecules are oriented in the X direction of FIG. 9A when $V_1$ to $V_3$ are equal to zero, oriented in the Z direction of FIG. 9A when $V_1$ to $V_3$ are sufficiently large, and oriented in the intermediate direction between the X and Z directions of FIG. 9A when $V_1$ to $V_3$ are equal to the intermediate values.

The liquid crystal molecules of the liquid crystal portions 12d, 12e have birefringence characteristic and thus the refractive indexes thereof to ordinary light and extraordinary light are represented by $n_o$, $n_e$. Further, the refractive indexes thereof for the emission light from the semiconductor laser 1 and the reflection light from the disc 7 is represented by $n_f$, $n_r$.

The emission light from the semiconductor laser 1 is linearly polarized light parallel to the X direction of FIG. 9A. Therefore, when $V_1$ to $V_3$ are equal to zero, the light emitted from the liquid crystal portions 12d, 12e becomes extraordinary light. On the other hand, when $V_1$ to $V_3$ are sufficiently large, the light emitted from the liquid crystal portions 12d, 12e becomes ordinary light. When $V_1$ to $V_3$ are equal to the intermediate values, the light emitted from the liquid crystal portions 12d, 12e has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode pattern formed for the pattern electrodes 13c, 13d of FIG. 9A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of each of the liquid crystal portions 12d, 12e, and $\lambda$ represents the wavelength of the incident light.

On the other hand, the reflection light from the disc 7 is linearly polarized light parallel to the Y direction of FIG. 9A, so that the reflection light becomes ordinary light irrespective of the values of $V_1$ to $V_3$. Accordingly, $n_r$ is equal to $n_o$ irrespective of the values of $V_1$ to $V_3$. At this time, the difference of the correction amount of the wave aberration in the first and second areas of the electrode patterns formed for the pattern electrodes 13c, 13d of FIG. 9A and the difference of the correction amount of the wave aberration in the second and third areas are equal to zero.

The liquid crystal molecules of the liquid crystal portions 12f, 12g of FIG. 9A are nematic liquid crystal molecules. These molecules are oriented in the Y direction of FIG. 9A when $V_1$ to $V_3$ are equal to zero, oriented in the Z direction of FIG. 9A when $V_1$ to $V_3$ are sufficiently large, and oriented in the intermediate direction between the Y and Z directions of FIG. 9A when $V_1$ to $V_3$ are equal to the intermediate values. Since the liquid crystal molecules of the liquid crystal portions 12f, 12g have birefringence characteristic, the refractive indexes thereof for ordinary light and extraordinary light are represented by $n_o$, $n_e$, respectively. Further, the refractive indexes thereof for the emission light from the semiconductor laser 1 and the reflection light from the disc 7 are represented by $n_f$, $n_r$.

The emission light from the semiconductor laser 1 is linearly polarized light parallel to the X direction of FIG. 9A, so that the emission light becomes ordinary light irrespective of the values of $V_1$ to $V_3$. Accordingly, $n_f$ is equal to $n_o$ irrespective of the values of $V_1$ to $V_3$. At this time, the difference of the correction amount of the wave aberration in the first and second areas of the electrode patterns formed for the pattern electrodes 13e, 13f of FIG. 9A and the difference of the correction amount of the wave aberration in the second and third areas are equal to zero.

On the other hand, the reflection light from the disc 7 is linearly polarized light parallel to the Y direction of FIG. 9A, and thus it becomes extraordinary light when $V_1$ to $V_3$ are equal to zero. When $V_1$ to $V_3$ are sufficiently large, the reflection light becomes ordinary light, and when $V_1$ to $V_3$ are equal to the intermediate values, the reflection light has both of the extraordinary light component and the ordinary light component. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode patterns formed for the pattern electrode 13e, 13f of FIG. 9A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of each of the liquid crystal portions 12f, 12g and $\lambda$ represents the wavelength of the incident light.

That is, by driving the liquid crystal panel 4h, the liquid crystal panel 4h produces the wave aberration for the light traveling on the going path (the emission light from the semiconductor laser 1) and the light traveling on the returning path (the reflection light from the disc 7).

In this embodiment, the substrate-thickness deviation of the disc 7 and the tilt in the radial direction of the disc 7 can be corrected at the same time. If the following equation: $(n_{f1}-n_{f2})h/\lambda=(n_{f2}-n_{f3})h/\lambda=\alpha$ is satisfied for the liquid crystal portion 12d (shown in FIG. 9A) for the correction of the substrate-thickness deviation of the disc 7 and the following equation: $(n_{r1}-n_{r2})h/\lambda=(n_{r2}-n_{r3})h/\lambda=\alpha$ is satisfied for the liquid crystal portion 12f (shown in FIG. 9A) for the correction of the substrate-thickness deviation of the disc 7, the wave aberration due to the substrate-thickness deviation and the wave aberration produced by the liquid crystal panel 4h are canceled by each other for both the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4h, a focus error signal having no offset can be achieved.

Further, if the following equation: $(n_{f1}-n_{f2})h/\lambda=(n_{f2}-n_{f3})h/\lambda=\beta$ is satisfied for the liquid crystal portion 12e of FIG. 9A on the tilt in the radial direction of the disc 7 and the following equation: $(n_{r1}-n_{r2})h/\lambda=(n_{r2}-n_{r3})h/\lambda=\beta$ is satisfied for the liquid crystal portion 12g of FIG. 9A on the tilt in the radial direction of the disc 7, the wave aberration due to the tilt in the radial direction and the wave aberration produced by the liquid crystal panel 4h are canceled by each other for both of the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4h, a focus error signal having high sensitivity can be achieved.

An eighth embodiment of the optical head device according to the present invention is achieved by using a liquid crystal panel 4i in place of the liquid crystal panel 4a shown in FIG. 2A in the first embodiment of the optical head device shown in FIG. 1.

Figure 9B:
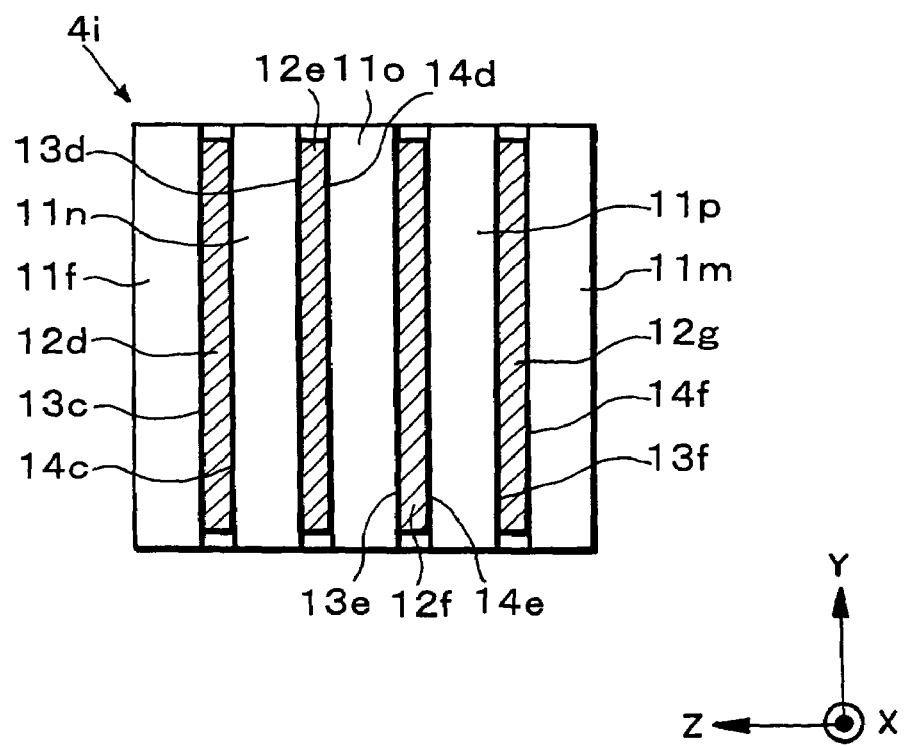
FIG. 9B is a diagram showing the construction of a liquid crystal panel of an eighth embodiment of the optical head device according to the present invention.

FIG. 9B shows the construction of the liquid crystal panel 4i.

The liquid crystal panel 4i is constructed such that the glass substrates 11g, 11h of the liquid crystal panel 4h shown in FIG. 9A are replaced by a single glass substrate 11n, the glass substrates 11i, 11j are replaced by a single glass substrate 11o, and the glass substrates 11k, 11l are replaced by a single glass substrate 11p. Since the liquid crystal panel 4i can be designed to be thinner in thickness than the liquid crystal panel 4h shown in FIG. 9A, this liquid crystal panel 4i is suitably applied to miniaturize the optical head device.

The driving method of the liquid crystal panel 4i of this embodiment is the same as the liquid crystal panel 4h of the seventh embodiment of the optical head device of the present invention. In this embodiment, even when both of the substrate-thickness deviation of the disc 7 and the tilt in the radial direction of the disc 7 are corrected by using the liquid crystal panel 4i at the same time, a focus error signal having no offset and high sensitivity can be achieved by the same reason as described in the seventh embodiment of the optical head device according to the present invention.

A ninth embodiment of the present invention is achieved by using a liquid crystal panel 4j in place of the liquid crystal panel 4a shown in FIG. 2A of the first embodiment of the optical head device shown in FIG. 1.

Figure 10A:
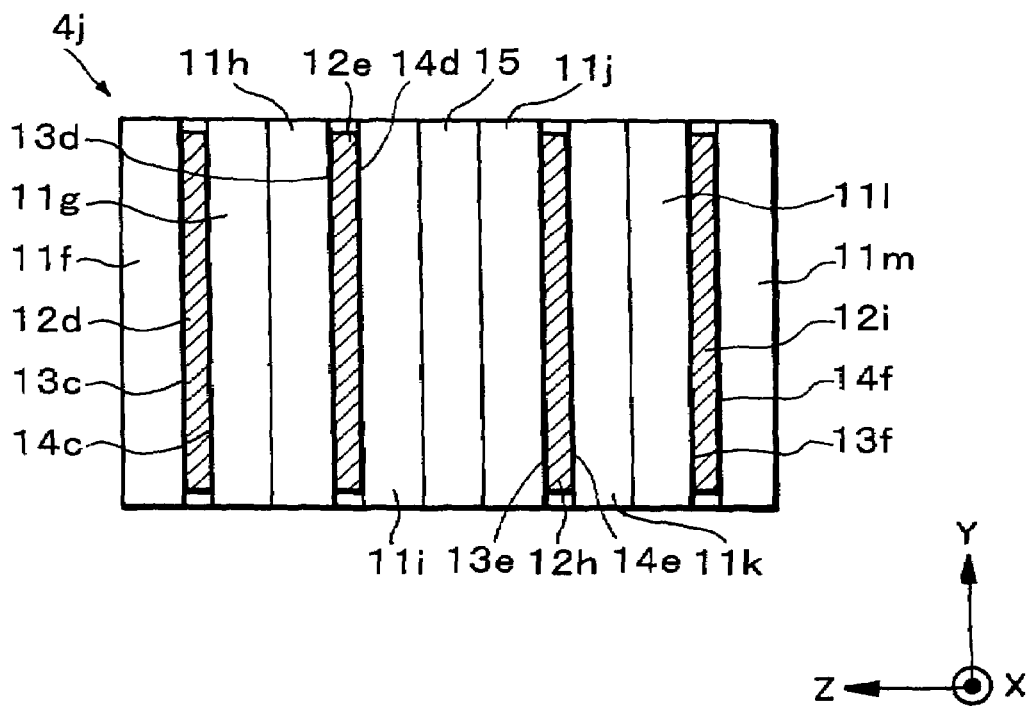
FIG. 10A is a diagram showing the construction of a liquid crystal panel of a ninth embodiment of the optical head device according to the present invention.

FIG. 10A shows the construction of the liquid crystal panel 4j.

The liquid crystal panel 4j is constructed such that a liquid crystal portion 12d is sandwiched between glass substrates 11f, 11g, a liquid crystal portion 12e is sandwiched between glass substrates 11h, 11i, and a liquid crystal portion 12f is sandwiched between glass substrates 11j, 11k, a liquid crystal portion 12g is sandwiched between glass substrates 11l, 11m, the surfaces of the glass substrates 11g, 11h which are respectively located at the opposite side to the liquid crystal portion (12d, 12e) side are attached to each other, the surfaces of the glass substrates 11k, 11l which are respectively located at the opposite side to the liquid crystal portion (12f, 12g) are attached to each other, and the surfaces of the glass substrates 11i, 11j which are respectively located at the opposite side to the liquid crystal portion (12e, 12f) are attached to both of the surfaces of a half wavelength plate 15, respectively.

A pattern electrode 13c is formed on the surface of the glass substrate 11f which confronts the liquid crystal portion 12d, an overall-surface electrode 14c is formed on the surface of the glass substrate 11g which confronts the liquid crystal portion 12d, a pattern electrode 13d is formed on the surface of the glass substrate 11h which confronts the liquid crystal portion 12e, an overall-surface electrode 14d is formed on the surface of the glass substrate 11i which confronts the liquid crystal portion 12e, a pattern electrode 13e is formed on the surface of the glass substrate 11j which confronts the liquid crystal portion 12f, an overall-surface electrode 14e is formed on the surface of the glass substrate 11k which confronts the liquid crystal portion 12f, a pattern electrode 13f is formed on the surface of the glass substrate 11l which confronts the liquid crystal portion 12g, and an overall-surface electrode 14f is formed on the surface of the glass substrate 11m which confronts the liquid crystal portion 12g.

The pattern electrode 13c and the overall electrode 14c may be positionally replaced by each other, the pattern electrode 13d and the overall-surface electrode 14d may be positionally replaced by each other, the pattern electrode 13e and the overall-surface electrode 14e may be positionally replaced by each other, and the pattern electrode 13f and the overall-surface electrode 14f may be positionally replaced by each other.

In FIG. 10A, the X direction, the Y direction and the Z direction correspond to the radial direction of the disc 7, the tangent line direction of the disc 7 and the optical axis direction, respectively. The direction of the optical axis of the half wavelength plate 15 intersects to the X and Y directions at an angle of ±45 degrees.

By using the liquid crystal panel 4j, the substrate-thickness deviation of the disc 7 and the tilt in the radial direction of the disc 7 can be corrected at the same time. The electrode pattern formed for pattern electrodes 13c, 13e for the correction of the substrate-thickness deviation of the disc 7 is shown in FIG. 16B. The correction amount of the wave aberration is represented by "0" in each of the areas 21a, 21e of FIG. 16B, by $\alpha$ in each of the areas 21b, 21d and by $2\alpha$ in the area 21c ($\alpha$ represents a constant).

Further, the electrode pattern formed for pattern electrodes 13d, 13f for the correction of the tilt in the radial direction of the disc 7 is shown in FIG. 16C. The correction amount of the wave aberration is represented by $-\beta$ in each of the areas 21f, 21i of FIG. 16C, by "0" in the area 21h and by $\beta$ in each of the areas 21g, 21j ($\beta$ represents a constant).

A method of driving the liquid crystal panel 4j will be described.

A constant voltage $V_{COM}$ is applied to the overall-surface electrodes 14c to 14f shown in FIG. 10A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of each electrode pattern formed for the pattern electrodes 13c to 13f of FIG. 10A. At this time, the difference of the correction amount of the wave aberration between the first and second areas is proportional to ($V_1-V_2$), and the difference of the correction amount of the wave aberration between the second and third areas is proportional to ($V_2-V_3$).

In the case where the substrate-thickness deviation of the disc 7 is corrected, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value α. Further, in the case where the tilt in the radial direction of the disc 7 is corrected, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value β.

The liquid crystal molecules of the liquid crystal portions 12d, 12e of FIG. 10A are nematic liquid crystal molecules. These liquid crystal molecules are oriented in the X direction of FIG. 10A when $V_1$ to $V_3$ are equal to zero, oriented in the Z direction of FIG. 10A when $V_1$ to $V_3$ are sufficiently large, and oriented in the intermediate direction between the X and Z directions of FIG. 10A when $V_1$ to $V_3$ are equal to the intermediate values.

The liquid crystal molecules of the liquid crystal portions 12d, 12e have birefringence characteristic and thus the refractive indexes thereof to ordinary light and extraordinary light are represented by $n_o$, $n_e$. Further, the refractive indexes thereof for the emission light from the semiconductor laser 1 and the reflection light from the disc 7 is represented by $n_f$, $n_r$.

The emission light from the semiconductor laser 1 is linearly polarized light parallel to the X direction of FIG. 10A. Therefore, when $V_1$ to $V_3$ are equal to zero, the light emitted from the liquid crystal portions 12d, 12e becomes extraordinary light. On the other hand, when $V_1$ to $V_3$ are sufficiently large, the light emitted from the liquid crystal portions 12d, 12e becomes ordinary light. When $V_1$ to $V_3$ are equal to the intermediate values, the light emitted from the liquid crystal portions 12d, 12e has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode pattern formed for the pattern electrodes 13c, 13d of FIG. 10A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of each of the liquid crystal portions 12d, 12e, and λ represents the wavelength of the incident light.

On the other hand, the reflection light from the disc 7 is linearly polarized light parallel to the Y direction of FIG. 10A, so that the reflection light becomes ordinary light irrespective of the values of $V_1$ to $V_3$. Accordingly, $n_r$ is equal to $n_o$ irrespective of the values of $V_1$ to $V_3$. At this time, the difference of the correction amount of the wave aberration in the first and second areas of the electrode patterns formed for the pattern electrodes 13c, 13d of FIG. 10A and the difference of the correction amount of the wave aberration in the second and third areas are equal to zero.

The liquid crystal molecules of the liquid crystal portions 12f, 12g of FIG. 10A are nematic liquid crystal molecules. These molecules are oriented in the X direction of FIG. 10A when $V_1$ to $V_3$ are equal to zero, oriented in the Z direction of FIG. 10A when $V_1$ to $V_3$ are sufficiently large, and oriented in the intermediate direction between the X and Z directions of FIG. 10A when $V_1$ to $V_3$ are equal to the intermediate values. Since the liquid crystal molecules of the liquid crystal portions 12f, 12g have birefringence characteristic, the refractive indexes thereof for ordinary light and extraordinary light are represented by $n_o$, $n_e$, respectively. Further, the refractive indexes thereof for the emission light from the semiconductor laser 1 and the reflection light from the disc 7 are represented by $n_f$, $n_r$.

The emission light from the semiconductor laser 1 is linearly polarized light parallel to the Y direction of FIG. 10A by action of the half wavelength plate 15, so that the emission light becomes ordinary light irrespective of the values of $V_1$ to $V_3$. Accordingly, $n_f$ is equal to $n_o$ irrespective of the values of $V_1$ to $V_3$. At this time, the difference of the correction amount of the wave aberration in the first and second areas of the electrode patterns formed for the pattern electrodes 13e, 13f of FIG. 10A and the difference of the correction amount of the wave aberration in the second and third areas are equal to zero.

On the other hand, the reflection light from the disc 7 is linearly polarized light parallel to the X direction of FIG. 10A by action of the half wavelength plate 15, and thus it becomes extraordinary light when $V_1$ to $V_3$ are equal to zero. When $V_1$ to $V_3$ are sufficiently large, the reflection light becomes ordinary light, and when $V_1$ to $V_3$ are equal to the intermediate values, the reflection light has both of the extraordinary light component and the ordinary light component. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode patterns formed for the pattern electrodes 13e, 13f of FIG. 10A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of each of the liquid crystal portions 12f, 12g and λ represents the wavelength of the incident light.

That is, by driving the liquid crystal panel 4j, the liquid crystal panel 4j produces the wave aberration for the light traveling on the going path (the emission light from the semiconductor laser 1) and the light traveling on the returning path (the reflection light from the disc 7) likewise. The liquid crystal panel 4j can be mass-produced at low price because the assembly comprising the glass substrates 11f to 11i and the liquid crystal portions 12d, 12e and the assembly comprising the glass substrates 11j to 11m and the liquid crystal portions 12f, 12g have the same construction.

In this embodiment, the substrate-thickness deviation of the disc 7 and the tilt in the radial direction of the disc 7 can be corrected at the same time. If the following equation: $(n_{f1}-n_{f2})h/\lambda=(n_{f2}-n_{f3})h/\lambda=\alpha$ is satisfied for the liquid crystal portion 12d (shown in FIG. 10A) for the correction of the substrate-thickness deviation of the disc 7 and the following equation: $(n_{r1}-n_{r2})h/\lambda=(n_{r2}-n_{r3})h/\lambda=\alpha$ is satisfied for the liquid crystal portion 12f (shown in FIG. 10A) for the correction of the substrate-thickness deviation of the disc 7, the wave aberration due to the substrate-thickness deviation and the wave aberration produced by the liquid crystal panel 4j are canceled by each other for both the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4j, a focus error signal having no offset can be achieved.

Further, if the following equation: $(n_{f1}-n_{f2})h/\lambda=(n_{f2}-n_{f3})h/\lambda=\beta$ is satisfied for the liquid crystal portion 12e of FIG. 10A on the tilt in the radial direction of the disc 7 and the following equation: $(n_{r1}-n_{r2})h/\lambda=(n_{r2}-n_{r3})h/\lambda=\beta$ is satisfied for the liquid crystal portion 12g of FIG. 10A on the tilt in the radial direction of the disc 7, the wave aberration due to the tilt in the radial direction and the wave aberration produced by the liquid crystal panel 4j are canceled by each other for both of the light traveling on the going path and the light traveling on the returning path likewise. Therefore, no wave aberration remains for the light traveling on the returning path and thus the phase distribution does not vary. Accordingly, even when the tilt in the radial direction of the disc 7 is corrected by using the liquid crystal panel 4j, a focus error signal having high sensitivity can be achieved.

A tenth embodiment of the present invention of the optical head device according to the present invention is achieved by using a liquid crystal panel 4k in place of the liquid crystal panel 4a shown in FIG. 2A of the first embodiment of the optical head device shown in FIG. 1.

Figure 10B:
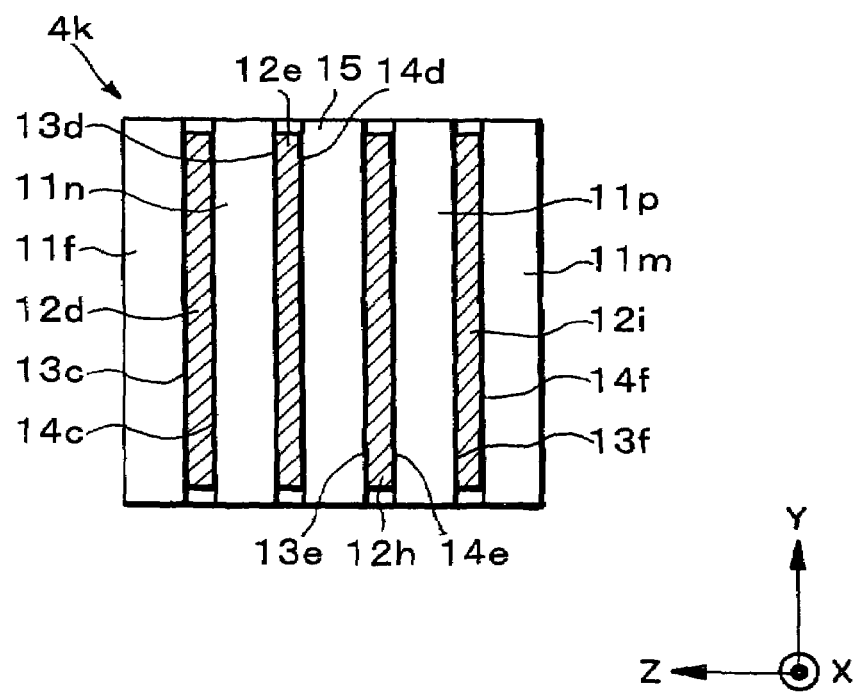
FIG. 10B is a diagram showing the construction of a liquid crystal panel of a tenth embodiment of the optical head device according to the present invention.

FIG. 10B shows the construction of the liquid crystal panel 4k.

The liquid crystal panel 4k is constructed such that the glass substrates 11g, 11h of the liquid crystal panel 4j shown in FIG. 10A are replaced by a single glass substrate 11n, the glass substrates 11k, 11l are replaced by a single glass substrate 11p, and the glass substrates 11i, 11j and the half wavelength plate 15 are replaced by a single half wavelength plate 15. The liquid crystal panel 4k can be designed to be thinner in thickness than the liquid crystal panel 4j shown in FIG. 10A, and thus it is suitably applicable to miniaturize the optical head device.

The driving method of the liquid crystal panel 4k of this embodiment is the same as the driving method of the liquid crystal panel 4j of the ninth embodiment of the optical head device according to the present invention. In this embodiment, even when the substrate-thickness deviation of the disc 7 and the tilt in the radial direction of the disc 7 are corrected at the same time by using the liquid crystal panel 4k, a focus error signal having no offset and high sensitivity can be achieved by the same reason as described in the ninth embodiment of the optical head device according to the present invention.

An eleventh embodiment of the optical head device according to the present invention is achieved by using a liquid crystal panel 4l in place of the liquid crystal panel 4a shown in FIG. 2A of the first embodiment of the optical head device according to the present invention shown in FIG. 1.

Figure 11A:
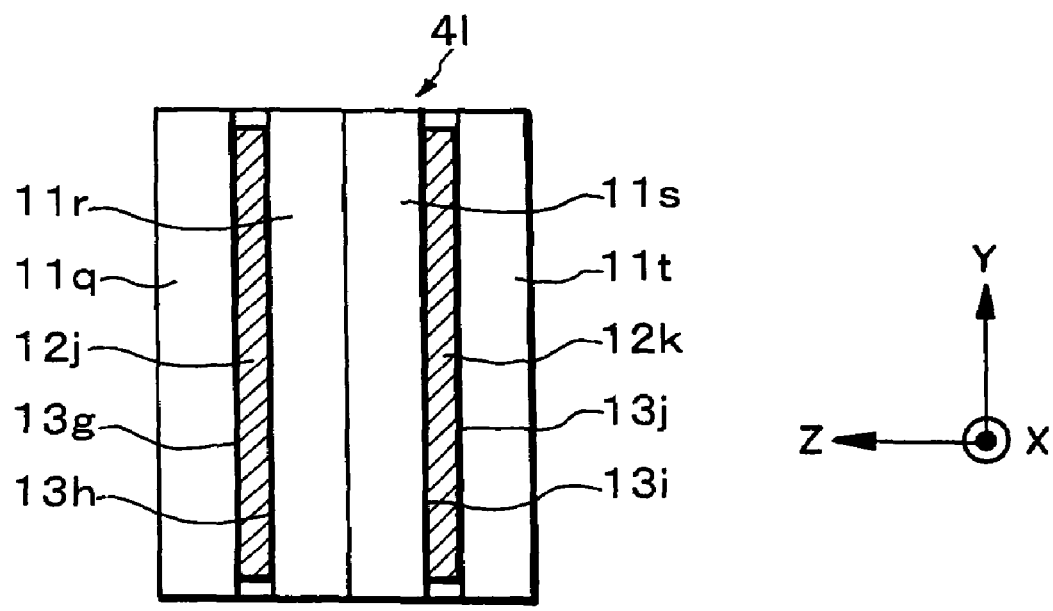
FIG. 11A is a diagram showing the construction of a liquid crystal panel of an eleventh embodiment of the optical head device according to the present invention.

FIG. 11A shows the construction of the liquid crystal panel 4l.

The liquid crystal panel 4l is constructed such that a liquid crystal portion 12j is sandwiched between glass substrates 11q, 11r, a liquid crystal portion 12k is sandwiched between glass substrates 11s, 11t, and the glass substrates 11r, 11s are attached to each other so that the surfaces thereof at the opposite sides to the liquid crystal portion (12j, 12k) side are confronted to each other. A pattern electrode 13g is formed on a surface of the glass substrate 11q which confronts the liquid crystal portion (12j) side, a pattern electrode 13h is formed on the surface of the glass substrate 11r which confronts the liquid crystal portion (12j) side, a pattern electrode 13i is formed on the surface of the glass substrate 11s which confronts the liquid crystal portion (12k) side, and a pattern electrode 13j is formed on the surface of the glass substrate 11t which confronts the liquid crystal portion (12k) side. The pattern electrode 13g and the pattern electrode 13h may be positionally replaced by each other, and the pattern electrode 13i and the pattern electrode 13j may be positionally replaced by each other.

In FIG. 11A, the X direction, the Y direction and the Z direction correspond to the radial direction of the disc 7, the tangent line direction of the disc 7 and the optical axis direction, respectively. The liquid crystal panel 4l is achieved by replacing the overall-surface electrode of the liquid crystal panel 4a shown in FIG. 2A by the pattern electrodes.

By using the liquid crystal panel 4l, both of the substrate-thickness deviation of the disc 7 and the tilt in the radial direction of the disc 7 can be corrected at the same time. An electrode patterns formed for the pattern electrodes 13g, 13i for the correction of the substrate-thickness deviation of the disc 7 is shown in FIG. 16B. The correction amount of the wave aberration is represented by "0" in each of the areas 21a, 21e of FIG. 16B, by α in each of the areas 21b, 21d and by 2α in the area 21c (α represents a constant).

An electrode patterns formed for the pattern electrodes 13h, 13j for the correction of the tilt in the radial direction of the disc 7 is shown in FIG. 16C. The correction amount of the wave aberration is represented by −β in each of the areas 21f, 21i of FIG. 16C, by "0" in the area 21h and by β in each of the areas 21g, 21j (β represents a constant).

The liquid crystal panel 4l may be manufactured by forming an assembly of the glass substrates 11q, 11r and the liquid crystal portion 12j and an assembly of the glass substrates 11s, 11t and the liquid crystal portion 12k separately from each other and then attaching the assemblies to each other, and thus the manufacturing process is easy.

Next, a method of driving the liquid crystal panel 4l will be described.

A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode patterns formed for the pattern electrodes 13g to 13j of FIG. 11A. At this time, the difference of the correction amount of the wave aberration between the first and second areas is proportional to ($V_1-V_2$), and the difference of the correction amount of the wave aberration between the second and third areas is proportional to ($V_2-V_3$).

With respect to the correction of the substrate-thickness deviation of the disc 7, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value α. Further, with respect to the correction of the tilt in the radial direction of the disc 7, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value β.

The liquid crystal molecules of the liquid crystal portion 12j of FIG. 11A are nematic liquid crystal molecules. These liquid crystal molecules are oriented in the X direction of FIG. 11A when $V_1$ to $V_3$ are equal to zero, oriented in the Z direction of FIG. 11A when $V_1$ to $V_3$ are sufficiently large, and oriented in the intermediate direction between the X and Z directions of FIG. 11A when $V_1$ to $V_3$ are equal to the intermediate values. The liquid crystal molecules of the liquid crystal portion 12j have birefringence characteristic and thus the refractive indexes thereof to ordinary light and extraordinary light are represented by $n_o$, $n_e$. Further, the refractive indexes thereof to the emission light from the semiconductor laser 1 and the reflection light from the disc 7 are represented by $n_f$, $n_r$.

The emission light from the semiconductor laser 1 is linearly polarized light parallel to the X direction of FIG. 11A. Therefore, when $V_1$ to $V_3$ are equal to zero, the emission light becomes extraordinary light. On the other hand, when $V_1$ to $V_3$ are sufficiently large, the emission light becomes ordinary light. When $V_1$ to $V_3$ are equal to the intermediate values, the emission light has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode patterns formed for the pattern electrodes 13g, 13h of FIG. 11A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of the liquid crystal portion 12j, and $\lambda$ represents the wavelength of the incident light.

On the other hand, the reflection light from the disc 7 is linearly polarized light parallel to the Y direction of FIG. 11A, so that the reflection light becomes ordinary light irrespective of the values of $V_1$ to $V_3$. Accordingly, $n_r$ is equal to $n_o$ irrespective of the values of $V_1$ to $V_3$. At this time, the difference of the correction amount of the wave aberration in the first and second areas of the electrode patterns formed for the pattern electrodes 13g, 13h of FIG. 11A and the difference of the correction amount of the wave aberration in the second and third areas are equal to zero.

The liquid crystal molecules of the liquid crystal portion 12k of FIG. 11A are nematic liquid crystal molecules. These molecules are oriented in the Y direction of FIG. 11A when $V_1$ to $V_3$ are equal to zero, oriented in the Z direction of FIG. 11A when $V_1$ to $V_3$ are sufficiently large, and oriented in the intermediate direction between the Y and Z directions of FIG. 11A when $V_1$ to $V_3$ are equal to the intermediate values. Since the liquid crystal molecules of the liquid crystal portion 12k have birefringence characteristic, the refractive indexes thereof for ordinary light and extraordinary light are represented by $n_o$, $n_e$, respectively. Further, the refractive indexes thereof for the emission light from the semiconductor laser 1 and the reflection light from the disc 7 are represented by $n_f$, $n_r$, respectively.

The emission light from the semiconductor laser 1 is linearly polarized light parallel to the X direction of FIG. 11A, and thus it becomes ordinary light irrespective of the values of $V_1$ to $V_3$. Accordingly, $n_f$ is equal to $n_o$ irrespective of the values of $V_1$ to $V_3$. At this time, both of the difference of the correction amount of the wave aberration between the first and second areas of the electrode patterns formed for the pattern electrodes 13i, 13j of FIG. 11A and the difference of the correction amount of the wave aberration between the second and third areas are equal to zero.

On the other hand, the reflection light from the disc 7 is linearly polarized light parallel to the Y direction of FIG. 11A, so that it becomes extraordinary light when $V_1$ to $V_3$ are equal to zero, ordinary light when $V_1$ to $V_3$ are sufficiently large, and also have both the extraordinary light component and the ordinary light component when $V_1$ to $V_3$ are equal to the intermediate values. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode patterns formed for the pattern electrodes 13i, 13j of FIG. 11A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12k and $\lambda$ represents the wavelength of the incident light.

That is, by driving the liquid crystal panel 4l, the liquid crystal panel 4l produces the wave aberration for both of the light traveling on the going path (the emission light from the semiconductor laser 1) and the light traveling on the returning path (the reflection light from the disc 7) likewise.

According to this embodiment, the substrate-thickness deviation of the disc 7 and the tilt in the radial direction of the disc 7 can be corrected at the same time. With respect to the correction of the substrate-thickness deviation of the disc 7, if the following equation: $(n_{f1}-n_{f2})h/\lambda=(n_{f2}-n_{f3})h/\lambda=\alpha$ is satisfied for the liquid crystal portion 12j of FIG. 11A and the following equation: $(n_{r1}-n_{r2})h/\lambda=(n_{r2}-n_{r3})h/\lambda=\alpha$ is satisfied for the liquid crystal portion 12k of FIG. 11A, the wave aberration due to the substrate-thickness deviation and the wave aberration produced by the liquid crystal panel 4l are likewise canceled by each other for the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4l, a focus error signal having no offset can be achieved.

Further, with respect to the correction of the tilt in the radial direction of the disc 7, if the following equation: $(n_{f1}-n_{f2})h/\lambda=(n_{f2}-n_{f3})h/\lambda=\beta$ is satisfied for the liquid crystal portion 12j of FIG. 11A and the following equation: $(n_{r1}-n_{r2})h/\lambda=(n_{r2}-n_{r3})h/\lambda=\beta$ is satisfied for the liquid crystal portion 12k of FIG. 11A, the wave aberration due to the tilt in the radial direction and the wave aberration produced by the liquid crystal panel 4l are likewise canceled by each other for the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4l, a focus error signal having high sensitivity can be achieved.

A twelfth embodiment of the present invention is achieved by using a liquid crystal panel 4m in place of the liquid crystal panel 4a shown in FIG. 2A of the first embodiment of the optical head device shown in FIG. 1.

Figure 11B:
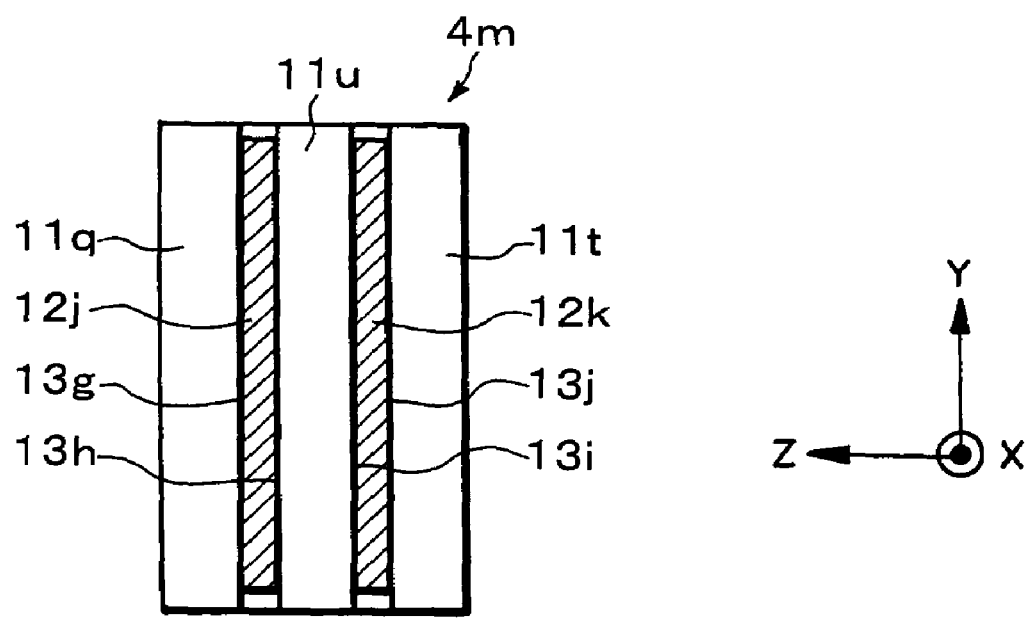
FIG. 11B is a diagram showing the construction of a liquid crystal panel of a twelfth embodiment of the optical head device according to the present invention.

FIG. 11B shows the construction of the liquid crystal panel 4m.

The liquid crystal panel 4m is achieved by replacing the glass substrates 11r, 11s of the liquid crystal panel 4l shown in FIG. 11A by a single glass substrate 11u. The liquid crystal panel 4m can be designed to be thinner in thickness than the liquid crystal panel 4l shown in FIG. 11A, and thus it is suitably applicable to miniaturize the optical head device of the present invention.

The driving method of the liquid crystal panel 4m of this embodiment is the same as the driving method of the liquid crystal panel 4l of the eleventh embodiment of the optical head device according to the present invention. In this embodiment, even when both of the substrate-thickness deviation of the disc 7 and the tilt in the radial direction of the disc 7 are corrected at the same time by using the liquid crystal panel 4m, a focus error signal having no offset and high sensitivity can be achieved by the same reason as described in the eleventh embodiment of the optical head device according to the present invention.

A thirteenth embodiment of the optical head device according to the present invention is achieved by using a liquid crystal panel 4n in place of the liquid crystal panel 4a shown in FIG. 2A of the first embodiment of the optical head device according to the present invention shown in FIG. 1.

Figure 12A:
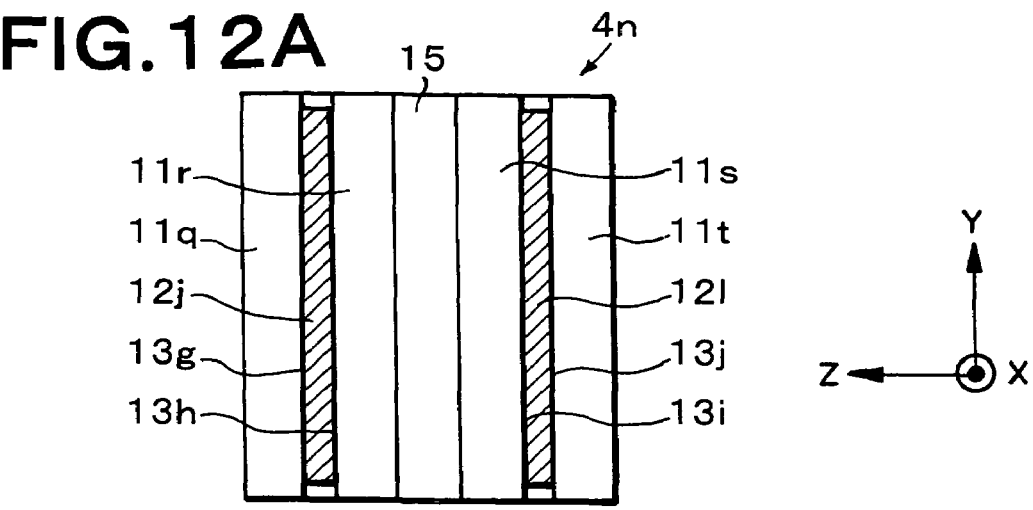
FIG. 12A is a diagram showing the construction of a liquid crystal panel of a thirteenth embodiment of the optical head device according to the present invention.

FIG. 12A shows the construction of the liquid crystal panel 4n.

The liquid crystal panel 4n is constructed such that a liquid crystal portion 12j is sandwiched between glass substrates 11q, 11r, a liquid crystal portion 12l is sandwiched between glass substrates 11s, 11t, and the surfaces of the glass substrates 11r, 11s which are respectively located at the opposite side to the liquid crystal portion (12j, 12l) side are attached to both the surfaces of a half wavelength plate 15, respectively. A pattern electrode 13g is formed on a surface of the glass substrate 11q which confronts the liquid crystal portion (12j) side, a pattern electrode 13h is formed on the surface of the glass substrate 11r which confronts the liquid crystal portion (12j) side, a pattern electrode 13i is formed on the surface of the glass substrate 11s which confronts the liquid crystal portion (12l) side, and a pattern electrode 13j is formed on the surface of the glass substrate 11t which confronts the liquid crystal portion (12l) side. The pattern electrode 13g and the pattern electrode 13h may be positionally replaced by each other, and the pattern electrode 13i and the pattern electrode 13j may be positionally replaced by each other.

In FIG. 12A, the X direction, the Y direction and the Z direction correspond to the radial direction of the disc 7, the tangent line direction of the disc 7 and the optical axis direction, respectively. The direction of the optical axis of the half wavelength plate 15 intersects to the X and Y directions at an angle of ±45 degrees. The liquid crystal panel 4n is achieved by replacing the overall-surface electrode of the liquid crystal panel 4c shown in FIG. 3A by the pattern electrodes.

By using the liquid crystal panel 4n, both of the substrate-thickness deviation of the disc 7 and the tilt in the radial direction of the disc 7 can be corrected at the same time. Electrode patterns formed for the pattern electrodes 13g, 13i for the correction of the substrate-thickness deviation of the disc 7 is shown in FIG. 16B. The correction amount of the wave aberration is represented by "0" in each of the areas 21a, 21e of FIG. 16B, by α in each of the areas 21b, 21d and by 2α in the area 21c (α represents a constant).

An electrode pattern formed for the pattern electrodes 13h, 13j for the correction of the tilt in the radial direction of the disc 7 is shown in FIG. 16C. The correction amount of the wave aberration is represented by −β in each of the areas 21f, 21i of FIG. 16C, by "0" in the area 21h and by β in each of the areas 21g, 21j (β represents a constant).

Next, a method of driving the liquid crystal panel 4n will be described.

A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode patterns formed for the pattern electrodes 13g to 13j of FIG. 12A. At this time, the difference of the correction amount of the wave aberration between the first and second areas is proportional to ($V_1-V_2$), and the difference of the correction amount of the wave aberration between the second and third areas is proportional to ($V_2-V_3$).

With respect to the correction of the substrate-thickness deviation of the disc 7, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the area 21a, 21e can be set to the same value α. Further, with respect to the correction of the tilt in the radial direction of the disc 7, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value β.

The liquid crystal molecules of the liquid crystal portion 12j of FIG. 12A are nematic liquid crystal molecules. These liquid crystal molecules are oriented in the X direction of FIG. 12A when $V_1$ to $V_3$ are equal to zero, oriented in the Z direction of FIG. 12A when $V_1$ to $V_3$ are sufficiently large, and oriented in the intermediate direction between the X and Z directions of FIG. 12A when $V_1$ to $V_3$ are equal to the intermediate values. The liquid crystal molecules of the liquid crystal portion 12j have birefringence characteristic and thus the refractive indexes thereof to ordinary light and extraordinary light are represented by $n_o$, $n_e$. Further, the refractive indexes thereof to the emission light from the semiconductor laser 1 and the reflection light from the disc 7 are represented by $n_f$, $n_r$.

The emission light from the semiconductor laser 1 is linearly polarized light parallel to the X direction of FIG. 12A. Therefore, when $V_1$ to $V_3$ are equal to zero, the emission light becomes extraordinary light. On the other hand, when $V_1$ to $V_3$ are sufficiently large, the emission light becomes ordinary light. When $V_1$ to $V_3$ are equal to the intermediate values, the emission light has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode patterns formed for the pattern electrodes 13g, 13h of FIG. 12A and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of the liquid crystal portion 12j, and λ represents the wavelength of the incident light.

On the other hand, the reflection light from the disc 7 is linearly polarized light parallel to the Y direction of FIG. 12A, so that the reflection light becomes ordinary light irrespective of the values of $V_1$ to $V_3$. Accordingly, $n_r$ is equal to $n_o$ irrespective of the values of $V_1$ to $V_3$. At this time, the difference of the correction amount of the wave aberration in the first and second areas of the electrode patterns formed for the pattern electrodes 13g, 13h of FIG. 12A and the difference of the correction amount of the wave aberration in the second and third areas are equal to zero.

The liquid crystal molecules of the liquid crystal portion 12l of FIG. 12A are nematic liquid crystal molecules. These molecules are oriented in the X direction of FIG. 12A when $V_1$ to $V_3$ are equal to zero, oriented in the Z direction of FIG. 12A when $V_1$ to $V_3$ are sufficiently large, and oriented in the intermediate direction between the X and Z directions of FIG. 12A when $V_1$ to $V_3$ are equal to the intermediate values. Since the liquid crystal molecules of the liquid crystal portion 12l have birefringence characteristic, the refractive indexes thereof for ordinary light and extraordinary light are represented by $n_o$, $n_e$, respectively. Further, the refractive indexes thereof for the emission light from the semiconductor laser 1 and the reflection light from the disc 7 are represented by $n_f$, $n_r$, respectively.

The emission light from the semiconductor laser 1 is linearly polarized light parallel to the Y direction of FIG. 12A by the action of the half wavelength plate 15, and thus it becomes ordinary light irrespective of the values of $V_1$ to $V_3$. Accordingly, $n_f$ is equal to $n_o$ irrespective of the values of $V_1$ to $V_3$. At this time, both of the difference of the correction amount of the wave aberration between the first and second areas of the electrode patterns formed for the pattern electrodes 13i, 13j of FIG. 12A and the difference of the correction amount of the wave aberration between the second and third areas are equal to zero.

On the other hand, the reflection light from the disc 7 is linearly polarized light parallel to the X direction of FIG. 12A by the action of the half wavelength plate 15, so that it becomes extraordinary light when $V_1$ to $V_3$ are equal to zero, ordinary light when $V_1$ to $V_3$ are sufficiently large, and also have both the extraordinary light component and the ordinary light component when $V_1$ to $V_3$ are equal to the intermediate values. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode patterns formed for the pattern electrodes 13i, 13j of FIG. 12A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12l and $\lambda$ represents the wavelength of the incident light.

That is, by driving the liquid crystal panel 4n, the liquid crystal panel 4n produces the wave aberration for both of the light traveling on the going path (the emission light from the semiconductor laser 1) and the light traveling on the returning path (the reflection light from the disc 7) likewise. The assembly comprising the glass substrates 11q, 11r and the liquid crystal portion 12j and the assembly comprising the glass substrates 11s, 11t and the liquid crystal portion 12l have the same construction, so that the liquid crystal panel 4n can be mass-produced at low price.

According to this embodiment, the substrate-thickness deviation of the disc 7 and the tilt in the radial direction of the disc 7 can be corrected at the same time. With respect to the correction of the substrate-thickness deviation of the disc 7, if the following equation: $(n_{f1}-n_{f2})h/\lambda = (n_{f2}-n_{f3})h/\lambda = \alpha$ is satisfied for the liquid crystal portion 12j of FIG. 12A and the following equation: $(n_{r1}-n_{r2})h/\lambda = (n_{r2}-n_{r3})h/\lambda = \alpha$ is satisfied for the liquid crystal portion 12l of FIG. 12A, the wave aberration due to the substrate-thickness deviation and the wave aberration produced by the liquid crystal panel 4n are likewise canceled by each other for the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4n, a focus error signal having no offset can be achieved.

Further, with respect to the correction of the tilt in the radial direction of the disc 7, if the following equation: $(n_{f1}-n_{f2})h/\lambda = (n_{f2}-n_{f3})h/\lambda = \beta$ is satisfied for the liquid crystal portion 12j of FIG. 12A and the following equation: $(n_{r1}-n_{r2})h/\lambda = (n_{r2}-n_{r3})h/\lambda = \beta$ is satisfied for the liquid crystal portion 12l of FIG. 12A, the wave aberration due to the tilt in the radial direction and the wave aberration produced by the liquid crystal panel 4n are likewise canceled by each other for the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4n, a focus error signal having high sensitivity can be achieved.

A fourteenth embodiment of the optical head device according to the present invention is achieved by using a liquid crystal panel 4o in place of the liquid crystal panel 4a shown in FIG. 2A in the first embodiment of the optical head device shown in FIG. 1.

Figure 12B:
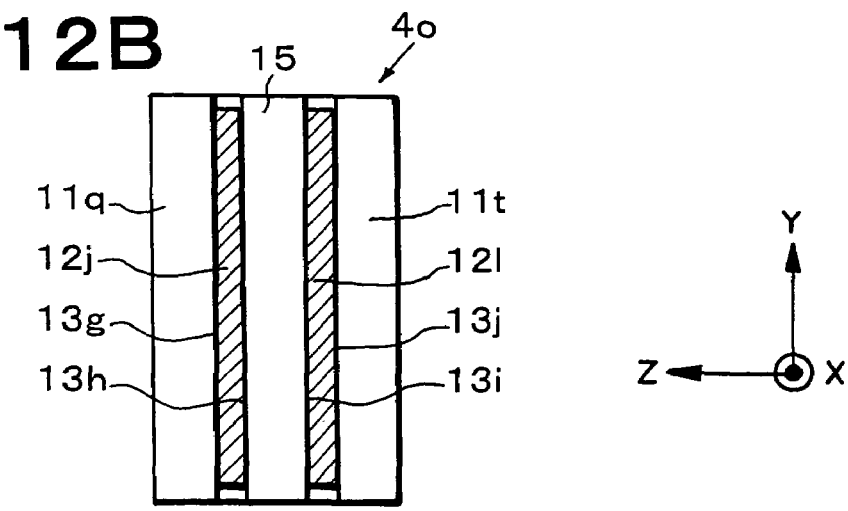
FIG. 12B is a diagram showing the construction of a liquid crystal panel of a fourteenth embodiment of the optical head device according to the present invention.

FIG. 12B shows the construction of the liquid crystal panel 4o.

The liquid crystal panel 4o is achieved by replacing the glass substrates 11r, 11s and the half wavelength plate 15 of the liquid crystal panel 4n shown in FIG. 12A by a single half wavelength plate 15. The liquid crystal panel 4o can be designed to be thinner in thickness than the liquid crystal panel 4n shown in FIG. 12A, and thus it is suitably applicable to miniaturize the optical head device of the present invention.

The driving method of the liquid crystal panel 4o of this embodiment is the same as the driving method of the liquid crystal panel 4n of the thirteenth embodiment of the optical head device according to the present invention. In this embodiment, even when both of the substrate-thickness deviation of the disc 7 and the tilt in the radial direction of the disc 7 are corrected at the same time by using the liquid crystal panel 4o, a focus error signal having no offset and high sensitivity can be achieved by the same reason as described in the thirteenth embodiment of the optical head device according to the present invention.

An embodiment of the optical information recording/reproducing device according to the present invention may be implemented by adding a reproduction signal detecting circuit and a liquid crystal panel driving circuit to each of the seventh to fourteenth embodiments of the optical head device according to the present invention.

A fifteenth embodiment of the optical head device of the present invention is implemented by using a liquid crystal panel 4p in place of the liquid crystal panel 4e of the fifth embodiment of the optical head device shown in FIG. 5.

The construction of the liquid crystal panel 4p of this embodiment is the same as the liquid crystal panel 4a shown in FIG. 2A in the first embodiment of the optical head device according to the present invention. The substrate-thickness deviation of the disc 7 and the tilt in the radial direction of the disc 7 can be corrected at the same time by using the liquid crystal panel 4p. An electrode pattern formed for the pattern electrode 13a for the correction of the substrate-thickness deviation of the disc 7 is shown in FIG. 16B. The correction amount of the wave aberration is represented by "0" in each of the areas 21a, 21e of FIG. 16B, by $\alpha$ in each of the areas 21b, 21d and by $2\alpha$ in the area 21c ($\alpha$ represents a constant).

An electrode pattern formed for the pattern electrode 13b for the correction of the tilt in the radial direction of the disc 7 is shown in FIG. 16C. The correction amount of the wave aberration is represented by $-\beta$ in each of the areas 21f, 21i of FIG. 16C, by "0" in the area 21h and by $\beta$ in each of the areas 21g, 21j ($\beta$ represents a constant).

Next, a method of driving the liquid crystal panel 4p will be described.

A constant voltage $V_{COM}$ is applied to the overall-surface electrodes 14a, 14b of FIG. 2A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode patterns formed for the pattern electrodes 13a, 13b of FIG. 2A. At this time, the difference of the correction amount of the wave aberration between the first and second areas is proportional to ($V_1-V_2$), and the difference of the correction amount of the wave aberration between the second and third areas is proportional to ($V_2-V_3$).

With respect to the correction of the substrate-thickness deviation of the disc 7, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value $\alpha$. Further, with respect to the correction of the tilt in the radial direction of the disc 7, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value $\beta$.

The liquid crystal molecules of the liquid crystal portions 12a, 12b of FIG. 2A are twisted nematic liquid crystal. When $V_1$ to $V_3$ are equal to zero, the orientation direction of the liquid crystal molecules is rotated at a predetermined period around the Z axis along the Z direction on the XY plane of FIG. 2A. When $V_1$ to $V_3$ are sufficiently large, the liquid crystal molecules are oriented in the Z direction of FIG. 2A. When $V_1$ to $V_3$ are equal to the intermediate values, the orientation direction is rotated at a predetermined period around the Z axis along the Z direction in the intermediate direction between the XY plane and the Z direction of FIG. 2A.

The liquid crystal molecules of the liquid crystal portions 12a, 12b have birefringence characteristic, and thus the refractive indexes thereof for ordinary light and extraordinary light are represented by $n_o$ and $n_e$. Further, the refractive indexes of the liquid crystal molecules for the emission light from the semiconductor laser 1 and the reflection light from the disc 7 are represented by $n_f$, $n_r$, respectively.

The emission light from the semiconductor laser 1 is counterclockwisely circularly polarized or clockwisely circularly polarized by the action of the quarter wavelength plate 5. Therefore, when $V_1$ to $V_3$ are equal to zero, the emission light has both of the ordinary light component and the extraordinary light component, and the ratio thereof is 1:1. When $V_1$ to $V_3$ are sufficiently large, the emission light becomes ordinary light. When $V_1$ to $V_3$ are equal to the intermediate values, the emission light has both of the extraordinary light component and the ordinary light component, however, the ordinary light component has a higher rate than the extraordinary light component. Accordingly, $n_f$ varies between $(n_e+n_o)/2$ and $n_o$ in correspondence with the values of $V_1$ to $V_3$. At this time, representing the values of $n_f$ corresponding to $V_1$ to $V_3$ by $n_{f1}$ to $n_{f3}$, the difference of the correction amount of the wave aberration between the first and second areas of the electrode patterns formed for the pattern electrodes 13a, 13b of FIG. 2A and the difference of the correction amount of the wave aberration between the second and third areas are equal to $(n_{f1}-n_{f2})h/\lambda$, $(n_{f2}-n_{f3})h/\lambda$, respectively when they are standardized by the wavelength of the incident light. Here, h represents the thickness of each of the liquid crystal portions 12a, 12b, and $\lambda$ represents the wavelength of the incident light.

The reflection light from the disc 7 is clockwisely circularly polarized or counterclockwisely circularly polarized by the action of the quarter wavelength plate 5. Therefore, when $V_1$ to $V_3$ are equal to zero, the reflection light has both of the extraordinary light component and the ordinary light component, and the ratio of the components is 1:1. When $V_1$ to $V_3$ are sufficiently large, the reflection light becomes ordinary light, and when $V_1$ to $V_3$ are equal to the intermediate values, the reflection light has both of the extraordinary light component and the ordinary light component, however, the ordinary light component has a higher rate than the extraordinary light component. Accordingly, $n_r$ varies between $(n_e+n_o)/2$ and $n_o$ in correspondence with the values of $V_1$ to $V_3$. At this time, representing the values of $n_r$ corresponding to $V_1$ to $V_3$ by $n_{r1}$ to $n_{r3}$, the difference of the correction amount of the wave aberration between the first and second areas of the electrode patterns formed for the pattern electrodes 13a, 13b of FIG. 2A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of each of the liquid crystal portions 12a, 12b, and $\lambda$ represents the wavelength of the incident light.

That is, by driving the liquid crystal panel 4p, the liquid crystal panel 4p produces the wave aberration for both of the light traveling on the going path (the emission light from the semiconductor laser 1) and the light traveling on the returning path (the reflection light from the disc 7) likewise. The liquid crystal panel 4p is simpler in structure than the liquid crystal panels 4h, 4i shown in FIGS. 9A and 9B and the liquid crystal panels 4j, 4k shown in FIGS. 10A and 10B, and thus it can be more easily manufactured. Further, it is more suitable for miniaturize the optical head device because it can be reduced in thickness. However, since the liquid crystal molecules of the liquid crystal portions 12a, 12b constituting the liquid crystal panel 4p are twisted nematic liquid crystal molecules, they have a disadvantage that the response speed is lower than the nematic liquid crystal molecules.

According to this embodiment, the substrate-thickness deviation of the disc 7 and the tilt in the radial direction of the disc 7 can be corrected at the same time. If the following equations: $(n_{f1}-n_{f2})h/\lambda=(n_{f2}-n_{f3})h/\lambda=\alpha$ and $(n_{r1}-n_{r2})h/\lambda=(n_{r2}-n_{r3})h/\lambda=\alpha$ are satisfied for the liquid crystal portion 12a of FIG. 2A for the correction of the substrate-thickness deviation of the disc 7, the wave aberration due to the substrate-thickness deviation and the wave aberration produced by the liquid crystal panel 4p are likewise canceled by each other for the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4p, a focus error signal having no offset can be achieved.

Further, if the following equations: $(n_{f1}-n_{f2})h/\lambda=(n_{f2}-n_{f3})h/\lambda=\beta$ and $(n_{r1}-n_{r2})h/\lambda=(n_{r2}-n_{r3})h/\lambda=\beta$ are satisfied for the liquid crystal portion 12b of FIG. 2A for the correction of the tilt in the radial direction of the disc 7, the wave aberration due to the tilt in the radial direction and the wave aberration produced by the liquid crystal panel 4p are likewise canceled by each other for the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4p, a focus error signal having high sensitivity can be achieved.

A sixteenth embodiment of the optical head device of the present invention is implemented by using a liquid crystal panel 4q in place of the liquid crystal panel 4e of the fifth embodiment of the optical head device shown in FIG. 5.

Figure 13:
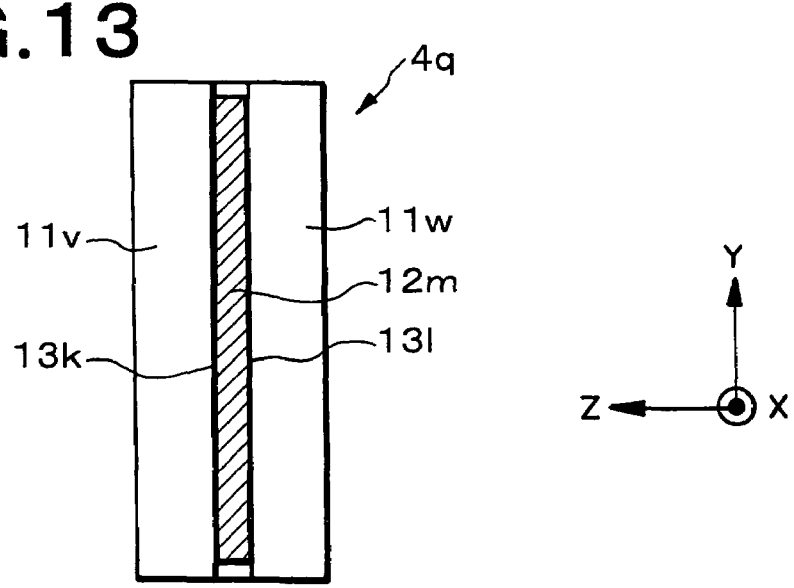
FIG. 13 is a diagram showing the construction of a liquid crystal panel of a fifteenth embodiment of the optical head device according to the present invention.

FIG. 13 shows the construction of the liquid crystal panel 4q.

The liquid crystal panel 4q is constructed such that a liquid crystal portion 12m is sandwiched between glass substrates 11v, 11w. A pattern electrode 13k is formed on the surface of the glass substrate 11v which confronts the liquid crystal portion (12m) side, and a pattern electrode 13l is formed on the surface of the glass substrate 11w which confronts the liquid crystal portion (12m) side. The pattern electrodes 13k and 13l may be positionally replaced by each other. In FIG. 13, the X direction, the Y direction and the Z direction correspond to the radial direction of the disc 7, the tangent line direction of the disc 7 and the optical axis direction, respectively.

The liquid crystal panel 4q is implemented by replacing the overall-surface electrode of the liquid crystal panel 4v shown in FIG. 16A by a pattern electrode. The substrate-thickness deviation of the disc 7 and the tilt in the radial direction of the disc 7 can be corrected at the same time by using the liquid crystal panel 4q.

An electrode pattern formed for the pattern electrode 13k for the correction of the substrate-thickness deviation of the disc 7 is shown in FIG. 16B. The correction amount of the wave aberration is represented by "0" in each of the areas 21a, 21e of FIG. 16B, by α in each of the areas 21b, 21d and by 2α in the area 21c (α represents a constant). An electrode pattern formed for the pattern electrode 13l for the correction of the tilt in the radial direction of the disc 7 is shown in FIG. 16C. The correction amount of the wave aberration is represented by −β in each of the areas 21f, 21i of FIG. 16C, by "0" in the area 21h and by β in each of the areas 21g, 21j (β represents a constant).

Next, a method of driving the liquid crystal panel 4q will be described.

A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode patterns formed for the pattern electrodes 13k, 13l of FIG. 13. At this time, the difference of the correction amount of the wave aberration between the first and second areas is proportional to ($V_1-V_2$), and the difference of the correction amount of the wave aberration between the second and third areas is proportional to ($V_2-V_3$).

With respect to the correction of the substrate-thickness deviation of the disc 7, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value α. Further, with respect to the correction of the tilt in the radial direction of the disc 7, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value β.

The liquid crystal molecules of the liquid crystal portion 12m of FIG. 13 are twisted nematic liquid crystal. When $V_1$ to $V_3$ are equal to zero, the orientation direction of the liquid crystal molecules is rotated at a predetermined period around the Z axis along the Z direction on the XY plane of FIG. 13. When $V_1$ to $V_3$ are sufficiently large, the liquid crystal molecules are oriented in the Z direction of FIG. 13. When $V_1$ to $V_3$ are equal to the intermediate values, the orientation direction is rotated at a predetermined period around the Z axis along the Z direction in the intermediate direction between the XY plane and the Z direction of FIG. 13.

The liquid crystal molecules of the liquid crystal portion 12m have birefringence characteristic, and thus the refractive indexes thereof for ordinary light and extraordinary light are represented by $n_o$ and $n_e$. Further, the refractive indexes of the liquid crystal molecules for the emission light from the semiconductor laser 1 and the reflection light from the disc 7 are represented by $n_f$, $n_r$, respectively.

The emission light from the semiconductor laser 1 is counterclockwisely circularly polarized or clockwisely circularly polarized by the action of the quarter wavelength plate 5. Therefore, when $V_1$ to $V_3$ are equal to zero, the emission light has both of the ordinary light component and the extraordinary light component, and the ratio thereof is 1:1. When $V_1$ to $V_3$ are sufficiently large, the emission light becomes ordinary light. When $V_1$ to $V_3$ are equal to the intermediate values, the emission light has both of the extraordinary light component and the ordinary light component, however, the ordinary light component has a higher rate than the extraordinary light component. Accordingly, $n_f$ varies between $(n_e+n_o)/2$ and $n_o$ in correspondence with the values of $V_1$ to $V_3$. At this time, representing the values of $n_f$ corresponding to $V_1$ to $V_3$ by $n_{f1}$ to $n_{f3}$, the difference of the correction amount of the wave aberration between the first and second areas of the electrode patterns formed for the pattern electrodes 13k, 13l of FIG. 13 and the difference of the correction amount of the wave aberration between the second and third areas are equal to $(n_{f1}-n_{f2})h/\lambda$, $(n_{f2}-n_{f3})h/\lambda$, respectively when they are standardized by the wavelength of the incident light. Here, h represents the thickness of the liquid crystal portion 12m, and λ represents the wavelength of the incident light.

The reflection light from the disc 7 is clockwisely circularly polarized or counterclockwisely circularly polarized by the action of the quarter wavelength plate 5. Therefore, when $V_1$ to $V_3$ are equal to zero, the reflection light has both of the extraordinary light component and the ordinary light component, and the ratio of the components is 1:1. When $V_1$ to $V_3$ are sufficiently large, the reflection light becomes ordinary light, and when $V_1$ to $V_3$ are equal to the intermediate values, the reflection light has both of the extraordinary light component and the ordinary light component, however, the ordinary light component has a higher rate than the extraordinary light component. Accordingly, $n_r$ varies between $(n_e+n_o)/2$ and $n_o$ in correspondence with the values of $V_1$ to $V_3$. At this time, representing the values of $n_r$ corresponding to $V_1$ to $V_3$ by $n_{r1}$ to $n_{r3}$, the difference of the correction amount of the wave aberration between the first and second areas of the electrode patterns formed for the pattern electrodes 13k, 13l of FIG. 13 and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12m, and λ represents the wavelength of the incident light.

That is, by driving the liquid crystal panel 4q, the liquid crystal panel 4q produces the wave aberration for both of the light traveling on the going path (the emission light from the semiconductor laser 1) and the light traveling on the returning path (the reflection light from the disc 7) likewise. The liquid crystal panel 4q is simpler in structure than the liquid crystal panels 4l, 4m shown in FIGS. 11A and 11B and the liquid crystal panels 4n, 4o shown in FIGS. 12A and 12B, and thus it can be more easily manufactured. Further, it is more suitable for miniaturize the optical head device because it can be reduced in thickness. However, since the liquid crystal molecules of the liquid crystal portion 12m constituting the liquid crystal panel 4q are twisted nematic liquid crystal molecules, they have a disadvantage that the response speed is lower than the nematic liquid crystal molecules.

According to this embodiment, the substrate-thickness deviation of the disc 7 and the tilt in the radial direction of the disc 7 can be corrected at the same time. If the following equations: $(n_{f1}-n_{f2})h/\lambda = (n_{f2}-n_{f3})h/\lambda = \alpha$ and $(n_{r1}-n_{r2})h/\lambda = (n_{r2}-n_{r3})h/\lambda = \alpha$ are satisfied for the liquid crystal portion 12m of FIG. 13 for the correction of the substrate-thickness deviation of the disc 7, the wave aberration due to the substrate-thickness deviation and the wave aberration produced by the liquid crystal panel 4q are likewise canceled by each other for the light traveling on the going path and the light traveling on the returning path. Therefore, no wave aberration remains for the light traveling on the returning path and thus the phase distribution does not vary. Accordingly, even when the substrate-thickness deviation of the disc 7 is corrected by using the liquid crystal panel 4q, a focus error signal having no offset can be achieved.

Further, if the following equations: $(n_{f1}-n_{f2})h/\lambda = (n_{f2}-n_{f3})h/\lambda = \beta$ and $(n_{r1}-n_{r2})h/\lambda = (n_{r2}-n_{r3})h/\lambda = \beta$ are satisfied for the liquid crystal portion 12m of FIG. 13 for the correction of the tilt in the radial direction of the disc 7, the wave aberration due to the tilt in the radial direction and the wave aberration produced by the liquid crystal panel 4q are likewise canceled by each other for the light traveling on the going path and the light traveling on the returning path. Therefore, no wave aberration remains for the light traveling on the returning path and thus the phase distribution does not vary. Accordingly, even when the tilt in the radial direction of the disc 7 is corrected by using the liquid crystal panel 4q, a focus error signal having high sensitivity can be achieved.

An embodiment of the optical information recording/reproducing device according to the present invention may be implemented by adding a reproduction signal detecting circuit and a liquid crystal panel driving circuit to each of the fifteenth and sixteenth embodiments of the optical head device according to the present invention.

A seventeenth embodiment of the optical head device according to the present invention is implemented by replacing the liquid crystal panels 4f, 4g of the sixth embodiment of the optical head device shown in FIG. 7 by liquid crystal panels 4r, 4s.

The construction of the liquid crystal panels 4r, 4s in this embodiment is the same as the liquid crystal panel 4a shown in FIG. 2A according to the first embodiment of the optical head device of the present invention. By using the liquid crystal panels 4r, 4s, both of the substrate-thickness deviation of the disc 7 and the tilt in the radial direction of the disc 7 can be corrected at the same time.

An electrode pattern formed for a pattern electrode 13a for the correction of the substrate-thickness deviation of the disc 7 is shown in FIG. 16B. The correction amount of the wave aberration is represented by "0" in each of the areas 21a, 21e of FIG. 16B, by $\alpha$ in each of the areas 21b, 21d and by $2\alpha$ in the area 21c ($\alpha$ represents a constant). An electrode pattern formed for a pattern electrode 13b for the correction of the tilt in the radial direction of the disc 7 is shown in FIG. 16C. The correction amount of the wave aberration is represented by $-\beta$ in each of the areas 21f, 21i of FIG. 16C, by "0" in the area 21h and by $\beta$ in each of the areas 21g, 21j ($\beta$ represents a constant).

Next, a method of driving the liquid crystal panels 4r, 4s will be described.

A constant voltage $V_{COM}$ is applied to the overall-surface electrodes 14a, 14b of FIG. 2A. A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode patterns formed for the pattern electrodes 13a, 13b of FIG. 2A. At this time, the difference of the correction amount of the wave aberration between the first and second areas is proportional to $(V_1-V_2)$, and the difference of the correction amount of the wave aberration between the second and third areas is proportional to $(V_2-V_3)$.

With respect to the correction of the substrate-thickness deviation of the disc 7, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value $\alpha$. Further, with respect to the correction of the tilt in the radial direction of the disc 7, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value $\beta$.

The liquid crystal molecules of the liquid crystal portions 12a, 12b of FIG. 2A which constitute the liquid crystal panel 4r are nematic liquid crystal molecules. These liquid crystal molecules are oriented in the X direction of FIG. 2A when $V_1$ to $V_3$ are equal to zero, oriented in the Z direction of FIG. 2A when $V_1$ to $V_3$ are sufficiently large, and oriented in the intermediate direction between the X and Z directions of FIG. 2A when $V_1$ to $V_3$ are equal to the intermediate values. The liquid crystal molecules of the liquid crystal portions 12a, 12b have birefringence characteristic and thus the refractive indexes thereof to ordinary light and extraordinary light are represented by $n_o$, $n_e$. Further, the refractive index thereof for the emission light from the semiconductor laser 1 is represented by $n_f$.

The emission light from the semiconductor laser 1 is linearly polarized light parallel to the X direction of FIG. 2A. Therefore, when $V_1$ to $V_3$ are equal to zero, the light emitted from the liquid crystal panel 4r becomes extraordinary light. On the other hand, when $V_1$ to $V_3$ are sufficiently large, the light emitted from the liquid crystal panel 4r becomes ordinary light. When $V_1$ to $V_3$ are equal to the intermediate values, the light emitted from the liquid crystal panel 4r has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode patterns formed for the pattern electrodes 13a,13b of FIG. 2A and the difference of the correction amount of the wave aberration in the second and third areas are represented by $(n_{r1}-n_{r2})h/\lambda$, $(n_{r2}-n_{r3})h/\lambda$ respectively when they are standardized by the wavelength of the incident light. Here, h represents the thickness of each of the liquid crystal portions 12a, 12b, and λ represents the wavelength of the incident light. The reflection light from the disc 7 does not pass through the liquid crystal panel 4r.

The liquid crystal molecules of the liquid crystal portions 12a, 12b of FIG. 2A which constitute the liquid crystal panel 4s are nematic liquid crystal molecules. These molecules are oriented in the Y direction of FIG. 2A when $V_1$ to $V_3$ are equal to zero, oriented in the Z direction of FIG. 2A when $V_1$ to $V_3$ are sufficiently large, and oriented in the intermediate direction between the Y and Z directions of FIG. 2A when $V_1$ to $V_3$ are equal to the intermediate values. Since the liquid crystal molecules of the liquid crystal portions 12a, 12b have birefringence characteristic, the refractive indexes thereof for ordinary light and extraordinary light are represented by $n_o$, $n_e$, respectively. Further, the refractive index thereof for the reflection light from the disc 7 is represented by $n_r$.

The emission light from the semiconductor laser 1 does not pass through the liquid crystal panel 4s. The reflection light from the disc 7 is linearly polarized light parallel to the Y direction of FIG. 2A, and thus it becomes extraordinary light when $V_1$ to $V_3$ are equal to zero. When $V_1$ to $V_3$ are sufficiently large, the reflection light becomes ordinary light, and when $V_1$ to $V_3$ are equal to the intermediate values, the reflection light has both of the extraordinary light component and the ordinary light component. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode patterns formed for the pattern electrodes 13a, 13b of FIG. 2A and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of each of the liquid crystal portions 12a, 12b and λ represents the wavelength of the incident light.

That is, by driving the liquid crystal panel 4r, the liquid crystal panel 4r produces the wave aberration for the light traveling on the going path (the emission light from the semiconductor laser 1), and by driving the liquid crystal panel 4s, the liquid crystal panel 4s likewise produces the wave aberration for the light traveling on the returning path (the reflection light from the disc 7). The liquid crystal panels 4r, 4s are simpler in structure than the liquid crystal panels 4h, 4i shown in FIGS. 9A and 9B and the liquid crystal panels 4j, 4k shown in FIGS. 10A and 10B, and thus it can be more easily manufactured.

According to this embodiment, both of the substrate-thickness deviation of the disc 7 and the tilt in the radial direction of the disc 7 can be corrected at the same time. With respect to the correction of the substrate-thickness deviation of the disc 7, if the following equation: $(n_{f1}-n_{f2})h/\lambda=(n_{f2}-n_{f3})h/\lambda=\alpha$ is satisfied for the liquid crystal portion 12a (shown in FIG. 2A) constituting the liquid crystal panel 4r and the following equation: $(n_{r1}-n_{r2})h/\lambda=(n_{r2}-n_{r3})h/\lambda=\alpha$ is satisfied for the liquid crystal portion 12a (shown in FIG. 2A) constituting the liquid crystal panel 4s, the wave aberration due to the substrate-thickness deviation and the wave aberration produced by the liquid crystal panel 4r are canceled by each other for the light traveling on the going path, and also the wave aberration due to the substrate-thickness deviation and the wave aberration produced by the liquid crystal panel 4s are canceled by each other for the light traveling on the returning path. Therefore, no wave aberration remains for the light traveling on the returning path and thus the phase distribution does not vary. Accordingly, even when the substrate-thickness deviation of the disc 7 is corrected by using the liquid crystal panels 4r, 4s, a focus error signal having no offset can be achieved.

Further, in the case where the tilt in the radial direction of the disc 7 is corrected in this embodiment, if the following equation: $(n_{f1}-n_{f2})h/\lambda=(n_{f2}-n_{f3})h/\lambda=\beta$ is satisfied for the liquid crystal portion 12b of FIG. 2A constituting the liquid crystal panel 4r and the following equation: $(n_{r1}-n_{r2})h/\lambda=(n_{r2}-n_{r3})h/\lambda=\beta$ is satisfied for the liquid crystal portion 12b of FIG. 2A constituting the liquid crystal panel 4s, the wave aberration due to the tilt in the radial direction and the wave aberration produced by the liquid crystal panel 4r are canceled by each other for the light traveling on the going path, and also the wave aberration due to the tilt in the radial direction and the wave aberration produced by the liquid crystal panel 4s are canceled by each other for the light traveling on the returning path. Therefore, no wave aberration remains for the light traveling on the returning path and thus the phase distribution does not vary. Accordingly, even when the tilt in the radial direction of the disc 7 is corrected by using the liquid crystal panels 4r, 4s, a focus error signal having high sensitivity can be achieved.

An eighteenth embodiment of the optical head device according to the present invention is implemented by using liquid crystal panels 4t, 4u in place of the liquid crystal panels 4f, 4g of the sixth embodiment of the optical head device shown in FIG. 7.

The construction of the liquid crystal panels 4t, 4u in this embodiment is the same as the liquid crystal panel 4q shown in FIG. 13 according to the sixteenth embodiment of the optical head device of the present invention. The liquid crystal panels 4t, 4u are implemented by replacing the overall surface electrodes of the liquid crystal panels 4f, 4g by pattern electrodes. By using the liquid crystal panels 4t, 4u, both of the substrate-thickness deviation of the disc 7 and the tilt in the radial direction of the disc 7 can be corrected at the same time.

An electrode pattern formed for a pattern electrode 13k for the correction of the substrate-thickness deviation of the disc 7 is shown in FIG. 16B. The correction amount of the wave aberration is represented by "0" in each of the areas 21a, 21e of FIG. 16B, by α in each of the areas 21b, 21d and by 2α in the area 21c (α represents a constant). An electrode pattern formed for a pattern electrode 13l for the correction of the tilt in the radial direction of the disc 7 is shown in FIG. 16C. The correction amount of the wave aberration is represented by –β in each of the areas 21f, 21i of FIG. 16C, by "0" in the area 21h and by β in each of the areas 21g, 21j (β represents a constant).

Next, a method of driving the liquid crystal panels 4t, 4u will be described.

A voltage represented by a rectangular wave having a frequency of about 1 kHz in which $V_{COM}$ is located at the center thereof and the amplitude thereof corresponds to $V_1$ ($V_2$, $V_3$) is applied to the first to third areas of the electrode patterns formed for the pattern electrodes 13k, 13l of FIG. 13. At this time, the difference of the correction amount of the wave aberration between the first and second areas is proportional to ($V_1-V_2$), and the difference of the correction amount of the wave aberration between the second and third areas is proportional to ($V_2-V_3$).

With respect to the correction of the substrate-thickness deviation of the disc 7, if the area 21c of FIG. 16B is set to the first area, the areas 21b, 21d are set to the second area, the areas 21a, 21e are set to the third area, and $V_1-V_2=V_2-V_3=K\alpha$ (K represents a proportionality constant), the difference of the correction amount of the wave aberration between the area 21c and the areas 21b, 21d and the difference of the correction amount of the wave aberration between the areas 21b, 21d and the areas 21a, 21e can be set to the same value α. Further, with respect to the correction of the tilt in the radial direction of the disc 7, if the areas 21g, 21j of FIG. 16C are set to the first area, the area 21h is set to the second area, the areas 21f, 21i are set to the third area and $V_1-V_2=V_2-V_3=K\beta$ (K represents a proportionality constant), the difference of the correction amount of the wave aberration between the areas 21g, 21j and the area 21h and the difference of the correction amount of the wave aberration between the area 21h and the areas 21f, 21i can be set to the same value β.

The liquid crystal molecules of the liquid crystal portion 12m of FIG. 13 which constitutes the liquid crystal panel 4t are nematic liquid crystal molecules. These liquid crystal molecules are oriented in the X direction of FIG. 13 when $V_1$ to $V_3$ are equal to zero, oriented in the Z direction of FIG. 13 when $V_1$ to $V_3$ are sufficiently large, and oriented in the intermediate direction between the X and Z directions of FIG. 13 when $V_1$ to $V_3$ are equal to the intermediate values. The liquid crystal molecules of the liquid crystal portion 12m have birefringence characteristic and thus the refractive indexes thereof to ordinary light and extraordinary light are represented by $n_o$, $n_e$. Further, the refractive index thereof for the emission light from the semiconductor laser 1 is represented by $n_f$.

The emission light from the semiconductor laser 1 is linearly polarized light parallel to the X direction of FIG. 13. Therefore, when $V_1$ to $V_3$ are equal to zero, the light emitted from the liquid crystal panel 4t becomes extraordinary light. On the other hand, when $V_1$ to $V_3$ are sufficiently large, the light emitted from the liquid crystal panel 4t becomes ordinary light. When $V_1$ to $V_3$ are equal to the intermediate values, the light emitted from the liquid crystal panel 4t has both the ordinary light component and the extraordinary light component. Accordingly, $n_f$ is varied between $n_e$ and $n_o$ in correspondence with the value of $V_1$ to $V_3$. At this time, representing the values of $n_f$ corresponding to $V_1$ to $V_3$ by $n_{f1}$ to $n_{f3}$ respectively, the difference of the correction amount of the wave aberration in the first and second areas of the electrode patterns formed for the pattern electrodes 13k, 13l of FIG. 13 and the difference of the correction amount of the wave aberration in the second and third areas are represented by $(n_{f1}-n_{f2})h/\lambda$, $(n_{f2}-n_{f3})h/\lambda$ respectively when they are standardized by the wavelength of the incident light. Here, h represents the thickness of the liquid crystal portion 12m, and λ represents the wavelength of the incident light. The reflection light from the disc 7 does not pass through the liquid crystal panel 4t.

The liquid crystal molecules of the liquid crystal portion 12m of FIG. 13 which constitutes the liquid crystal panel 4u are nematic liquid crystal molecules. These molecules are oriented in the Y direction of FIG. 13 when $V_1$ to $V_3$ are equal to zero, oriented in the Z direction of FIG. 13 when $V_1$ to $V_3$ are sufficiently large, and oriented in the intermediate direction between the Y and Z directions of FIG. 13 when $V_1$ to $V_3$ are equal to the intermediate values. Since the liquid crystal molecules of the liquid crystal portion 12m have birefringence characteristic, the refractive indexes thereof for ordinary light and extraordinary light are represented by $n_o$, $n_e$, respectively. Further, the refractive index thereof for the reflection light from the disc 7 is represented by $n_r$.

The emission light from the semiconductor laser 1 does not pass through the liquid crystal panel 4u. The reflection light from the disc 7 is linearly polarized light parallel to the Y direction of FIG. 13, and thus it becomes extraordinary light when $V_1$ to $V_3$ are equal to zero. When $V_1$ to $V_3$ are sufficiently large, the reflection light becomes ordinary light, and when $V_1$ to $V_3$ are equal to the intermediate values, the reflection light has both of the extraordinary light component and the ordinary light component. Accordingly, $n_r$ varies between $n_e$ and $n_o$ in correspondence with the values of $V_1$ to $V_3$. At this time, if the values of $n_r$ corresponding to $V_1$ to $V_3$ are represented by $n_{r1}$ to $n_{r3}$, the difference of the correction amount of the wave aberration between the first and second areas of the electrode patterns formed for the pattern electrodes 13k, 13l of FIG. 13 and the difference of the correction amount of the wave aberration between the second and third areas are equal to $(n_{r1}-n_{r2})h/\lambda$, $(n_{r2}-n_{r3})h/\lambda$, respectively when they are standardized by the wavelength of the incident light. Here, h represents the thickness of the liquid crystal portion 12m and λ represents the wavelength of the incident light.

That is, by driving the liquid crystal panel 4t, the liquid crystal panel 4t produces the wave aberration for the light traveling on the going path (the emission light from the semiconductor laser 1), and by driving the liquid crystal panel 4u, the liquid crystal panel 4u likewise produces the wave aberration for the light traveling on the returning path (the reflection light from the disc 7). The liquid crystal panels 4t, 4u are simpler in structure than the liquid crystal panels 4l, 4m shown in FIGS. 11A and 11B and the liquid crystal panels 4n, 4o shown in FIGS. 12A and 12B, and thus it can be more easily manufactured.

According to this embodiment, both of the substrate-thickness deviation of the disc 7 and the tilt in the radial direction of the disc 7 can be corrected at the same time. With respect to the correction of the substrate-thickness deviation of the disc 7, if the following equation: $(n_{f1}-n_{f2})h/\lambda=(n_{f2}-n_{f3})h/\lambda=\alpha$ is satisfied for the liquid crystal portion 12m (shown in FIG. 13A) constituting the liquid crystal panel 4t and the following equation: $(n_{r1}-n_{r2})h/\lambda=(n_{r2}-n_{r3})h/\lambda=\alpha$ is satisfied for the liquid crystal portion 12m (shown in FIG. 13) constituting the liquid crystal panel 4u, the wave aberration due to the substrate-thickness deviation and the wave aberration produced by the liquid crystal panel 4t are canceled by each other for the light traveling on the going path, and also the wave aberration due to the substrate-thickness deviation and the wave aberration produced by the liquid crystal panel 4u are canceled by each other for the light traveling on the returning path. Therefore, no wave aberration remains for the light traveling on the returning path and thus the phase distribution does not vary. Accordingly, even when the substrate-thickness deviation of the disc 7 is corrected by using the liquid crystal panels 4t, 4u, a focus error signal having no offset can be achieved.

Further, with respect to the correction of the tilt in the radial direction of the disc 7, if the following equation: $(n_{f1}-n_{f2})h/\lambda=(n_{f2}-n_{f3})h/\lambda=\beta$ is satisfied for the liquid crystal portion 12m of FIG. 13 constituting the liquid crystal panel 4t and the following equation: $(n_{r1}-n_{r2})h/\lambda=(n_{r2}-n_{r3})h/\lambda=\beta$ is satisfied for the liquid crystal portion 12m of FIG. 13 constituting the liquid crystal panel 4u, the wave aberration due to the tilt in the radial direction and the wave aberration produced by the liquid crystal panel 4t are canceled by each other for the light traveling on the going path, and also the wave aberration due to the tilt in the radial direction and the wave aberration produced by the liquid crystal panel 4u are canceled by each other for the light traveling on the returning path. Therefore, no wave aberration remains for the light traveling on the returning path and thus the phase distribution does not vary. Accordingly, even when the tilt in the radial direction of the disc 7 is corrected by using the liquid crystal panels 4t, 4u, a focus error signal having high sensitivity can be achieved.

An embodiment of the optical information recording/reproducing device according to the present invention may be implemented by adding a reproduction signal detecting circuit and a liquid crystal panel driving circuit to each of the seventeenth and eighteenth embodiments of the optical head device according to the present invention.

The detection of the focus error signal is performed by using the astigmatism method in the first to eighteenth embodiments of the optical head device according to the present invention. However, the detection of the focus error signal may be performed by using a Foucault method or spot size method.

In the first to eighteenth embodiments of the optical head device according to the present invention, any one or both of the substrate-thickness deviation of the disc 7 and the tilt in the radial direction of the disc 7 are corrected by using a liquid crystal panel(s). However, the tilt in the tangent line direction of the disc 7 may be corrected. An electrode pattern formed in a pattern electrode when the tilt in the tangent line direction of the disc 7 is achieved by rotating the electrode pattern 20b of FIG. 16C around the Z axis by 90 degrees. If the electrode pattern when the substrate-thickness deviation of the disc 7 or the tilt in the radial direction of the disc 7 is corrected is replaced by the electrode pattern when the tilt in the tangent line direction of the disc 7 is corrected, the tilt in the tangent line direction can be corrected in place of the correction of the substrate-thickness deviation or the tilt in the radial direction. If the electrode pattern when the substrate-thickness deviation of the disc 7 or the tilt in the radial direction of the disc 7 is corrected is added to the electrode pattern when the tilt in the tangent line direction of the disc 7 is corrected, the tilt in the tangent line direction can be corrected in addition to the correction of the substrate-thickness deviation or the tilt in the radial direction.

As described above, according to the optical head device of the present invention, by driving the liquid crystal panel(s), the wave aberration can be likewise produced for the light traveling on the going path (the emission light from the light source) and the light traveling on the returning path (the reflection light from the optical recording medium).

Further, according to the optical information recording/reproducing device of the present invention, by using the optical head device of the present invention which can correct the substrate-thickness deviation or tilt of the optical recording medium by using the liquid crystal panel(s), the substrate-thickness deviation or tilt of the optical recording medium is corrected so as to prevent the recording/reproducing characteristic from suffering a harmful influence.

The effect of the optical head device and the optical information recording/reproducing device of the present invention resides in that a focus error signal having no offset and high sensitivity can be achieved even when the substrate-thickness deviation or tilt of an optical recording medium is corrected by using a liquid crystal panel(s). This is because the wave aberration due to the substrate-thickness deviation or the tilt and the wave aberration generated by the liquid crystal panel are likewise canceled by each other for both of light traveling on a going path and light traveling on a returning path, so that no wave aberration remains for the light traveling on the returning path and thus the phase distribution is not varied.

What is claimed is:

1. An optical head device comprising
a light source, an objective lens for focusing onto an optical recording medium the light which is emitted from said light source and travels on a going path, a photodetector for detecting the light which is reflected from said optical recording medium and travels on a returning path, and a liquid crystal panel for producing wave aberration by which the wave aberration of the light traveling on the going path is canceled, wherein said liquid crystal panel further produces wave aberration by which the wave aberration of the light traveling on the returning path is canceled, further comprising:
a polarization beam splitter for separating an optical path extending from said light source to said optical recording medium and an optical path extending from said optical recording medium to said photodetector, and a quarter wavelength plate provided between said polarization beam splitter and said objective lens, wherein said liquid crystal panel comprises a first liquid crystal panel disposed between said light source and said polarization beam splitter or between said polarization beam splitter and said quarter wavelength plate, and a second liquid crystal panel disposed between said polarization beam splitter and said photodetector or between said polarization beam splitter and said quarter wavelength plate.

2. The optical head device as claimed in claim 1, wherein said first liquid crystal panel comprises a first substrate, a first liquid crystal portion and a second substrate which are laminated in this order, and said second liquid crystal panel comprises a third substrate, a second liquid crystal portion and a fourth substrate which are laminated in this order.

3. The optical head device as claimed in claim 2, wherein a first pattern electrode is formed on any one of the surface of said first substrate which confronts said first liquid crystal portion and the surface of said second substrate which confronts said first liquid crystal portion while a first overall-surface electrode is formed on the other surface, and a second pattern electrode is formed on any one of the surface of said third substrate which confronts said second liquid crystal portion and the surface of said fourth substrate which confronts said second liquid crystal portion while a second overall-surface electrode is formed on the other surface.

4. The optical head device as claimed in claim 3, wherein electrode patterns formed for the first and second pattern electrodes are identical to each other.

5. The optical head device as claimed in claim 3, wherein the liquid crystal molecules of said first and second liquid crystal portions are nematic liquid crystal molecules, and when no voltage is applied, the liquid crystal molecules of said first liquid crystal portion and the liquid crystal molecules of said second liquid crystal portion are oriented so as to be substantially perpendicular to each other within a plane which is substantially perpendicular to the optical axis.

6. The optical head device as claimed in claim 3, wherein the light traveling on the going path is incident as linearly polarized light to said first liquid crystal panel, and the light traveling on the returning path is incident to said second liquid crystal panel as linearly polarized light whose polarization direction is substantially perpendicular to that of the light traveling on the going path.

7. The optical head device as claimed in claim 2, wherein a first pattern electrode is formed on any one of the surface of said first substrate which confronts said first liquid crystal portion and the surface of said second substrate which confronts said first liquid crystal portion while a second pattern electrode is formed on the other surface, and a third pattern electrode is formed on any one of the surface of said third substrate which confronts said second liquid crystal portion and the surface of said fourth substrate which confronts said second liquid crystal portion while a fourth pattern electrode is formed on the other surface.

8. The optical head device as claimed in claim 7, wherein electrode patterns formed for said first and third pattern electrodes are identical to each other, and electrode patterns formed for said second and fourth pattern electrodes are identical to each other.

9. The optical head device as claimed in claim 7, wherein the liquid crystal molecules of said first and second liquid crystal portions are nematic liquid crystal molecules, and when no voltage is applied, the liquid crystal molecules of said first liquid crystal portion and the liquid crystal molecules of said second liquid crystal portion are oriented so as to be substantially perpendicular to each other within a plane which is substantially perpendicular to the optical axis.

10. The optical head device as claimed in claim 7, wherein the light traveling on the going path is incident as linearly polarized light to said first liquid crystal panel, and the light traveling on the returning path is incident to said second liquid crystal panel as linearly polarized light whose polarization direction is substantially perpendicular to that of the light traveling on the going path.

11. The optical head device as claimed in claim 1, wherein said first liquid crystal panel comprises a first substrate, a first liquid crystal portion, a second substrate, a second liquid crystal portion and a third substrate which are laminated in this order, and said second liquid crystal panel comprises a fourth substrate, a third liquid crystal portion, a fifth substrate, a fourth liquid crystal portion and a sixth substrate which are laminated in this order.

12. The optical head device as claimed in claim 11, wherein a first pattern electrode is formed on any one of the surface of said first substrate which confronts said first liquid crystal portion and the surface of said second substrate which confronts said first liquid crystal portion while a first overall-surface electrode is formed on the other surface, a second pattern electrode is formed on any one of the surface of said second substrate which confronts said second liquid crystal portion and the surface of said third substrate which confronts said second liquid crystal portion while a second overall-surface electrode is formed on the other surface, a third pattern electrode is formed on any one of the surface of said fourth substrate which confronts said third liquid crystal portion and the surface of said fifth substrate which confronts said third liquid crystal portion while a third overall-surface electrode is formed on the other surface, and a fourth pattern electrode is formed on any one of the surface of said fifth substrate which confronts said fourth liquid crystal portion and the surface of said sixth substrate which confronts said fourth liquid crystal portion while a fourth overall-surface electrode is formed on the other surface.

13. The optical head device as claimed in claim 12, wherein electrode patterns formed for said first and third pattern electrodes are identical to each other, and electrode patterns formed for said second and fourth pattern electrodes are identical to each other.

14. The optical head device as claimed in claim 12, wherein the liquid crystal molecules of said first to fourth liquid crystal portions are nematic liquid crystal molecules, and when no voltage is applied, the liquid crystal molecules of said first and second liquid crystal portions and the liquid crystal molecules of said third and fourth liquid crystal portions are oriented so as to be substantially perpendicular to each other within a plane which is substantially perpendicular to the optical axis.

15. The optical head device as claimed in claim 12, wherein the light traveling on the going path is incident as linearly polarized light to said first liquid crystal panel, and the light traveling on the returning path is incident to said second liquid crystal panel as linearly polarized light whose polarization direction is substantially perpendicular to that of the light traveling on the going path.

\* \* \* \* \*